United States Patent
Choi

(10) Patent No.: US 12,204,368 B2
(45) Date of Patent: Jan. 21, 2025

(54) DISPLAY DEVICE

(71) Applicant: LG ELECTRONICS INC., Seoul (KR)

(72) Inventor: Seongwook Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 265 days.

(21) Appl. No.: 17/864,792

(22) Filed: Jul. 14, 2022

(65) Prior Publication Data
US 2023/0028282 A1 Jan. 26, 2023

(30) Foreign Application Priority Data
Apr. 15, 2022 (KR) .......................... 10-2022-0046742

(51) Int. Cl.
*G06F 1/16* (2006.01)
(52) U.S. Cl.
CPC .................................. *G06F 1/1607* (2013.01)
(58) Field of Classification Search
CPC .... G06F 1/1601; G06F 1/1607; G06F 1/1632; G06F 1/1637; G06F 1/1654
See application file for complete search history.

(56) References Cited

U.S. PATENT DOCUMENTS

| | | | | |
|---|---|---|---|---|
| 3,581,272 A | * | 5/1971 | Yopp | H01R 13/052 439/825 |
| 9,822,921 B2 | | 11/2017 | Chen et al. | |
| 2012/0295476 A1 | | 11/2012 | Holland et al. | |

FOREIGN PATENT DOCUMENTS

| | | |
|---|---|---|
| JP | 2020-161266 A | 10/2020 |
| KR | 20-0320990 Y1 | 7/2003 |
| KR | 10-2006-0035889 A | 4/2006 |
| KR | 10-2011-0063268 A | 6/2011 |
| KR | 10-2011-0073943 A | 6/2011 |
| KR | 10-2016-0082091 A | 7/2016 |
| KR | 10-2021-0032175 A | 3/2021 |
| KR | 10-2233059 B1 | 3/2021 |
| KR | 10-2257203 B1 | 5/2021 |

* cited by examiner

*Primary Examiner* — Adrian S Wilson
(74) *Attorney, Agent, or Firm* — Birch, Stewart, Kolasch & Birch, LLP

(57) ABSTRACT

Disclosed is a display device. The display device may include: a head including a display panel; a stand that supports the head; a first connector fixed to any one of the head and the stand; and a second connector fixed to the other one of the head and the stand, and is aligned with the first connector in one direction, wherein the first connector may include a first pin extending in the one direction, and the second connector may include a second pin that defines a boundary of a pin hole into which the first pin is inserted and that surrounds and contacts a side surface of the first pin.

11 Claims, 48 Drawing Sheets

DISPLAY DEVICE

CROSS-REFERENCE TO RELATED APPLICATION

This application claims the benefit of earlier filing date and right of priority of International Application No. PCT/KR2021/009299, filed on Jul. 20, 2021, and Korean Patent Application No. 10-2022-0046742, filed on Apr. 15, 2022, the contents of which are incorporated herein by reference in their entirety.

BACKGROUND

1. Technical Field

The present disclosure relates to a display device.

2. Description of the Related Art

With the development of information society, there is an increasing demand for various types of display devices. In order to meet such demand, various display devices, such as a Liquid Crystal Display Device (LCD), a Plasma Display Panel (PDP), an Electro luminescent Display (ELD), a Vacuum Fluorescent Display (VFD), an Organic Light Emitting Diode (OLED), and the like, have been developed and used.

Among these devices, an LCD panel of the LCD device includes a thin film transistor (TFT) substrate and a color substrate that are disposed to face each other with a liquid crystal layer being interposed therebetween. The LCD panel can display an image using light provided by a backlight unit. In addition, an OLED panel can display an image by depositing an organic material layer capable of emitting light by itself on a substrate on which a transparent electrode is formed.

A lot of research has been conducted recently on a structure for connecting a head including a display panel to a power source or the like through a connector.

SUMMARY

An object of the present disclosure is to solve the above and other problems.

Another object may be to provide a docking mechanism of connectors.

Another object may be to provide a structure that can minimize damage of pins (terminals) during coupling of connectors.

Another object may be to provide a structure that can allow connectors to be coupled to each other in an easier and secure manner.

Another object may be to provide a structure that can achieve secure electrical connection (e.g., stable power supply) using a relatively small number of pins (terminals).

Another object may be to provide a display device including a head to which a first connector or a second connector is fixed and a stand to which the second connector or the first connector is fixed.

Another object may be to provide a display device that can freely adjust an angle, height, or position of a head using a stand that supports the head.

In accordance with an aspect of the present disclosure, a display device may include: a head including a display panel; a stand that supports the head; a first connector fixed to any one of the head and the stand; and a second connector fixed to the other one of the head and the stand, and is aligned with the first connector in one direction, wherein the first connector may include a first pin extending in the one direction, and the second connector may include a second pin that defines a boundary of a pin hole into which the first pin is inserted and that surrounds and contacts a side surface of the first pin.

DETAILED DESCRIPTION THE PREFERRED EMBODIMENTS

Figure 1:
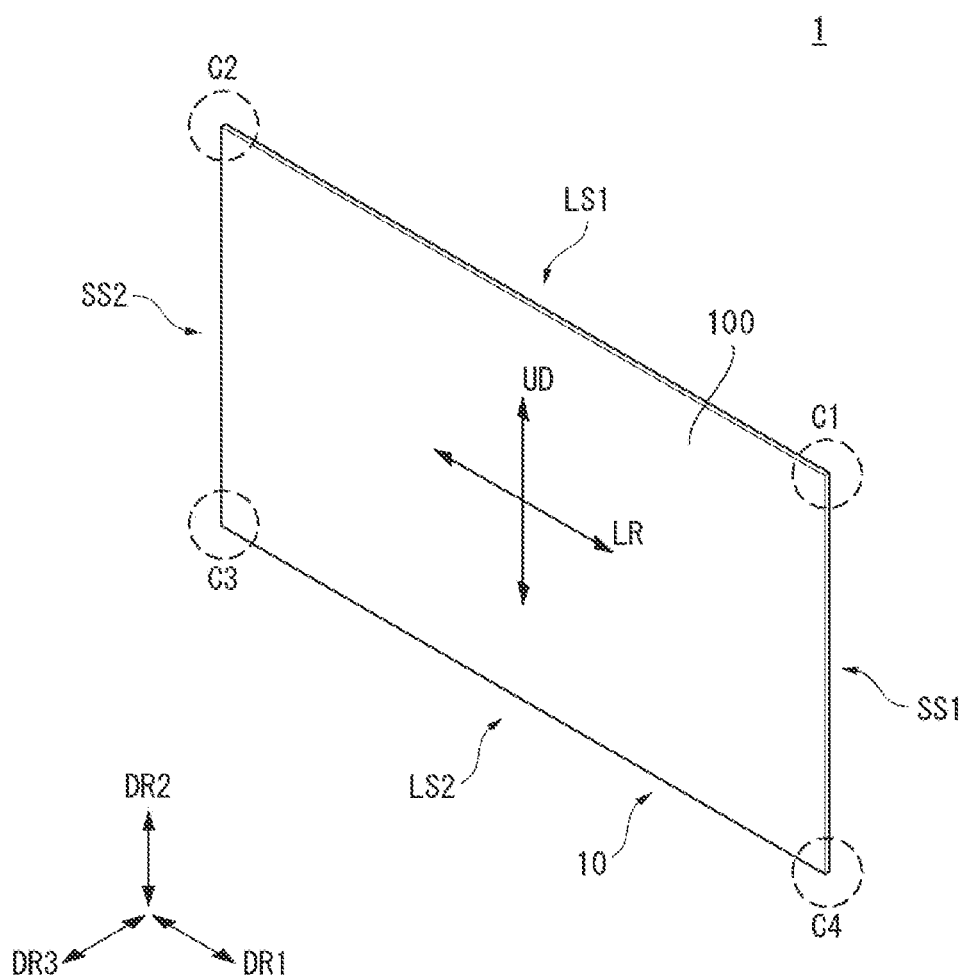
FIGS. 1 to 48 are diagrams illustrating examples of a display device according to embodiments of the present disclosure.

Description will now be given in detail according to exemplary implementations disclosed herein, with reference to the accompanying drawings. For the sake of brief description with reference to the drawings, the same or equivalent components are provided with the same or similar reference numbers, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

In the following description, even if the embodiment is described with reference to a specific figure, if necessary, reference numeral not shown in the specific figure may be referred to, and the reference numeral not shown in the specific figure may be used in a case where the above reference numeral is shown in the other figures.

Figure 2:
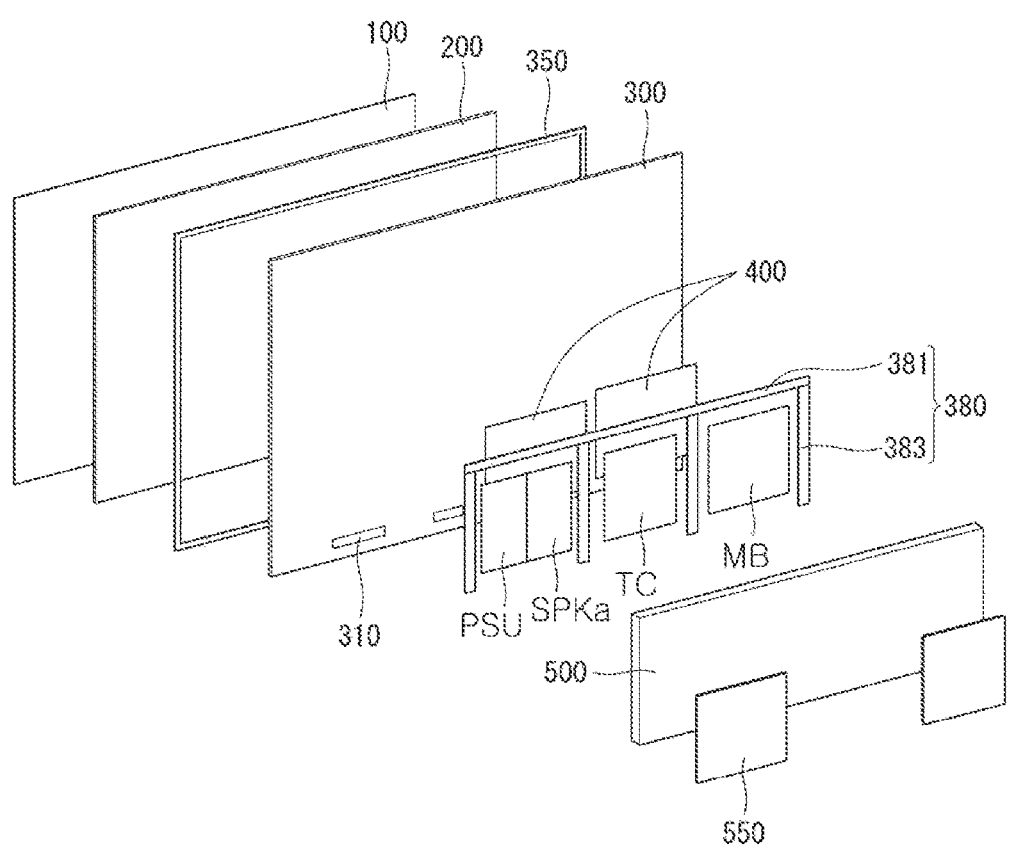

Referring to FIGS. 1 and 2, a display device 1 may include a head 10 having a display panel 100. The head 10 may be referred to as a display or display unit.

The head 10 may include a first long side LS1, a second long side LS2 opposite the first long side LS1, a first short side SS1 adjacent to the first long side LS1 and the second long side LS2, and a second short side SS2 opposite the first short side SS1.

Here, an area of the first short side SS1 may be referred to as a first side area. An area of the second short side SS2 may be referred to as a second side area opposite the first side area. An area of the first long side LS1 may be referred to as a third side area adjacent to the first side area and the second side area, and located between the first side area and the second side area. An area of the second long side LS2 may be referred to as a fourth side area adjacent to the first side area and the second side area, located between the first side area and the second side area, and opposite the third side area.

For convenience of explanation, it is illustrated and described that the length of the first and second long sides LS1 and LS2 is greater (longer) than the length of the first and second short sides SS1 and SS2, but the length of the first and second long sides LS1 and LS2 may be approximately equal to the length of the first and second short sides SS1 and SS2.

In the following description, a first direction DR1 may be a direction parallel to the first and second long sides LS1 and LS2 of the head 10, and a second direction DR2 may be a direction parallel to the first and second short sides SS1 and SS2 of the head 10.

The first direction DR1 may be parallel to a horizontal axis. The first direction DR1 may be referred to as a first horizontal axis. The second direction DR2 may be parallel to a vertical axis. The second direction DR2 may be referred to as a vertical axis. A third direction DR3 may be parallel to a horizontal axis. The third direction DR3 may be referred to as a second horizontal axis.

A side or a surface on which the display panel 100 of the head 10 displays an image may be referred to as a front side or a front surface. When the display panel 100 displays the image, a side or a surface from which the image cannot be seen or viewed may be referred to as a rear side or a rear surface. The third direction DR3 may be a back-and-forth direction (or a front-and-rear direction).

Based on a direction in which the display panel 100 displays an image, the first long side LS1 may be referred to as an upper side or an upper surface. Similarly, the second long side LS2 may be referred to as a lower side or a lower surface. Similarly, the first short side SS1 may be referred to as a left side or a left surface, and the second short side SS2 may be referred to as a right side or a right surface.

A lateral side(s) of the head 10 may mean at least one of upper, lower, right, and left sides of the head 10.

The first long side LS1, the second long side LS2, the first short side SS1, and the second short side SS2 may be referred to as edges of the head 10. In addition, points where the first long side LS1, the second long side LS2, the first short side SS1, and the second short side SS2 meet each other may be referred to as corners. For example, a point where the first long side LS1 and the first short side SS1 meet each other may be referred to as a first corner C1, a point where the first long side LS1 and the second short side SS2 meet each other may be referred to as a second corner C2, a point where the second short side SS2 and the second long side LS2 meet each other may be referred to as a third corner C3, and a point where the second long side LS2 and the first short side SS1 meet each other may be a fourth corner C4.

Here, a direction from the first short side SS1 to the second short side SS2 or a direction from the second short side SS2 to the first short side SS1 may be referred to as a left-and-right direction LR. A direction from the first long side LS1 to the second long side LS2 or a direction from the second long side LS2 to the first long side LS1 may be referred to as an up-and-down direction UD.

Figure 3:
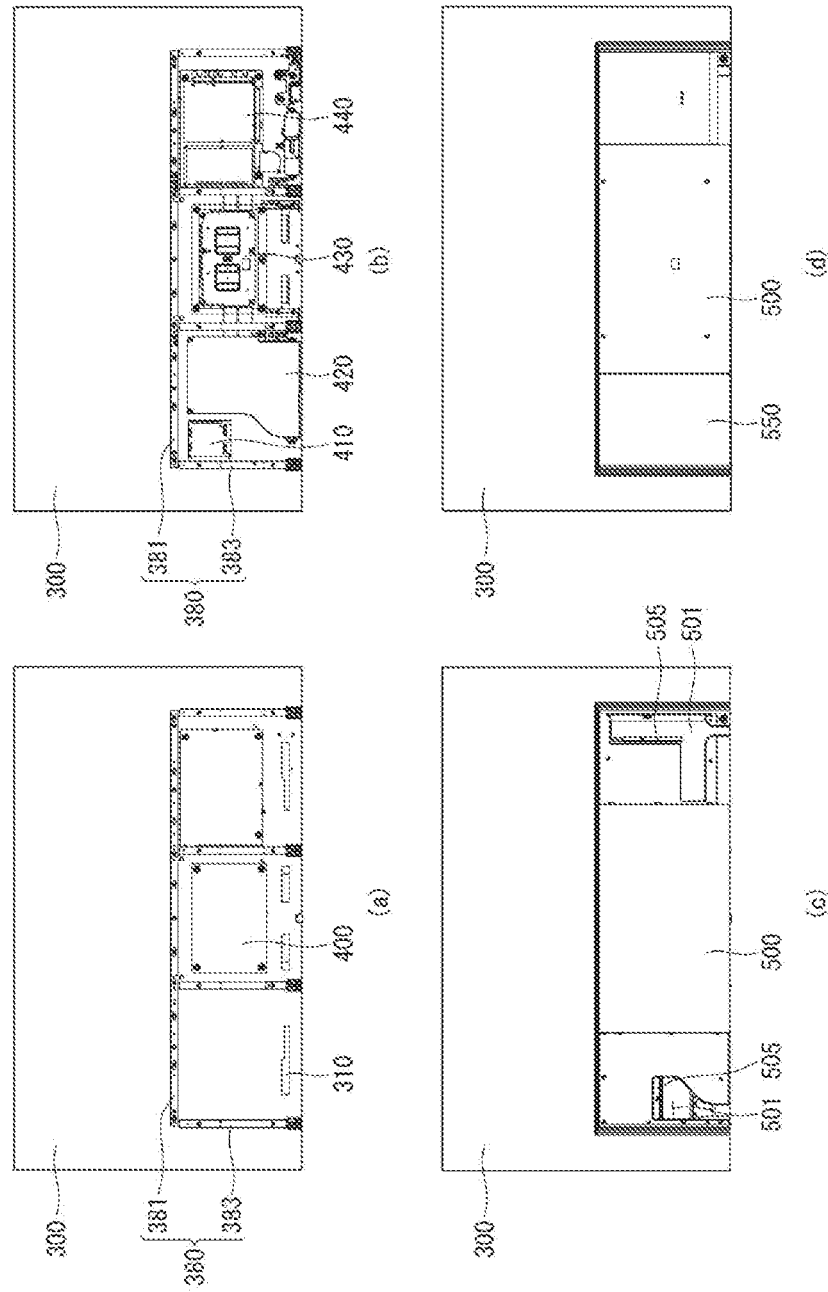

Referring to FIGS. 2 and 3, the display panel 100 may be provided on the front side of the display device 1 and may display images. The display panel 100 may divide an image into a plurality of pixels and output an image in accordance with color, brightness, and saturation of each pixel. The display panel 100 may be divided into an active area in which an image is displayed and an inactive area in which no image is displayed.

For example, the display panel 100 may be a Liquid Crystal Display (LCD) panel. The display device 1 may include a backlight unit that provides light to the display panel 100.

In another example, the display panel 100 may be an Organic Light Emitting Diode (OLED) Panel. The display panel 100 may emit light by itself. The display panel 100 may have a very thin thickness.

In another example, the display panel 100 be a different type of panel, such as an LED panel and a PDP panel, other than the LCD panel and the OLED panel.

An inner plate 200 may be disposed at the rear of the display panel 100. The inner plate 200 may be attached to the rear surface of the display panel 100. The inner plate 200 may be smaller in size than the display panel 100. The inner plate 200 may be coupled to the rear surface of the display panel 100 by a double-sided adhesive tape or a magnet. The inner plate 200 may include a ferromagnetic material or a paramagnetic material.

The inner plate 200 may provide rigidity to the display panel 100. The inner plate 200 may emit heat received from the display panel 100. The inner plate 200 may have high heat conductivity. The inner plate 200 may include metal. For example, the inner plate 200 may include aluminum or an aluminum alloy.

A frame 300 may be disposed at the rear of the inner plate 200. The frame 300 may include an inner space. The frame 300 may accommodate the inner plate 200 and the display panel 100. The inner plate 200 and the display panel 100 may be disposed in the inner space of the frame 300. When necessary, the frame 300 may cover at least a portion of side surfaces of the inner plate 200 and the display panel 100.

The frame 300 may include fibers to reinforce rigidity. For example, the frame 300 may include at least one of a glass fiber, a carbon fiber, a metallic wire, and a metallic fiber. The frame 300 may include a microfiber.

A middle cabinet 350 may be disposed to surround an edge of the display panel 100. The middle cabinet 350 may have a frame shape with a hollow center to surround an outer edge of the display panel 100. The middle cabinet 350 may support the edge of the display panel 100 from below. The frame 300 may be seated on a rear surface of the middle cabinet 350 to be fixed to the middle cabinet 350.

The middle cabinet 350 may be made of a synthetic resin, such as plastic, or a metal material, but aluminum or an aluminum alloy, or stainless steel or a galvanized steel sheet may be more suitable in consideration of specific strength and heat dissipation.

A rigid bar 380 may be disposed at the rear of the frame 300. The rigid bar 380 may be in contact with a rear surface of the frame 300. The rigid bar 380 may provide rigidity to the frame 300 and/or the display panel 100. In other words, the rigid bar 380 may be branched in multiple directions to minimize bending deformation of the frame 300 and the like.

The rigid bar 380 may be made of a material such as carbon fiber reinforced plastics (CFRP), but it is not limited thereto.

For example, the rigid bar 380 may include a first body 381 that extends in the left-and-right direction of the display panel 100, and a second body 383 that extends from the first body 381 in a vertical direction, namely, in the up-and-down direction. The first body 381 and the second body 383 may be formed as one body. That is, the second body 383 may be a portion branched from the first body 381. Alternatively, the first body 381 and the second body 383 may be configured as separate bodies. Adjacent second bodies 383 may be disposed to be spaced apart from one another by a predetermined distance or interval. As will be described later, electronic components may be respectively disposed between each two adjacent second bodies 383. Both the first body 381 and the second body 383 may be provided in plurality.

A PCB plate 400 may be disposed at the rear of the frame 300. The PCB plate 400 may be coupled to the rear surface of the frame 300. The PCB plate 400 may be coupled to the frame 300. The PCB plate 400 may be divided into a plurality of numbers to be respectively disposed between each two adjacent second bodies 383.

Electronic components may be mounted on a rear surface of the PCB plate 400. For example, a power distribution unit (PSU), a speaker (SPKa), a timing controller (TC) board, and a main board (MB) may be mounted on the rear surface of the PCB plate 400. The rigid bar 380 may be disposed between the electronic components, thereby effectively reducing defects or damage of the electronic components due to deformation of the frame 300 caused by an external force.

The PCB plate 400 may be made of a different material from the frame 300. For example, the PCB plate 400 may include metal. For example, the PCB plate 400 may be formed through a pressing process. The frame 300 and the PCB plate 400 may be fixed to each other by an adhesive member interposed therebetween and the like, but it is not limited thereto.

A back cover 500 may be disposed at the rear of the frame 300. The back cover 500 may be disposed at the rear of the PCB plate 400. The back cover 500 may be disposed to cover an electronic component disposed on the PCB plate 400 to thereby protect the electronic component. The back cover 500 may be fixed to the frame 300 by at least one fixing member. The fixing member may be a screw, but it is not limited thereto.

At least one connector 900 (see FIG. 9) may be installed or fixed to the periphery of the back cover 500. However, a position in which the connector 900 (see FIG. 9) is disposed is not limited thereto. The connector 900 (see FIG. 9) may transmit externally provided power and/or a signal to an electronic component disposed on the PCB plate 400. A pair of connectors 900 (see FIG. 9) may be coupled to each other to electrically connect the electronic component disposed on the PCB plate 400 and a component that provides power and/or a signal from the outside.

An auxiliary cover 550 may be disposed at the rear of the back cover 500. The auxiliary cover 550 may be disposed to cover components disposed on a groove 501 to thereby protect the components. The auxiliary cover 550 may be fixed to the back cover 500 by at least one fixing member. The auxiliary cover 550 and the back cover 500 may be fixed to each other through a fastening method using a grommet, but it is not limited thereto.

FIGS. 4 to 7 are diagrams illustrating a connection relationship between a display panel and a cable, and a positional relationship between the cable and a case member according to an embodiment of the present disclosure.

Figure 4:
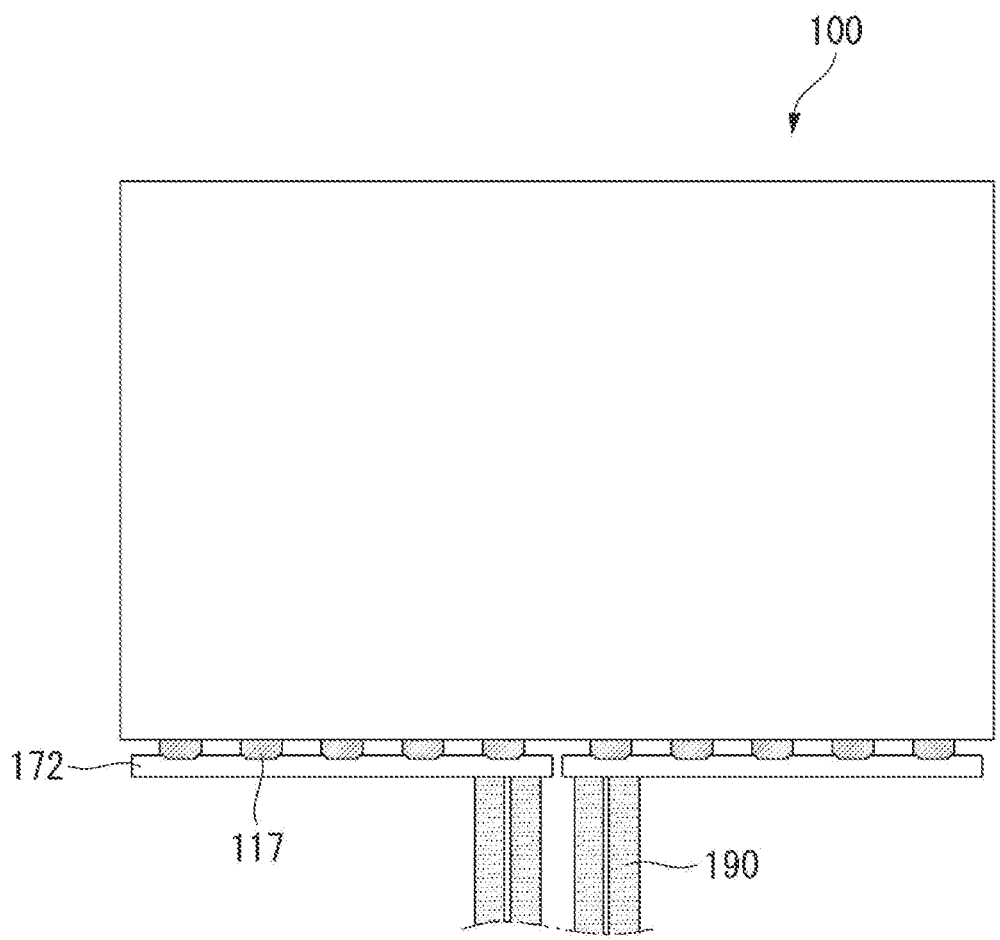

Referring to FIG. 4, a member layer 117 may extend from one side of the display panel 100. For example, the member layer 117 may have a shape that extends from the second long side LS2 of the display panel 100. The member layer 117 may be provided in plurality. The member layer 117 may be electrically connected to the display panel 100. The member layer 117 may include at least one of a Chip On Film (COF), a Chip On Glass (COG), a Flexible Printed Circuit Board (FPCB), and a Tape Carrier Package (TCP).

A source PCB 172 may have a shape extending from the member layer 117. The source PCB 172 may be electrically connected to the member layer 117. The source PCB 172 may be provided in plurality.

A cable 190 may have a shape extending from the source PCB 172. The cable 190 may be electrically connected to the source PCB 172. The cable 190 may be provided in plurality.

Power and/or a signal provided to the cable 190 may be transmitted to the source PCB 172. Power and/or a signal transmitted to the source PCB 172 may be distributed to the member layer 117. Power and/or a signal distributed to the member layer 117 may be supplied to the display panel 100.

Figure 5:
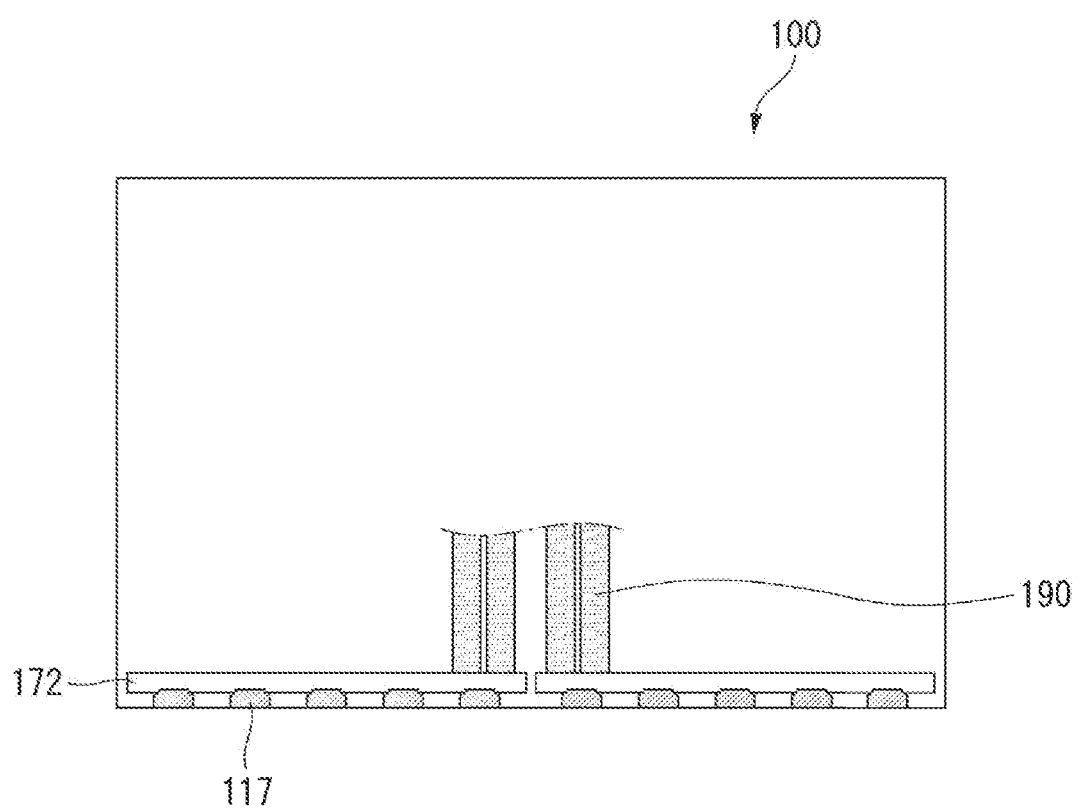

Referring to FIG. 5, the member layer 117 may be flexible. The member layer 117 may be bent toward the rear surface of the display panel 100. The source PCB 172 that is connected to the member layer 117 may be disposed at the rear of the display panel 100. The cable 190 that is connected to the source PCB 172 may be disposed at the rear of the display panel 100.

Figure 6:
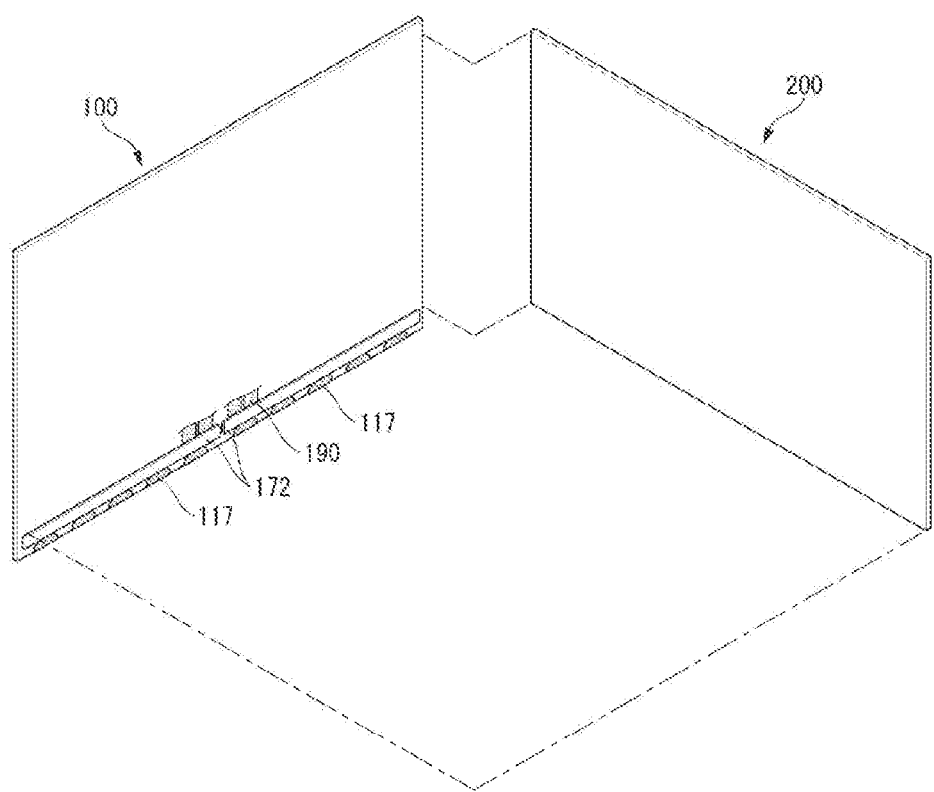
Figure 7:
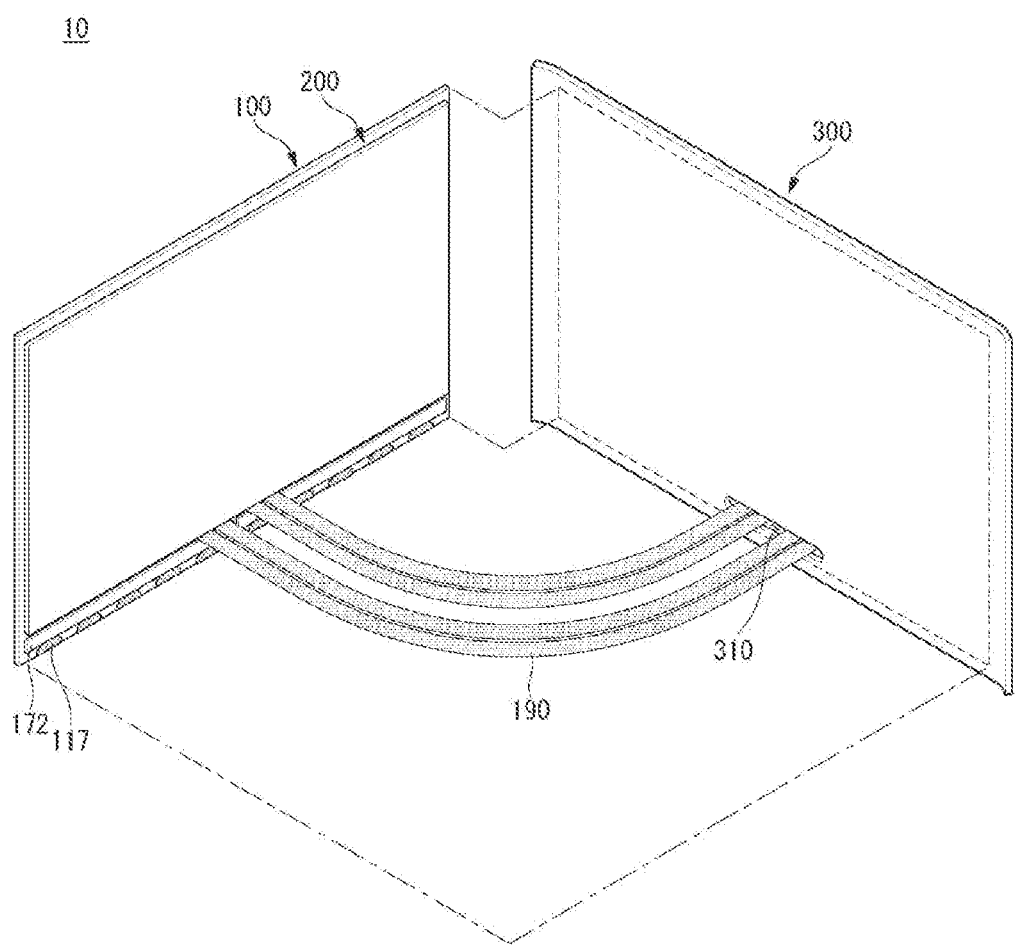

Referring to FIGS. 6 and 7, the cable 190 may extend toward the rear of the frame 300. The cable 190 may extend by passing through a lower portion of the inner plate 200 and penetrating through a slot 310 formed in the frame 300. One end of the cable 190 may pass through the slot 310 to be electrically connected to an electronic component located at the rear of the frame 300.

The inner plate 200 may have a smaller area than the display panel 100. As the cable 190 extends through a space at the lower portion of the inner plate 200, separate processing of the inner plate 200 may not be required.

Figure 8:
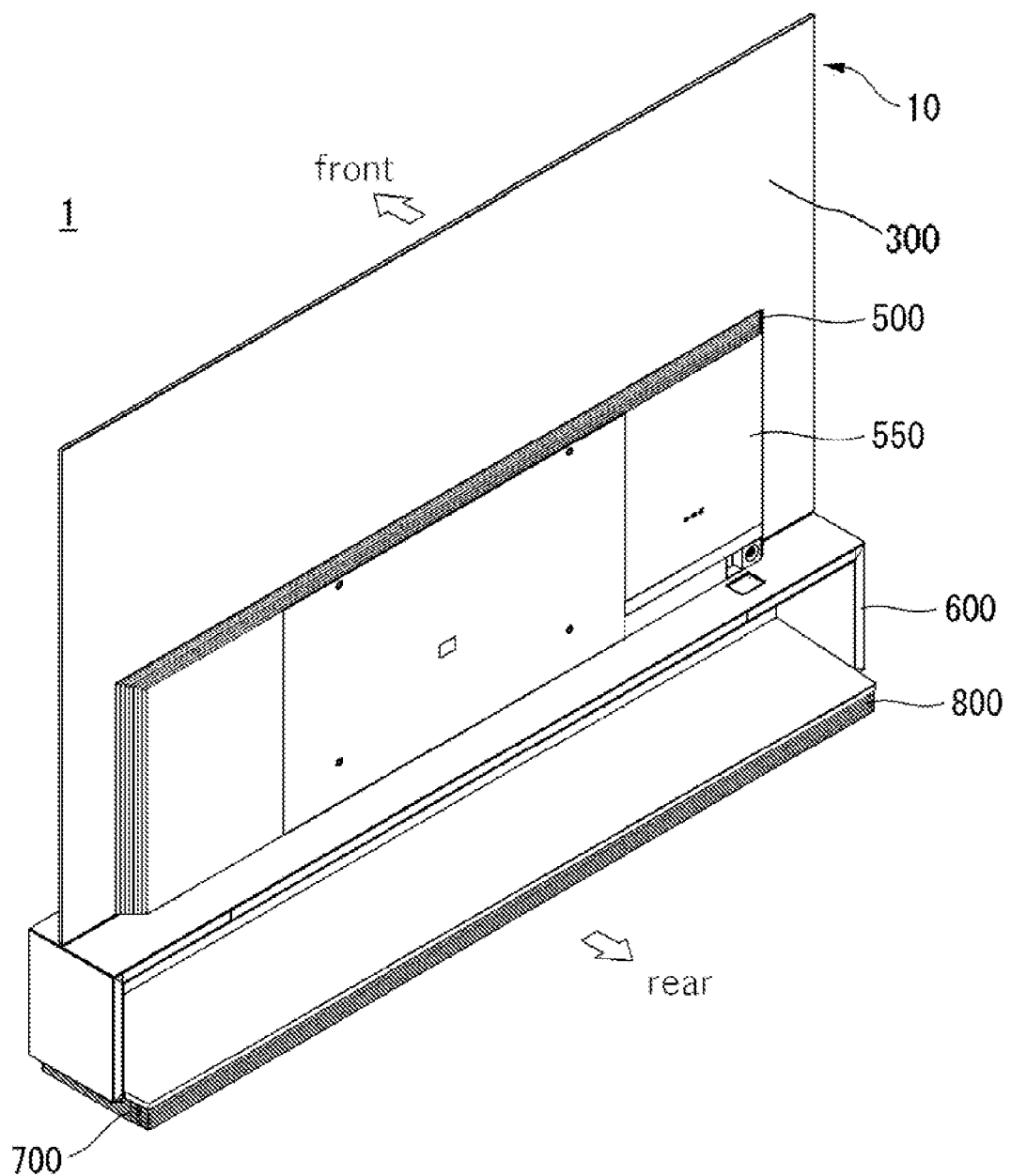
Figure 9:
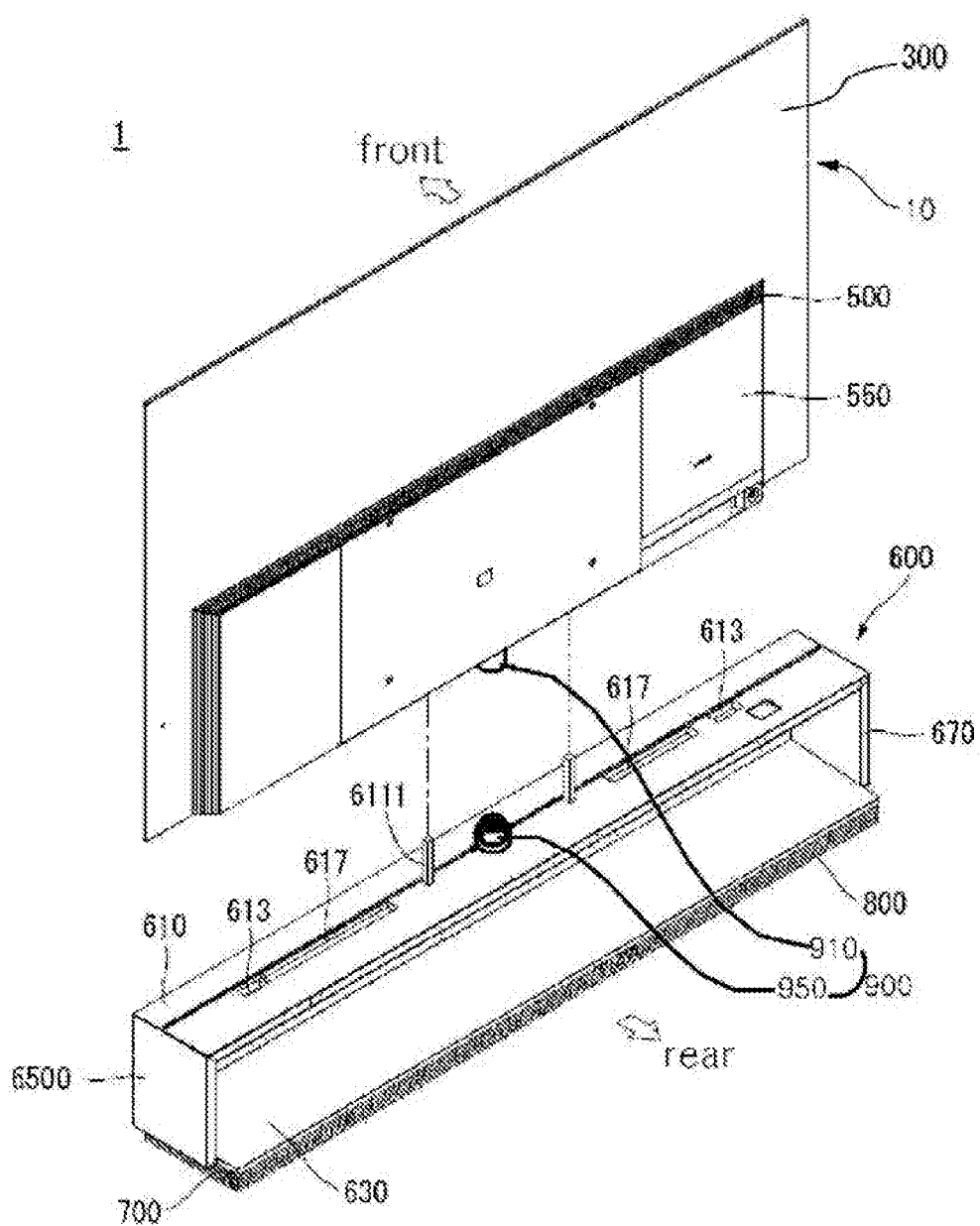

FIGS. 8 and 9 are diagrams illustrating a detailed configuration of a display device according to an embodiment of the present disclosure.

Referring to FIGS. 8 and 9, the display device 1 may include the head 10 and a stand 600 disposed below the head 10. The stand 600 may support the display panel 100 coupled to case members, such as the inner plate 200, the frame 300, the middle cabinet 350, the back cover 500, and the auxiliary cover 550, at the bottom.

The stand 600 may include a top plate 610, a bottom plate 630, a first side plate 6500, and a second side plate 670. Due to a coupling structure of the bottom plate 630, the first side plate 6500, and the second side plate 670, the stand 600 may have a case shape that is open toward the front and the rear.

The top plate 610 may determine a shape of an upper surface of the stand 600. The top plate 610 may be provided with support members for supporting the head 10.

For example, the support members may include a supporter guide 6111. The supporter guide 6111 may have a shape protruding upward from the top plate 610, and may be fixed to a supporter guide hole (not shown) of the frame 300. The supporter guide 6111 may be provided in plurality. The supporter guides 611 may be disposed adjacent to each other in a longitudinal or lengthwise direction of the head 10, namely, in the left-and-right direction. As the plurality of supporter guides 611 are provided, the head 10 can be supported at a plurality of points, allowing shaking and twisting of the head 10 to be effectively restrained and limited.

In another example, the support members may include a supporter guide hole (not shown). The supporter guide 6111 may have a shape protruding downward from the frame 300, and may be fixed to the supporter guide hole of the stand 600. The supporter guide hole may be provided in plurality. The supporter guide holes may be disposed adjacent to each other in the lengthwise direction of the head 10, namely, in the left-and-right direction. As the plurality of supporter guide holes are provided, the head 10 can be supported at a plurality of points, allowing shaking and twisting of the head 10 to be effectively restrained and limited.

The stand 600 may include a bottom accommodating part 700. The bottom accommodating part 700 may be disposed below the bottom plate 630. The bottom accommodating part 700 may provide an accommodation space open toward the rear.

A box 800 having a storage space may be inserted into the accommodation space of the bottom accommodating part 700. The box 800 may be provided to be drawn in and out from the accommodation space of the bottom accommodating part 700 along the front and the rear.

The storage space of the box 800 may accommodate components. The components may include an electronic component disposed at the rear surface of the PCB plate 400 and an electronic component for applying power and/or a signal. For example, the components may include a power supply such as a battery for supplying power to a power distribution unit (PSU) disposed at the rear surface of the PCB plate 400. As will be described later, an electronic component disposed in the box 800 and an electronic component disposed at the rear surface of the PCB plate 400 may be electrically connected to each other through one or more connectors 900. In addition, the components may include a heat dissipation component for dissipating heat generated in the environment of the box 800 to the outside. The box 800 may be slidably inserted into the accommodation space of the bottom accommodating part 700.

A connector 900 may include a first connector 910 and a second connector 950. A plurality of the first connectors 910 and a plurality of the second connectors 950 may be provided in a number corresponding to each other.

For example, any one of the first connector 910 and the second connector 950 may be fixed to the back cover 500 or the periphery of the back cover 500. The other one of the first connector 910 and the second connector 950 may be fixed to an upper portion of the stand 600.

In another example, any one of the first connector 910 and the second connector 950 may be fixed to a distal end of the supporter guide 6111. The other one of the first connector 910 and the second connector 950 may be aligned with the supporter guide hole into which the supporter guide 6111 is inserted, and may be fixed to the head 10 or the stand 600.

Hereinafter, an example in which the first connector 910 is fixed to the back cover 500 or the periphery of the back cover 500, and the second connector 950 is fixed to the upper portion of the stand 600 will be described, but the present disclosure is not limited thereto. In other words, the second connector 950 may be fixed to the back cover 500 or the periphery of the back cover 500, and the first connector 910 may be fixed to the upper portion of the stand 600. Alternatively, the first connector 910 and the second connector 950 may be aligned with the supporter guide 6111 and the supporter guide hole.

The first connector 910 may be fixed to the back cover 500 or the periphery of the back cover 500. A position to which the first connector 910 is fixed is not limited to the back cover 500 or the periphery of the back cover 500, and the first connector 910 may be fixed to a position adjacent to the head 10 and to which a relative position to the head 10 is fixed. The first connector 910 may be disposed downward.

The second connector 950 may be fixed to the upper portion of the stand 600. The second connector 950 may be fixed to the top plate 610. A position to which the second connector 950 is fixed is not limited to the upper portion of the stand 600. A relative position of the second connector 950 may be fixed with respect to the stand 600.

When the stand 600 is coupled to the frame 300 or supports the frame 300, the first connector 910 and the second connector 950 may be coupled to each other and electrically connected to each other. When the first connector 910 and the second connector 950 are coupled to each other, an electronic component disposed on the PCB plate 400 and an electronic component disposed in the box 800 may be electrically connected to each other.

Figure 10:
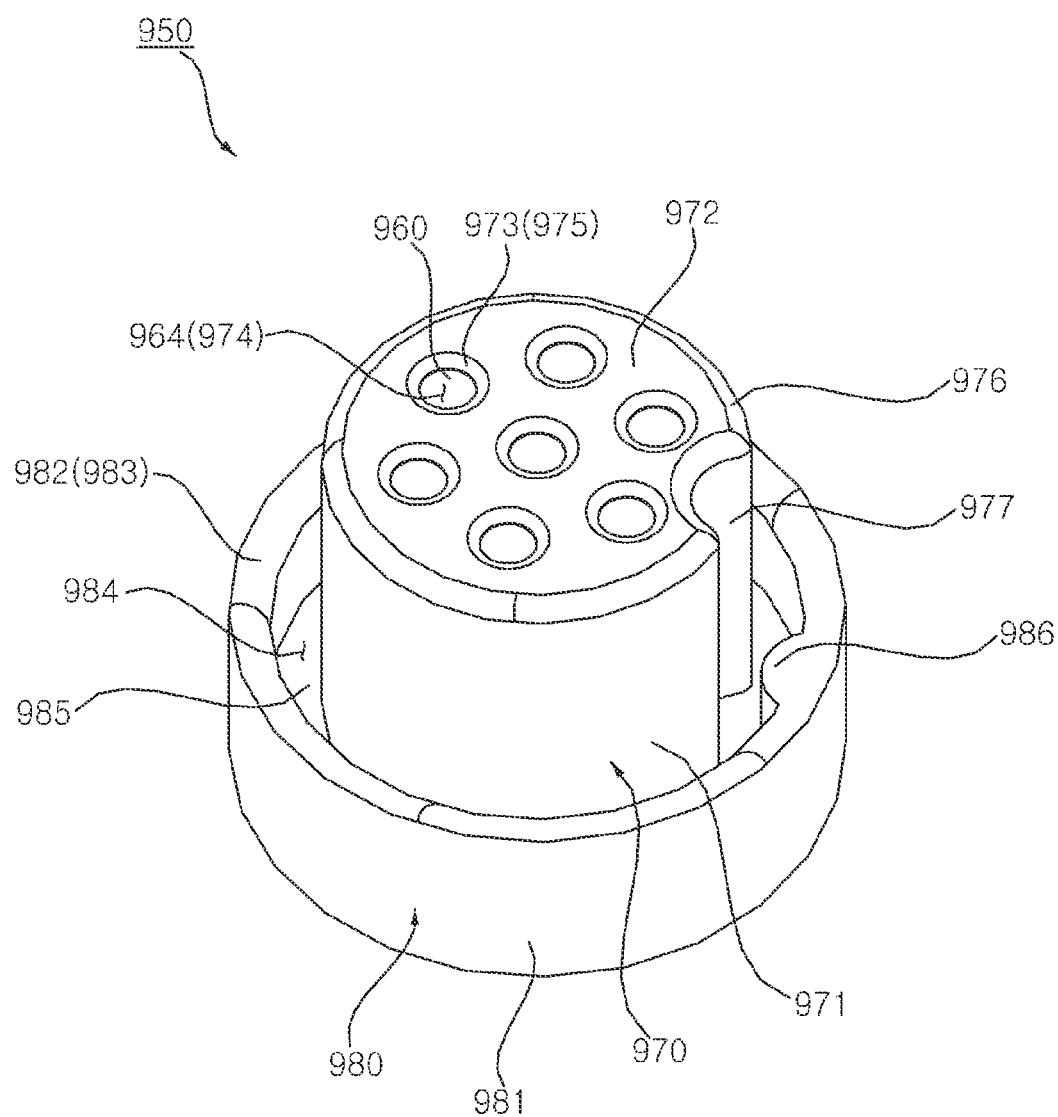
Figure 11:
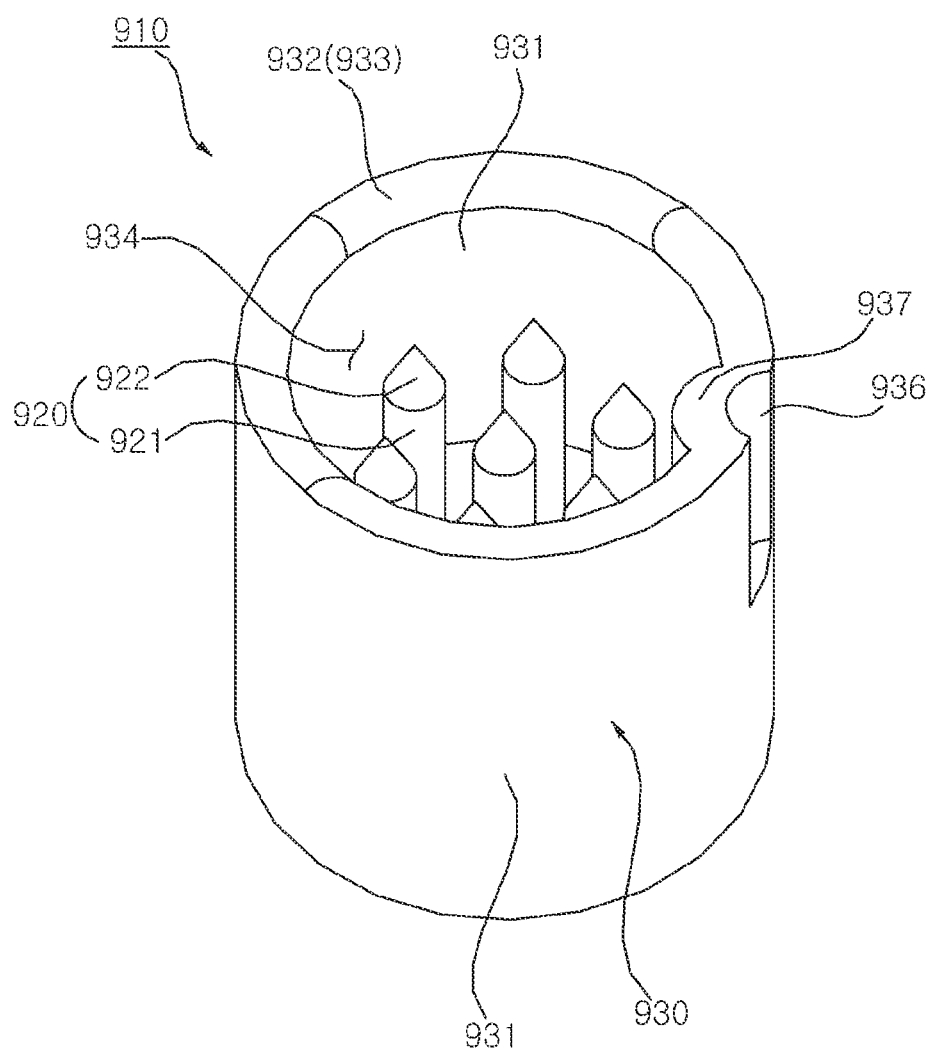
Figure 12:
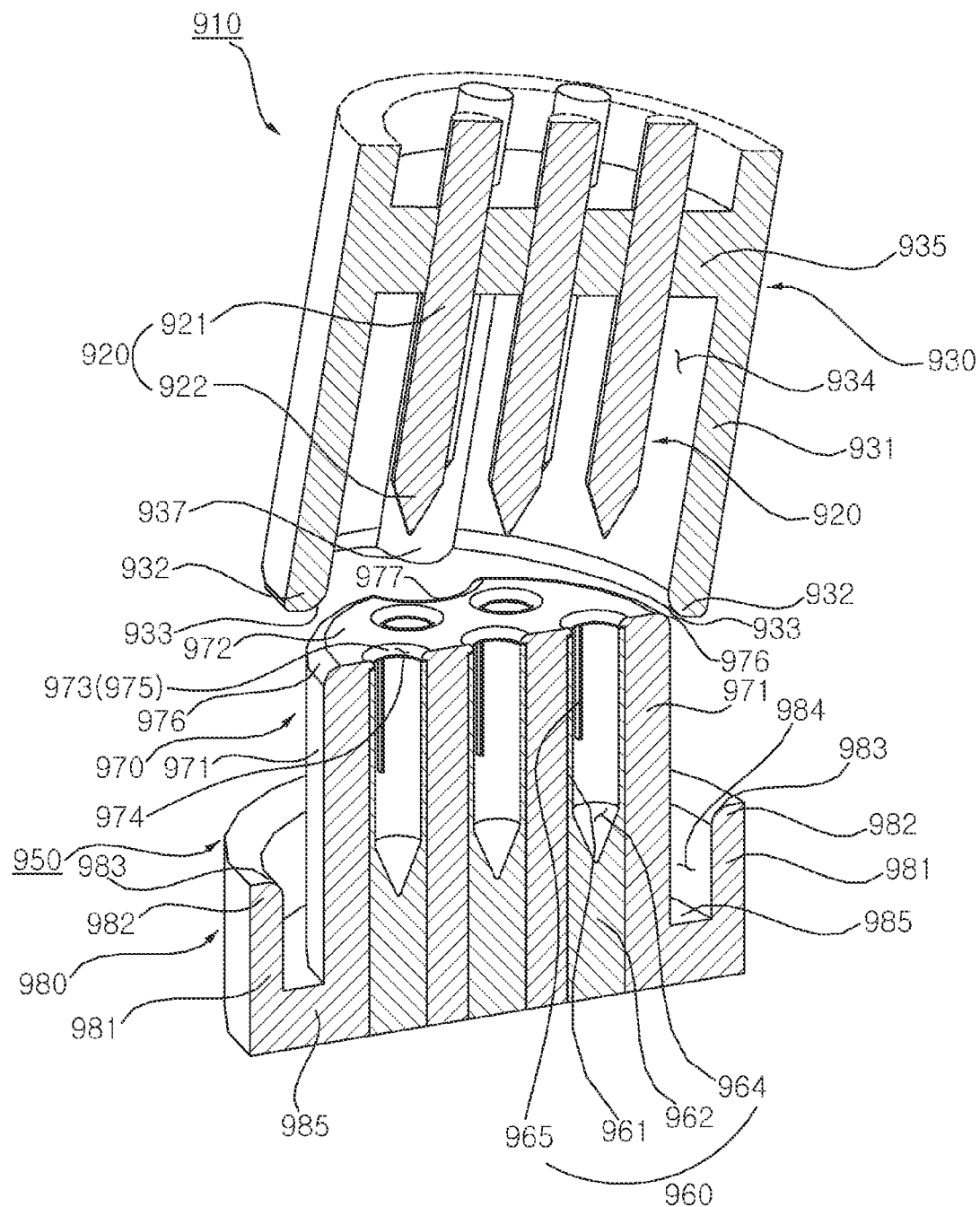

Referring to FIGS. 10 to 12, the first connector 910 may include at least one first pin 920. The first pin 920 may extend long to one side. A direction in which the first pin 920 extends may coincide with an insertion direction in which the first pin 920 is inserted into a first space 964. The first pin 920 may include a pin body 921 that extends long. The pin body 921 may have a cylindrical shape. The first pin 920 may include a pin tip 922 that protrudes from the pin body 921. The pin tip 922 may gradually decrease in a protruding direction. The pin tip 922 may be pointed or convex in the protruding direction.

The first connector 910 may include a first pin housing 930. The first pin housing 930 may include a second space 934 with one side open. A side wall 931 of the first pin housing 930 may surround the circumference of a side portion of the second space 934. The side wall 931 of the first pin housing 930 may extend in a circumferential direction along the circumference of the second space 934. The side wall 931 of the first pin housing 930 may have a cylindrical shape. The first pin housing 930 may block the bottom of the second space 934. The side wall 931 of the first pin housing 930 may be referred to as a first side wall 931.

An upper end 932 of the first side wall 931 may include a first housing guide surface 933 with a convex shape. The first housing guide surface 933 may be convex toward a second space 934. The first housing guide surface 933 may extend along an edge of the first side wall 931.

The first pin housing 930 may accommodate the first pin 920. At least one first pin 920 may be disposed or fixed inside the second space 934. The first pin 920 may extend toward an opening of the second space 934. The first pin housing 930 and the first pin 920 may extend in parallel with each other.

A first protruding portion 937 may convexly protrude inward from an inner circumferential surface of the first side wall 931 toward the second space 934. The first protruding portion 937 may extend in the direction in which the first pin 920 extends or in the insertion direction of the first pin 920. The first protruding portion 937 may have a substantially semicircular shape.

A first recessed portion 936 may be concavely recessed inward from an outer circumferential surface of the first side wall 931. The first recessed portion 936 may extend in the direction in which the first pin 920 extends or in the insertion direction of the first pin 920. The first recessed portion 936 may have a substantially semicircular shape. The first recessed portion 936 may be disposed adjacent to the first protruding portion 937 or disposed side by side with the first protruding portion 937 in a corresponding position.

The second connector 950 may include at least one second pin 960. The second pin 960 may provide the first space 964 that is open to one side. The second pin 960 may extend long to one side. The first space 964 may extend from an inside of the second pin 960 to one side. The first pin 920 may be inserted into the first space 964 to be in contact with the second pin 960. The first space 964 may have a shape corresponding to the first pin 920.

A pin side portion 961 of the second pin 960 may surround the circumference a side portion of the first space 964. The pin side portion 961 of the second pin 960 may extend in the circumferential direction along the circumference of the first space 964. A pin cover 973 may cover an upper end of the pin side portion 961 of the second pin 960.

The second connector 950 may include a second pin housing 970. The second pin housing 970 may include a side wall 971 and a cover 972. The second pin housing 970 may accommodate at least one second pin 960. The second pin housing 970 may include an accommodation space in which the second pin 960 is accommodated. The second pin housing 970 may include an insertion hole 974. The insertion hole 974 may be formed by opening the cover 972 of the second pin housing 970. The insertion hole 974 may communicate with the accommodation space of the second pin housing 970. The insertion hole 974 may communicate with an opening of the first space 964. The insertion hole 974 may be provided in a number corresponding to the second pin 960. The side wall 971 of the second pin housing 970 may be referred to as a second side wall 971.

The second pin housing 970 may have a surface (976). The second side wall 971 and the cover 972 may be connected to each other by a second housing guide surface 976 with a curved shape. The second housing guide surface 976 may be convex outward of the second pin housing 970. The second housing guide surface 976 may extend along an edge of the second pin housing 970.

The second pin housing 970 may include a second recessed portion 977. The second recessed portion 977 may be formed such that an outer circumferential surface of the second side wall 971 is recessed inward. The second recessed portion 977 may extend toward the cover 972 of the second pin housing 970, and may be open in an extended direction. The second recessed portion 977 may extend in the insertion direction of the first pin 920. The cover 972 may not cover the second recessed portion 977. The second recessed portion 977 may be recessed in a shape corresponding to a shape of the first protruding portion 937.

The second connector 950 may include a third pin housing 980. The third pin housing 980 may surround one side of the second pin housing 970. The third pin housing 980 may include a side wall 981 and a bottom 985. The side wall 981 of the third pin housing 980 may be outwardly spaced apart from the side wall 971 of the second pin housing 970. The side wall 981 of the third pin housing 980 may extend along the circumference of the side wall 971 of the second pin housing 970. A third space 984 may be formed between the side wall 981 of the third pin housing 980 and the side wall 971 of the second pin housing 970. The side wall 981 of the third pin housing 980 may be lower in height than the side wall 971 of the second pin housing 970. One side of the third space 984 may be open, and another side of the third space 984 may block the bottom 985 of the third pin housing 980. The side wall 981 of the third pin housing 980 may be referred to as a third side wall 981.

An upper end of the third side wall 981 may have a third housing guide surface 983 with a convex shape. The third housing guide surface 983 may be convex toward the third space 984. The third housing guide surface 983 may extend along an edge of the third side wall 981.

A second protruding portion 986 may protrude inward from an inner circumferential surface of the third side wall 981 toward the third space 984. The second protruding portion 986 may be disposed adjacent to the second recessed portion 977 or disposed in parallel with the second recessed portion 977 in a position corresponding to the second recessed portion 977. The second protruding portion 986 may protrude in a shape corresponding to a shape of the first recessed portion 936. The second protruding portion 986 may extend in the insertion direction of the first pin 920.

The first connector 910 and the second connector 950 may be coupled to each other. The first pin 920 of the first connector 910 may penetrate through the insertion hole 974 and then be inserted into the first space 964 of the second pin 960, allowing the first pin 920 to be in contact with the second pin 960. As the first pin 920 and the second pin 960 are in contact with each other, the first pin 920 and the second pin 960 may be electrically connected to each other.

The second pin housing 970 may be inserted into the second space 934 of the first pin housing 930. When the second pin housing 970 is inserted into the second space 934, the outer circumferential surface of the second side wall 971 may slide on the inner circumferential surface of the first side wall 931. As the first housing guide surface 933 is brought into contact with the second side wall 971 or the second housing guide surface 976, the second pin housing 970 may be guided to be inserted into the second space 934. As the second housing guide surface 976 is brought into contact with the first side wall 931 or the first housing guide surface 933, the second pin housing 970 may be guided to be inserted into the second space 934. The first side wall 931 may be inserted into the third space 984 between the second side wall 971 and the third side wall 981. As the third housing guide surface 983 is brought into contact with the first side wall 931, allowing the first side wall 931 to be guided to the third space 984.

When the first connector 910 and the second connector 950 are coupled to each other, the second protruding portion 986 may be inserted into the first recessed portion 936. The second protruding portion 986 may be slide onto the first recessed portion 936 in the insertion direction. The first protruding portion 937 may be inserted into the second recessed portion 977. The first protruding portion 937 may be slide onto the second recessed portion 977 in the insertion direction.

Accordingly, the coupling of the first connector 910 and the second connector 950 can be achieved in an easier manner, and damage of the structure during the coupling can be minimized or reduced.

Figure 13:
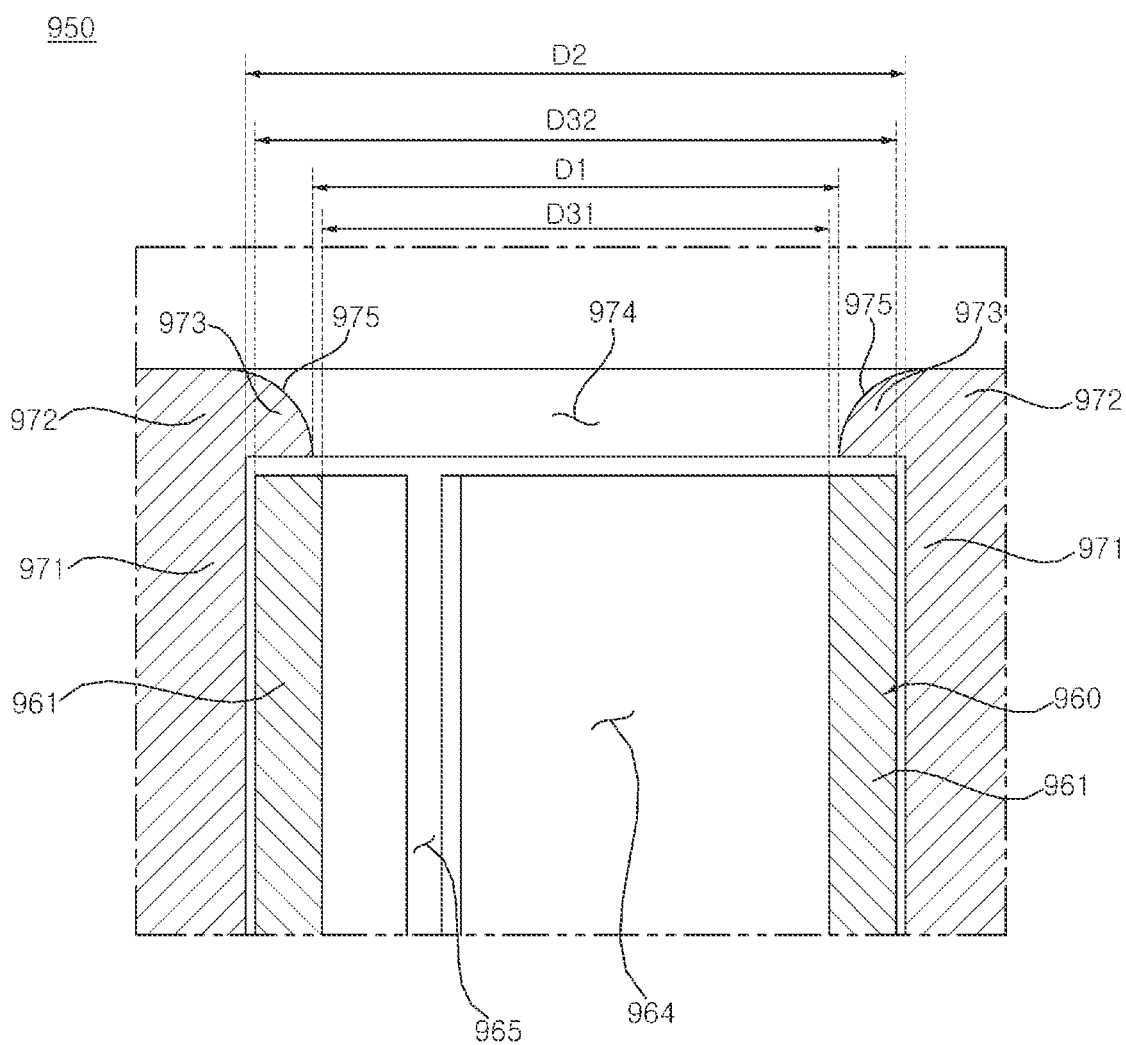

Referring to FIG. 13, the second pin 960 may be open to one side, and the first space 964 into which the first pin 920 (see FIG. 12) is inserted may be formed. The second pin housing 970 may accommodate the second pin 960 and include the insertion hole 974 in communication with the opening of the first space 964. The pin cover 973 may cover at least a portion of the second pin 960 in the periphery of the insertion hole 974. The pin cover 973 may surround a side portion of the insertion hole 974. The insertion hole 974 may communicate with the first space 964 in the insertion direction of the first pin 920 (see FIG. 12).

The second pin 920 may include the pin side portion 961 surrounding the first space 964. The upper end of the pin side portion 961 may be open toward the insertion hole 974. The pin side portion 961 may have a cylindrical shape in which the first space 964 is formed and that is open upward. The first space 964 may have a shape corresponding to an outer circumferential surface of the pin body 921 of the first pin 920. The pin side portion 961 may extend in the circumferential direction. A portion of the pin side portion 961 may be cut in the insertion direction of the first pin 920 (see FIG. 12) to be configured as a C-type pin having a shape of a cut space 965.

Figure 19:
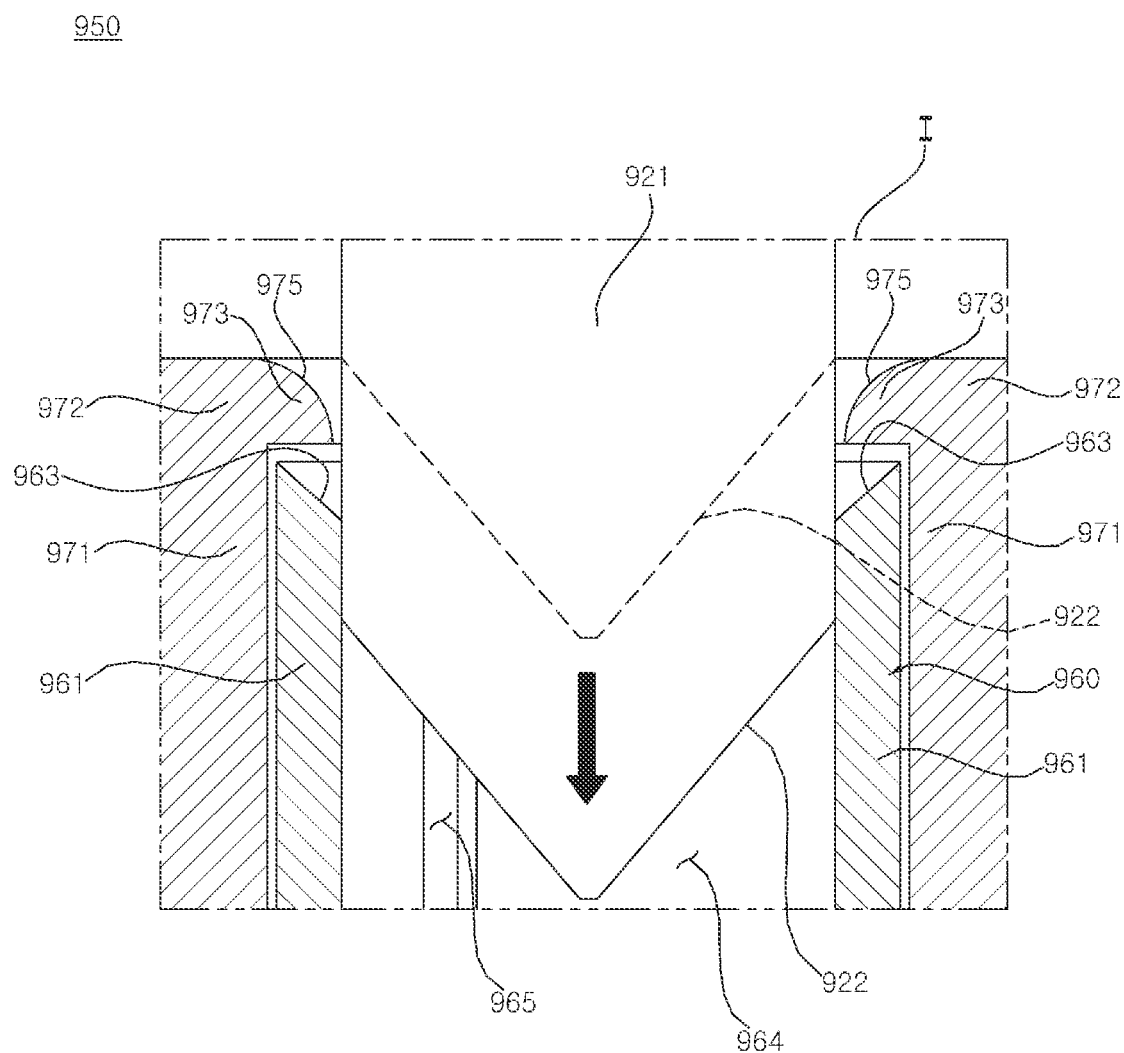

Accordingly, when the first pin 920 (see FIG. 12) is inserted into the first space 964, the first pin 920 may be brought into contact with an inner circumferential surface of the pin side portion 961 and then be inserted into the first space 964 while spreading the pin side portion 961 radially outward, allowing the first pin 920 to be in contact with the second pin 960 (see FIG. 19).

The second side wall 971 may surround the pin side portion 961 in a circumference direction. The pin cover 973 may protrude inward from an inner circumferential surface of an upper end of the second side wall 971 toward the insertion hole 974. The pin cover 973 may protrude radially inward from the inner circumferential surface of the upper end of the second side wall 971 along the circumferential direction. The pin cover 973 may extend in the circumferential direction along the inner circumferential surface of the upper end of the second side wall 971. A width D1 of an inner circumferential surface of the pin cover 973 may be less than a width D2 of an inner circumferential surface of the second side wall 971.

The pin cover 973 may cover at least a portion of the upper end of the pin side portion 961. The pin cover 973 may be disposed above the pin side portion 961. The pin cover 973 may at least partially overlap the pin side portion 961 in the insertion direction of the first pin 920. The pin cover 973 may cover the upper end of the pin side portion 961 but may not cover the first space 964.

In a state before the first pin 920 is inserted into the first space 964, the inner circumferential surface of the pin side portion 961 may overlap an outer circumferential surface of the insertion hole 974, or may be disposed more inward than the outer circumferential surface of the insertion hole 974. A width D31 of the first space 964 or a width D31 of the inner circumferential surface of the pin side portion 961 may be equal to or less than a minimum width D1 of the insertion hole 974. A width D32 of an outer circumferential surface of the pin side portion 961 may be greater than the minimum width D1 of the insertion hole 974. The width D32 of the outer circumferential surface of the pin side portion 961 may be less than the width D2 of the inner circumferential surface of the second side wall 971. The first pin 920 (see FIG. 12) may pass through the insertion hole surrounded by the pin cover 973 to be in contact with the second pin 960.

Accordingly, when the first pin 920 (see FIG. 12) is inserted into the first space 964, the first pin 920 (see FIG. 12) is caught by the upper end of the pin side portion 961 to thereby minimize damage of the first pin 920 or the second pin 960 (see FIG. 19). Further, as the first pin 920 is inserted without being caught by the pin side portion 961, the first connector 910 and the second connector 950 can be coupled to each other in an easier manner (see FIG. 19).

The pin cover 973 may have a pin guide surface 975. The pin guide surface 975 may surround the insertion hole 974. The pin guide surface 975 may be formed on the inner circumferential surface of the pin cover 973. The pin guide surface 975 may be formed such that a width of the insertion hole 974 gradually decreases toward the insertion direction of the first pin 920 (see FIG. 12). The pin guide surface 975 may be convex toward the insertion hole 974.

Accordingly, when the first pin 920 (see FIG. 12) passes through the insertion hole 974, the pin guide surface 975 is brought into contact with the first pin 920 to thereby guide the first pin 920 to the first space 964 (see FIG. 19). Further, the first connector 910 and the second connector 950 can be coupled to each other in an easier manner.

Figure 14:
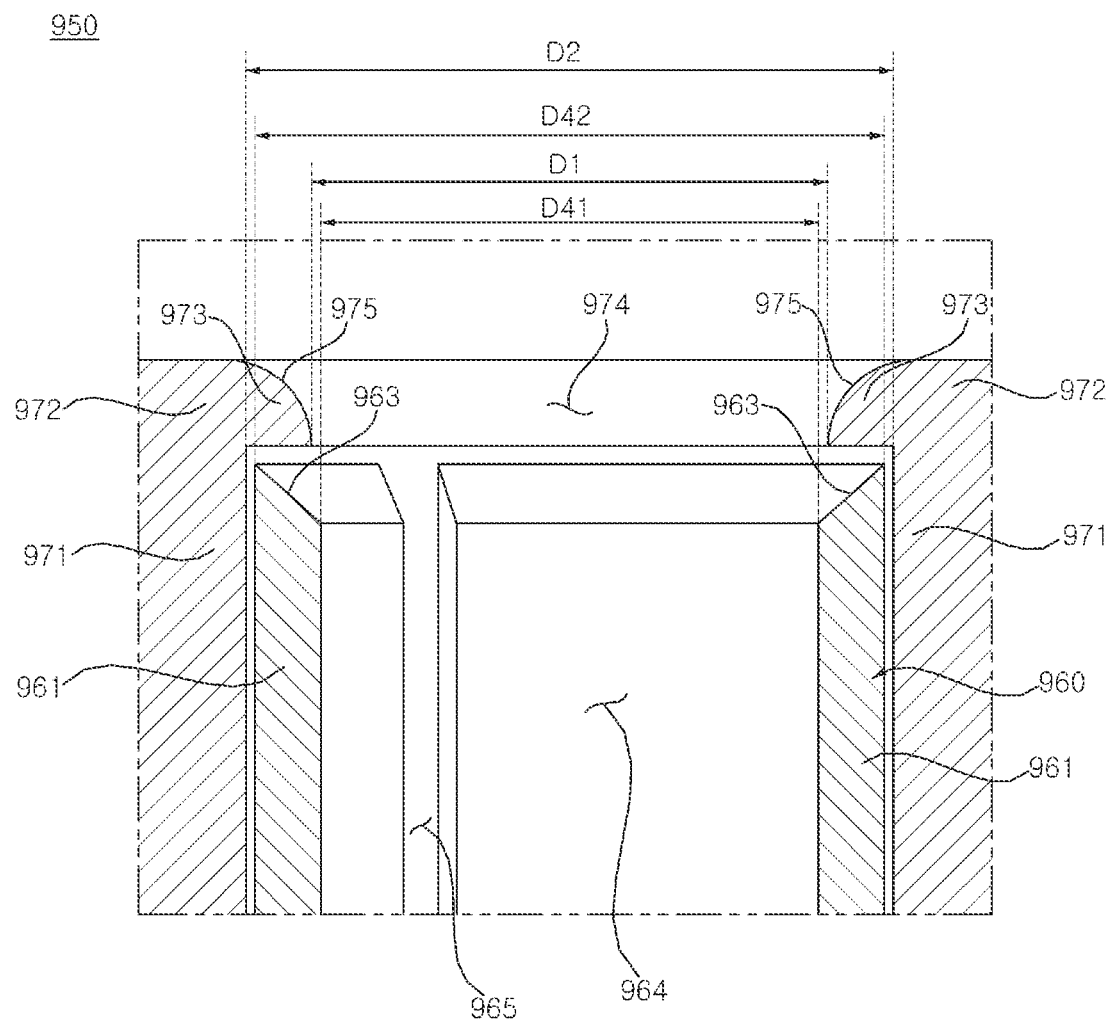
Figure 15:
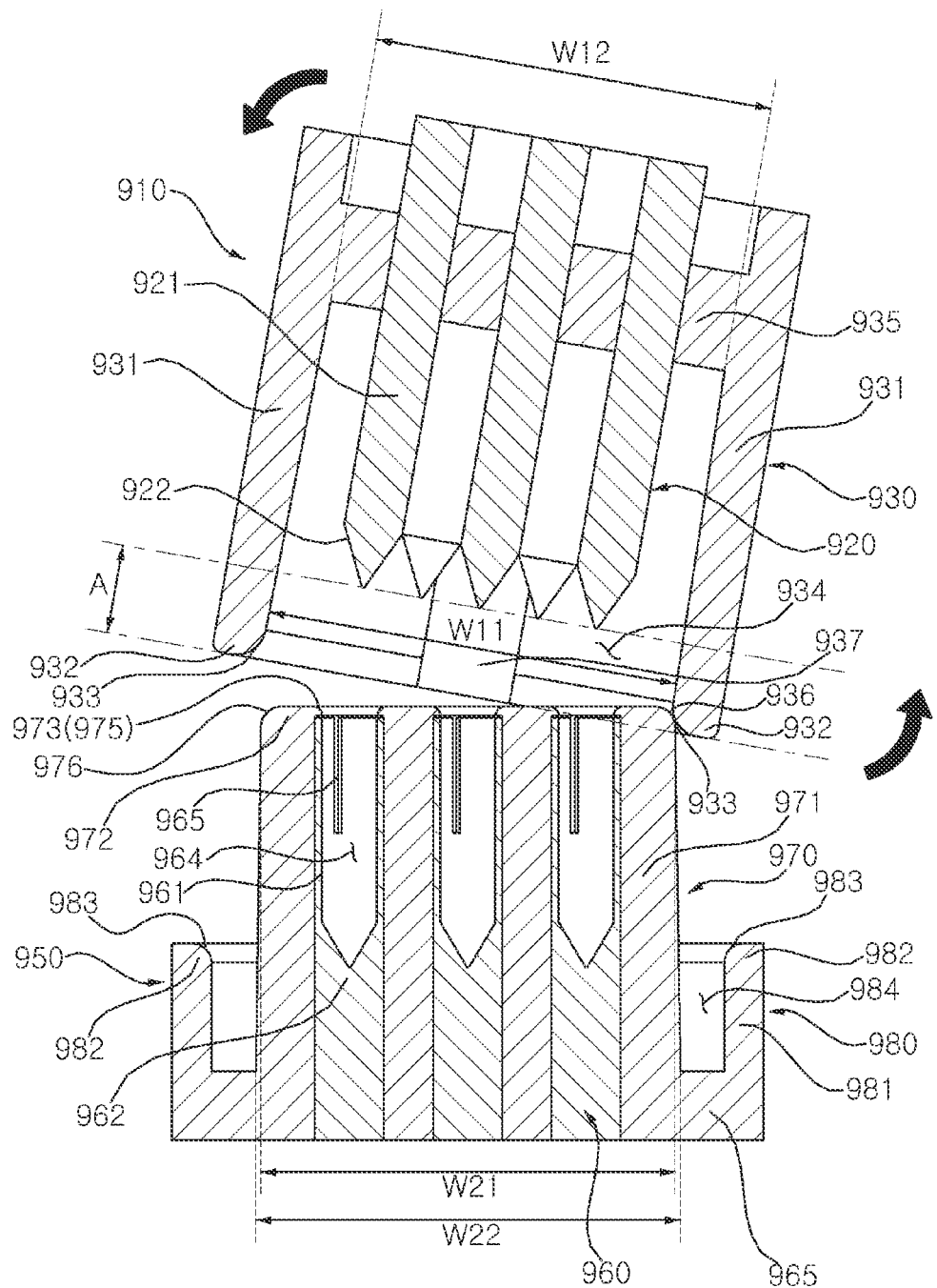
Figure 16:
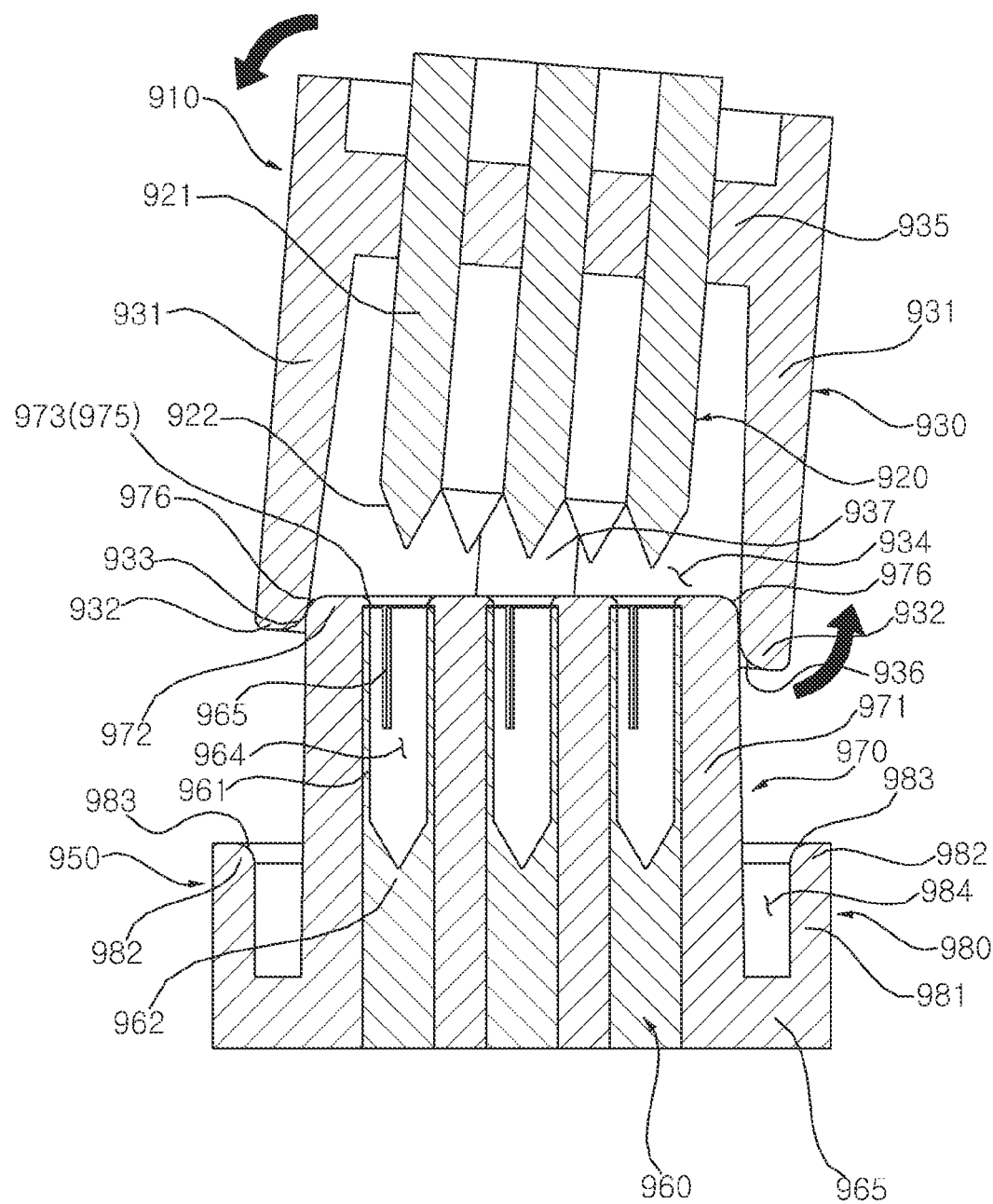
Figure 17:
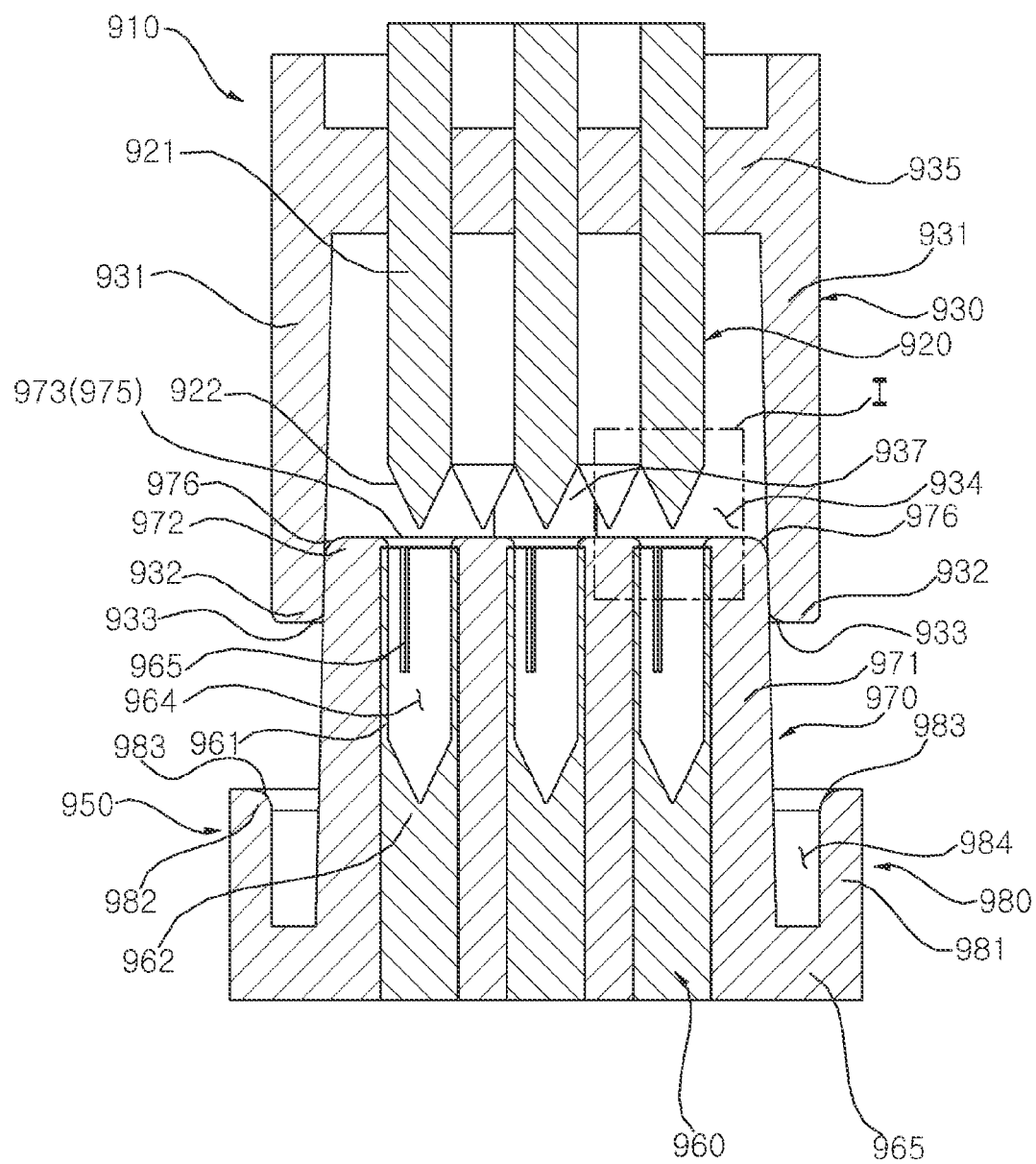
Figure 18:
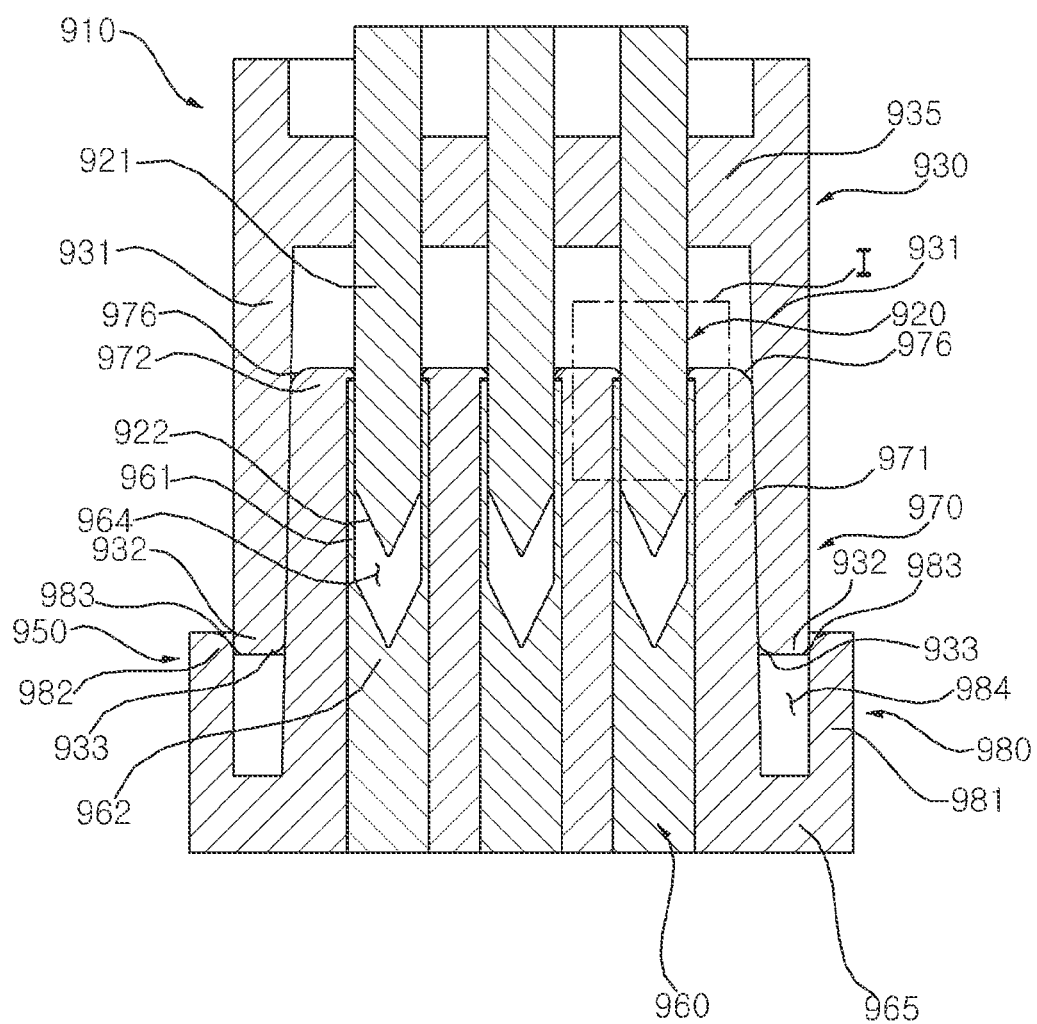

Referring to FIG. 14, an upper end of the pin side portion 961 may include an inclined surface 963 formed in an inclined manner. The inclined surface 963 may be inclined such that a width of the first space 964 gradually decreases along the insertion direction of the first pin 920 (see FIG. 12). The inclined surface 963 may extend from the upper end of the pin side portion 961 toward the inner circumferential surface of the pin side portion 961 in an inclined manner. An upper end of the inclined surface 963 may be connected to the upper end of the pin side portion 961, and a lower end of the inclined surface 963 may be connected to the inner circumferential surface of the pin side portion 961. The inclined surface 963 may extend in the circumferential direction along the pin side portion 961.

The inclined surface 963 may include a portion that overlaps the insertion hole 974 in the insertion direction of the first pin 920 (see FIG. 12). A width D41 of the lower end of the inclined surface 963 may coincide with the width D31 of the inner circumferential surface of the pin side portion 961. The width D41 of the lower end of the inclined surface 963 may be less than the width D1 of the insertion hole 974. A width D42 of the upper end of the inclined surface 963 may be greater than the width D1 of the insertion hole 974.

Referring to FIGS. 15 to 19, the first pin housing 930 may include the second space 934. The first pin 920 may be disposed in the second space 934. The second space 934 may be open to one side. The first pin housing 930 may surround the remaining portion except the one open side of the second space 934.

The first pin housing 970 may be inserted into the second space 934. When the second pin housing 970 is inserted into the second space 934, the outer circumferential surface of the second side wall 971 may slide on the inner circumferential surface of the first side wall 931. As the first housing guide surface 933 is brought into contact with the second side wall 971 or the second housing guide surface 976, the second pin housing 970 may be guided to be inserted into the second space 934. As the second housing guide surface 976 is brought into contact with the first side wall 931 or the first housing guide surface 933, the second pin housing 970 may be guided to be inserted into the second space 934. The first side wall 931 may be inserted into the third space 984 between the second side wall 971 and the third side wall 981. As the third housing guide surface 983 is brought into contact with the first side wall 931, allowing the first side wall 931 to be guided to the third space 984.

An inner circumferential surface of the first pin housing 930 may be inclined such that the opening of the second space 934 gradually decreases in an insertion direction of the second pin housing 970. The inner circumferential surface of the first side wall 931 surrounding the side portion of the second space 934 may gradually decreases in the insertion direction of the second pin housing 970. The inner circumferential surface of the first side wall 931 may have a tapered shape. The insertion direction of the second pin housing 970 may be the same as the insertion direction of the first pin 920. An upper width w11 of the inner circumferential surface of the first side wall 931 may be greater than a lower width w12 of the inner circumferential surface of the first side wall 931.

An outer circumferential surface of the second pin housing 970 may be inclined to gradually increase in the insertion direction of the second pin housing 970. The outer circumferential surface of the second side wall 971 may gradually increase in the insertion direction of the second pin housing 970. The outer circumferential surface of the second side wall 971 may have a tapered shape. The outer circumferential surface of the second side wall 971 may have a shape corresponding to the inner circumferential surface of the first side wall 931. An upper width w21 of the outer circumferential surface of the second side wall 971 may be less than a lower width w22 of the outer circumferential surface of the second side wall 971.

Accordingly, when the second pin housing 970 is inserted into the second space 934 of the first pin housing 930, the first side wall 931 and the second side wall 971 may stably slide to each other, allowing the position to be guided.

In a state that an upper end portion of the second pin housing 970 is inserted into the second space 934, the first pin 920 and the second pin 960 may be disposed to be aligned with each other. When the upper end portion of the second pin housing 970 is inserted into the second space 934, the inner circumferential surface of the first pin housing 930 and the outer circumferential surface of the second pin housing 970 may be brought into contact with each other, allowing the first pin 920 and the second pin 960 to be aligned with each other.

In a state that the first pin 920 and the second pin 960 are not arranged in line, the first pin 920 and the second pin 960 may be separated from each other by the inner circumferential surface of the first pin housing 930 and the outer circumferential surface of the second pin housing 970, allowing a specific separation distance to be secured. An end of the first pin housing 930 may protrude more than the first pin 920. An end of the second pin housing 970 may protrude more than the second pin 960. For example, an end of the first pin 920 and the end of the first pin housing 930 may be spaced apart from each other by a predetermined distance A in the insertion direction of the first pin 920.

Accordingly, although the first pin housing 930 and the second pin housing 970 are brought into contact with each other in an inclined manner in the insertion direction of the second pin housing 970, the first pin housing 930 and the second pin housing 970 may be disposed to be aligned with each other when the upper end portion of the second pin housing 970 is inserted into the second space 934. As the upper end portion of the second pin housing 970 is inserted into the second space 934, even when the first pin 920 and the second pin 960 approach each other in a direction inclined with respect to the insertion direction of the first pin 920, the first pin 920 and the second pin 960 may be disposed to be aligned with each other before the first pin 920 is inserted into the first space 964 of the second pin 960.

Thus, breakage of the first pin 920 and the second pin 960, caused by colliding with each other, can be minimized when the first pin 920 is inserted into the first space 964.

Figure 20:
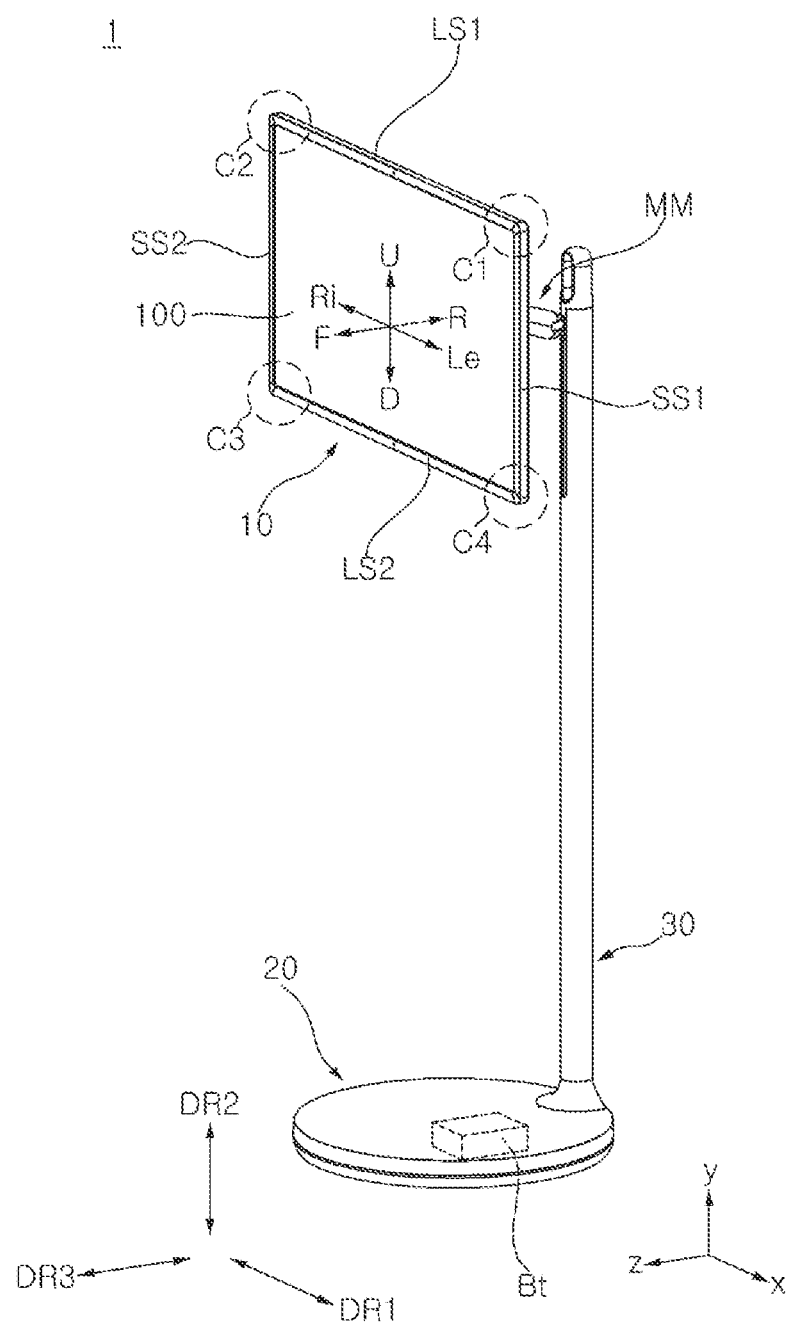
Figure 21:
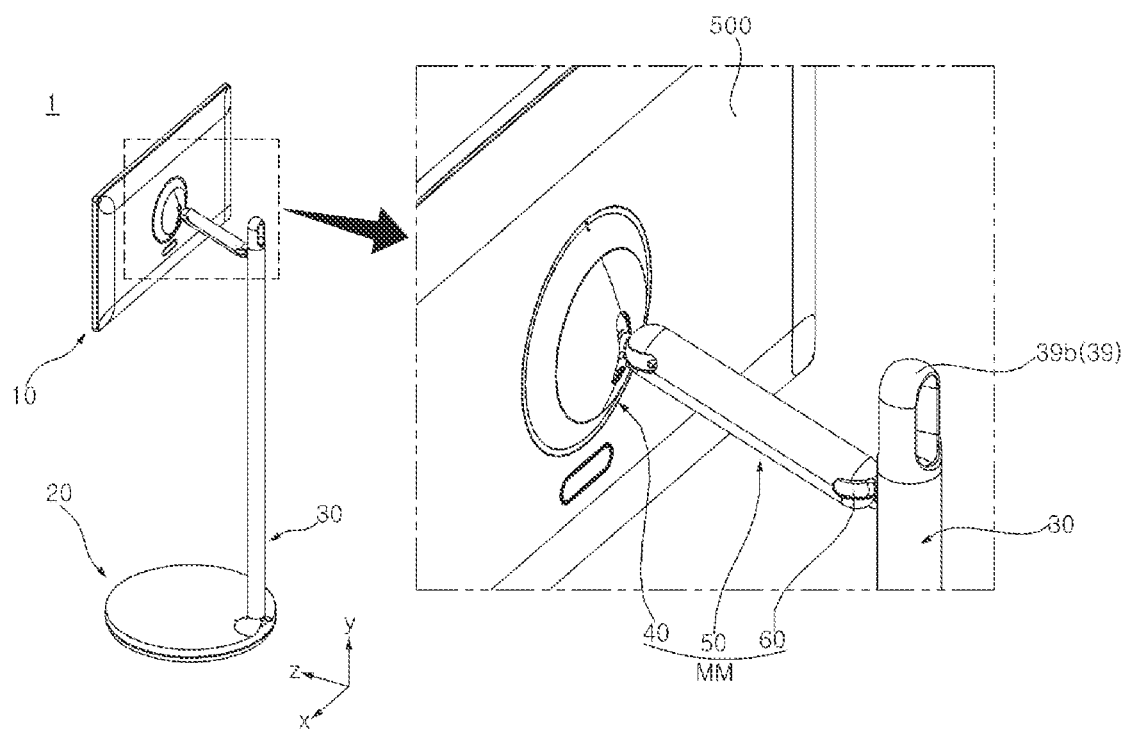

Referring to FIGS. 20 and 21, the display device 1 may include a base 20, a pole 30, and a motion module MM.

The base 20 may have a flat cylinder shape. The base 20 may be placed on the ground.

The pole 30 may extend long in the vertical direction. A lower end of the pole 30 may be coupled onto the base 20. The pole 30 may be adjacent to the circumference of an upper surface of the base 20. A handle 39 may be coupled to an upper end of the pole 30.

The motion module MM may extend in a direction intersecting the pole 30. One side of the motion module MM may be coupled to a rear side of the head 10. Another side of the motion module MM may be adjacent to the upper end of the pole 30 or coupled to the pole 30. An articulated connector 40 may be coupled to the rear side of the head 10, an elevating module 60 may be coupled to the pole 30, and an arm 50 may connect the articulated connector 40 and the elevating module 60.

Accordingly, the head 10 may be supported by the motion module MM, the pole 30, and the base 20, and may be spaced upward from the ground.

Meanwhile, the motion module MM, the pole 30, and the base 20 may be collectively referred to as a stand. Alternatively, the pole 30 and the base 20 may be collectively referred to as a stand. The pole 30 may be fixed to the head 10 by a motion module MM and may be coupled to or separated from the base 20.

Figure 22:
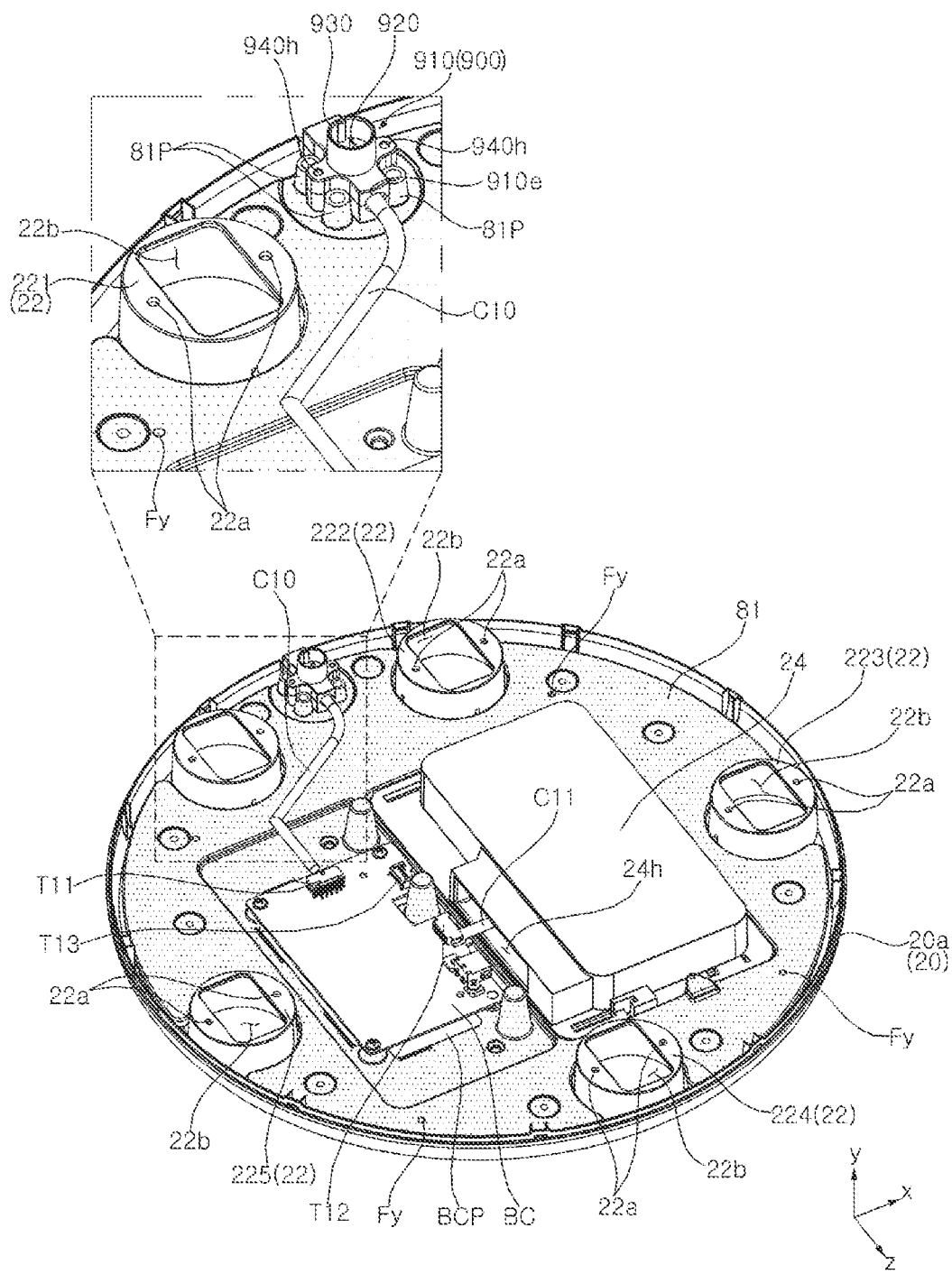

Referring to FIG. 22, a lower body 20a of the base 20 may define a lower surface of the base 20, and may have a round tray shape that is open upward.

A flat weight 81 may be disposed on the lower body 20a, and may be coupled to the lower body 20a. For example, the flat weight 81 may be formed by die casting including a material such as aluminum (Al). A recessed part 22 may be formed by being pressed upward from a lower surface of the lower body 20a. For example, a plurality of recessed portions 221, 222, 223, 224, and 225 may be disposed along the circumference of the lower body 20a.

A seating portion 24 may be formed by being pressed upward from the lower surface of the lower body 20a, and may penetrate through the flat weight 81. A battery Bt (see FIG. 20) may be accommodated in the seating portion 24. A substrate BC may be mounted on the flat weight 81.

The first connector 910 may be disposed on the flat weight 81. A coupling portion 81P may protrude upward from an upper surface of the flat weight 81, and may be disposed in the periphery of the first connector 910. The first connector 910 may be referred to as a bottom docking connector. In some embodiments, instead of the first connector 910, the second connector 950 may be disposed on the flat weight 81.

Figure 23:
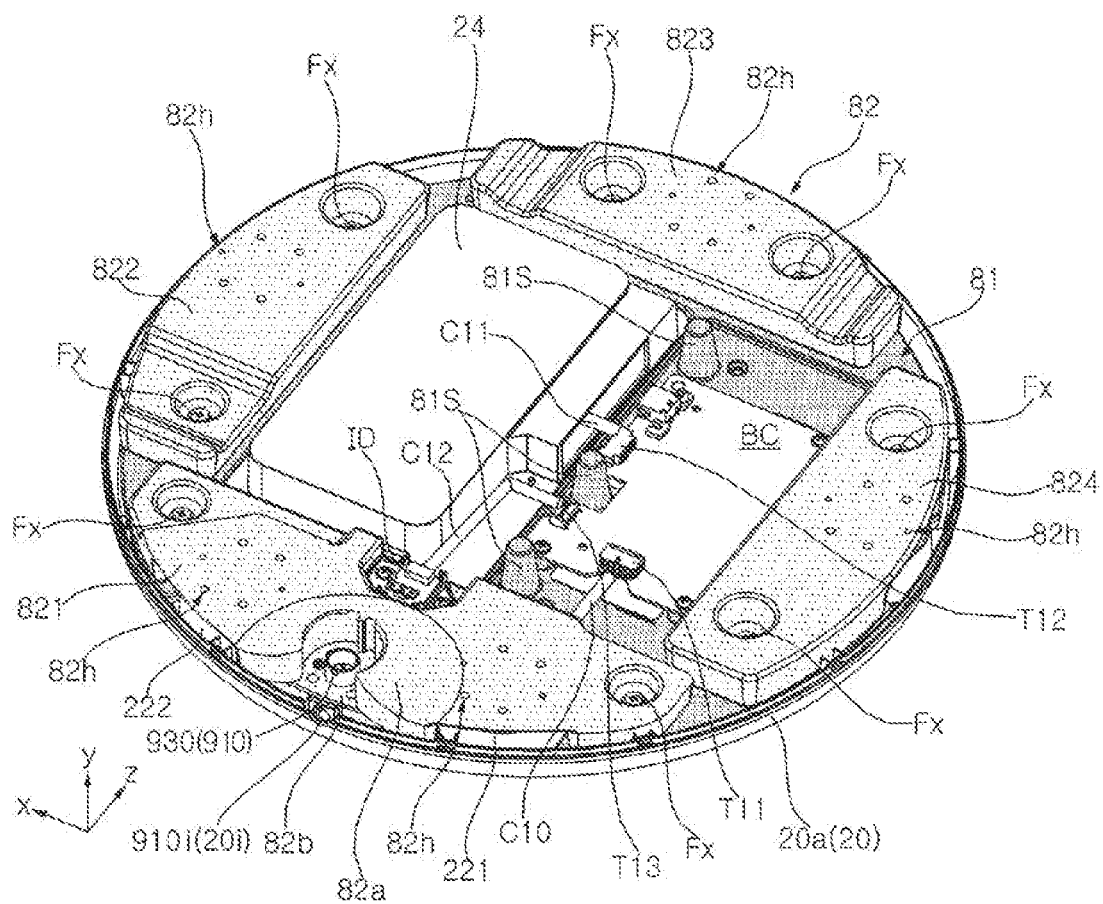

Referring to FIG. 23, a weight 82 may be disposed on the flat weight 81 or coupled to the flat weight 81. For example, the weight 82 may be a casting including a material such as iron (Fe). For instance, a plurality of weights 821, 822, 823, and 824 may be disposed along the circumference of the lower body 20a. The plurality of weights 821, 822, 823, and 824 may cover the plurality of recessed portions 221, 222, 223, 224, and 225.

The first pin housing 930 of the first connector 910 may be formed through the first weight 821. A fastening member such as a screw 910F (see FIG. 29) may penetrate through the first weight 821 in the periphery of the first pin housing 930, and may be coupled to a coupling hole 940h (see FIG. 28) of the first connector 910. Accordingly, the first connector 910 may be coupled to the first weight 821 between the flat weight 81 and the first weight 821.

A ridge 82a may be formed at a central portion of the first weight 821 and have a monticule shape. The ridge 82a may be formed in the periphery of the first pin housing 930 of the first connector 910. The ridge 82a may correspond to a shape of a port 21 (see FIG. 24) of an upper body 20b, and may support the port 21.

One end of a first cable C10 may be electrically connected to one side 910e (see FIG. 22) of the first connector 910, and another end of the first cable C10 may be electrically connected to a first terminal T11 of the substrate BC. A portion of the first cable C10 may be disposed between the flat weight 81 and the first weight 821.

One end of a second cable C11 may be electrically connected to a second terminal T12 of the substrate BC, and another end of the second cable C11 may be electrically connected to the battery Bt (see FIG. 1) accommodated in the seating portion 24. A portion of the second cable C11 may penetrate through a side wall of the seating portion 24.

One end of a third cable C12 may be electrically connected to a third terminal T13 of the substrate BC, and another end of the third cable C12 may be electrically connected to an indicator ID mounted on the first weight 821. The indicator ID may detect the remaining amount of the battery Bt (see FIG. 1). A light-emitting diode IDL (see FIG. 24) of the indicator ID may be provided at the upper body 20b to display the remaining amount of the battery Bt to a user.

A power cable may be electrically connected to a jack 910i provided at another side of the first connector 910. The jack 910i may be referred to as a port or a connector.

For example, the power cable may be connected to the jack 910i. External power may be supplied to the battery Bt (see FIG. 1) through the power cable, the first connector 910, the first cable C10, the first terminal T11, the substrate BC, the second terminal T12, and the second cable C11, allowing the battery Bt to be charged. That is, the battery Bt may be a rechargeable battery. The first and second cables C10 and C11 may be referred to as stand-side cables C10 and C11.

For example, the power cable may be separated from the jack 910i. Power of the battery Bt may be supplied to the head 10 through the second cable C11, the second terminal T12, the substrate BC, the first terminal T11, the first cable C10, the first connector 910, the second connector 950, and a cable C. The cable C may be referred to as a head-side cable C.

Figure 24:
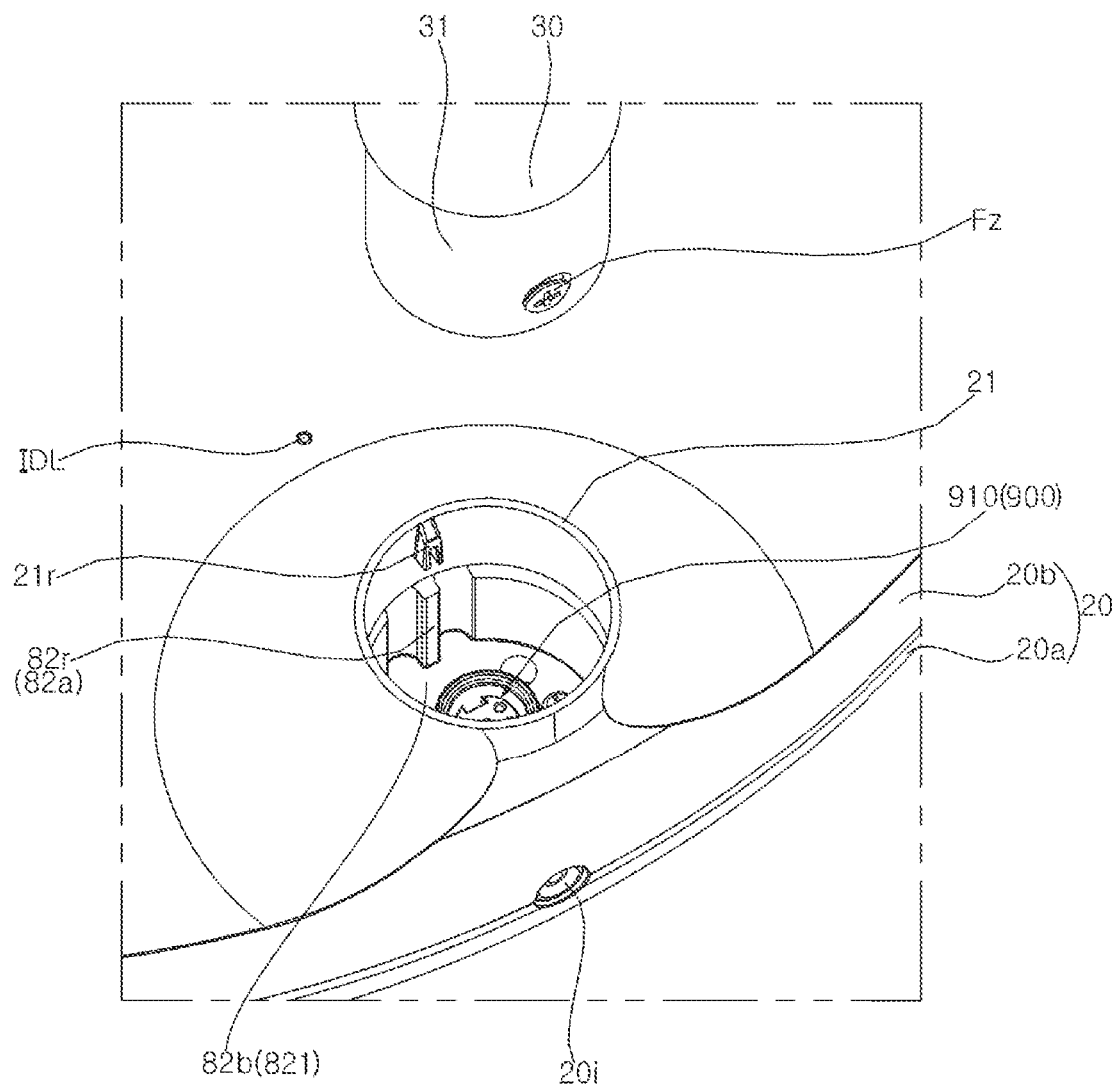

Referring to FIGS. 21 and 24, the upper body 20b of the base 20 may define the upper surface of the base 20, and may have a round tray shape that is open downward. The upper body 20b may be detachably coupled to the lower body 20a.

The port 21 may be provided at an upper surface of the upper body 20b, and may be adjacent to the periphery of the upper body 20b. The port 21 may have a hole aligned with the first connector 910. The port 21 may have a monticule shape. An insertion portion 31 of the pole 30 may be inserted into the hole of the port 21.

Figure 25:
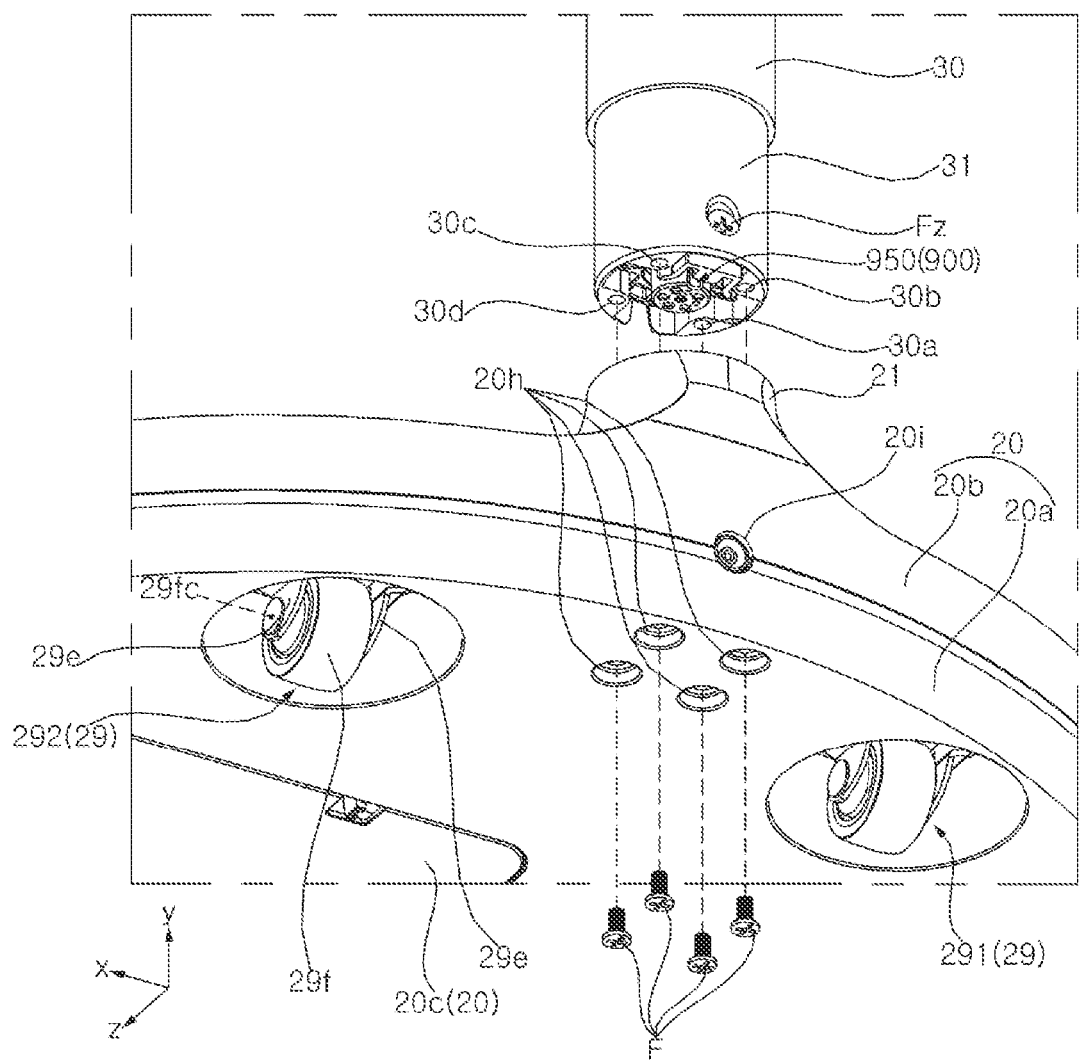
Figure 26:
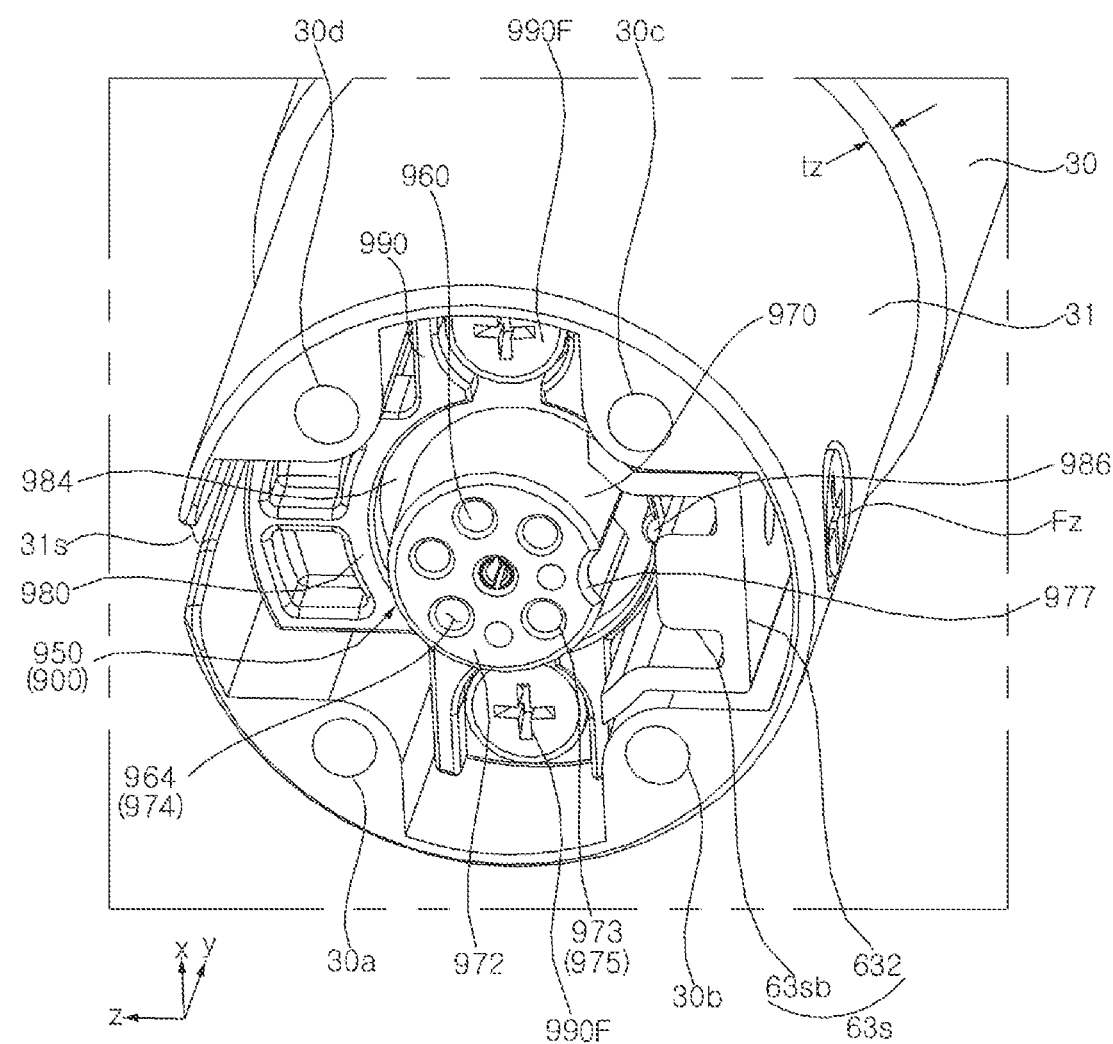

Referring to FIGS. 24 to 26, a portion of a stem 63s may be disposed in the insertion portion 31 of the pole 30. The insertion portion 31, which is a portion of the pole 30, may define the lower end of the pole 30. A fastening member Fz, such as a screw, may penetrate through the insertion portion 31 to be coupled to the stem 63s. Accordingly, the stem 63s may be coupled to the insertion portion 31.

The second connector 950 may be disposed in the insertion portion 31. A second bracket 990 of the second connector 950 may be inserted between ribs 30a, 30b, 30c, and 30d of the pole 30, and may be coupled to a lower side of the stem 63s through a fastening member 990F such as a screw. The second connector 950 may be referred to as a top docking connector.

The first connector 910 may be disposed in the base 20, and may face the second connector 950 through the port 21 of the base 20. In the vertical direction, the first connector 910 may be aligned with the second connector 950.

In some embodiments, the first connector 910 may be disposed in the insertion portion 31, and the second connector 950 may be disposed in the base 20.

A first guide rib 21r may be formed inside the port 21. A second guide rib 82r may be formed on a side wall of the ridge 82a surrounding the first connector 910. For example, the second guide rib 82r may be defined by grooves formed by cutting out a portion of the side wall of the ridge 82a. In the vertical direction, the second guide rib 82r may be aligned with the first guide rib 21r.

An outer diameter of the insertion portion 31 may be less than an outer diameter of the pole 30 (see tz of FIG. 30) and be substantially equal to an inner diameter of the port 21. A guide slit 31s may be formed on a side surface of the insertion portion 31. When the insertion portion 31 is inserted into the port 21, the first guide rib 21r and the second guide rib 82r may be inserted into the guide slit 31s. The insertion portion 31 that is inserted into the port 21 may be surrounded by the ridge 82a, and may be seated or placed on a seating surface 82b (see FIG. 29) of the first weight 821.

Fastening members F, such as screws, may penetrate through bottom holes 20h formed on the lower surface of the base 20 and holes 82bh (see FIG. 29) formed on the seating surface 82b, respectively, and may be fastened to holes of the ribs 30a, 30b, 30c, and 30d of the insertion portion 31, respectively. Accordingly, the insertion portion 31 may be inserted into and coupled to the port 21.

Figure 27:
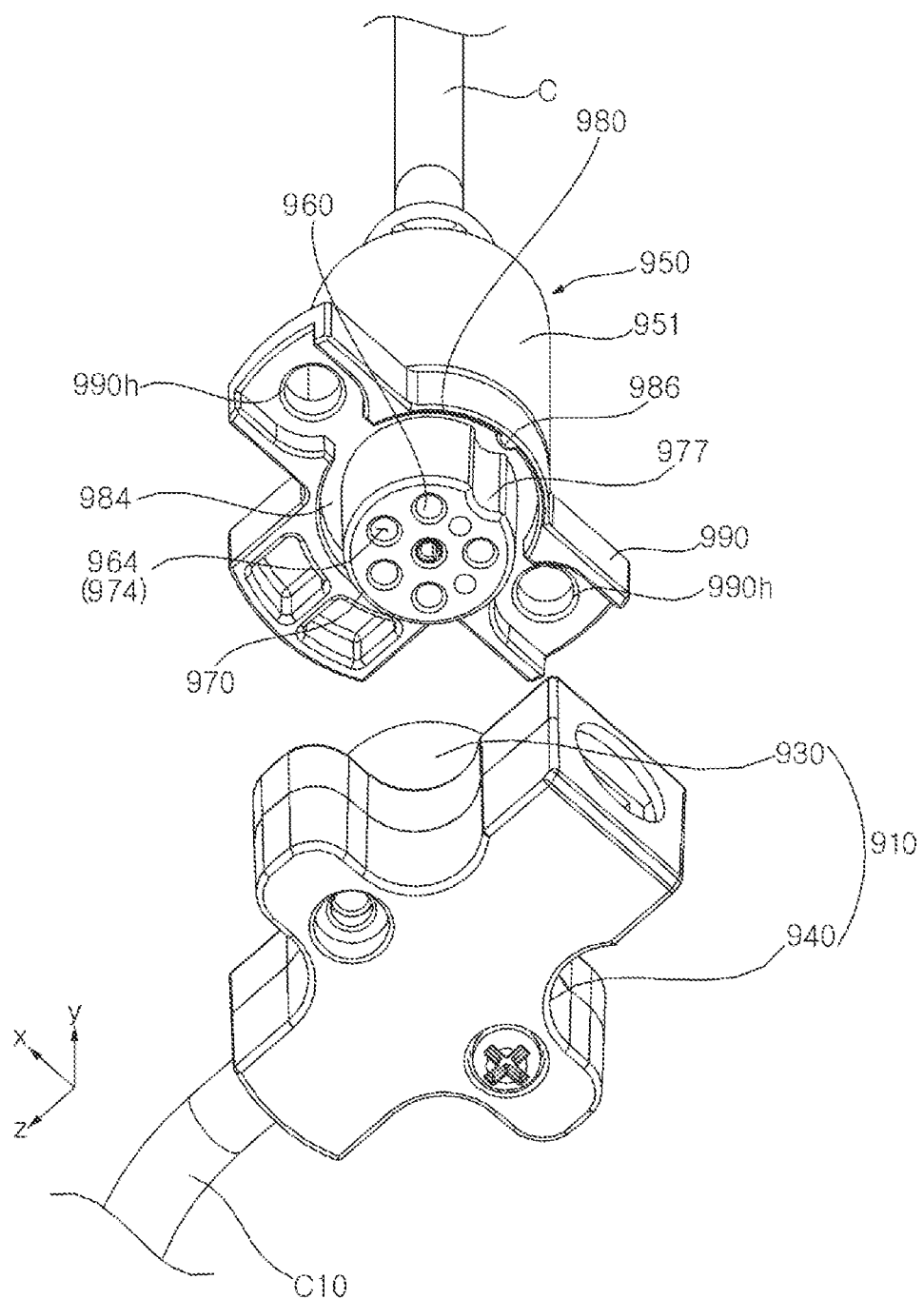
Figure 28:
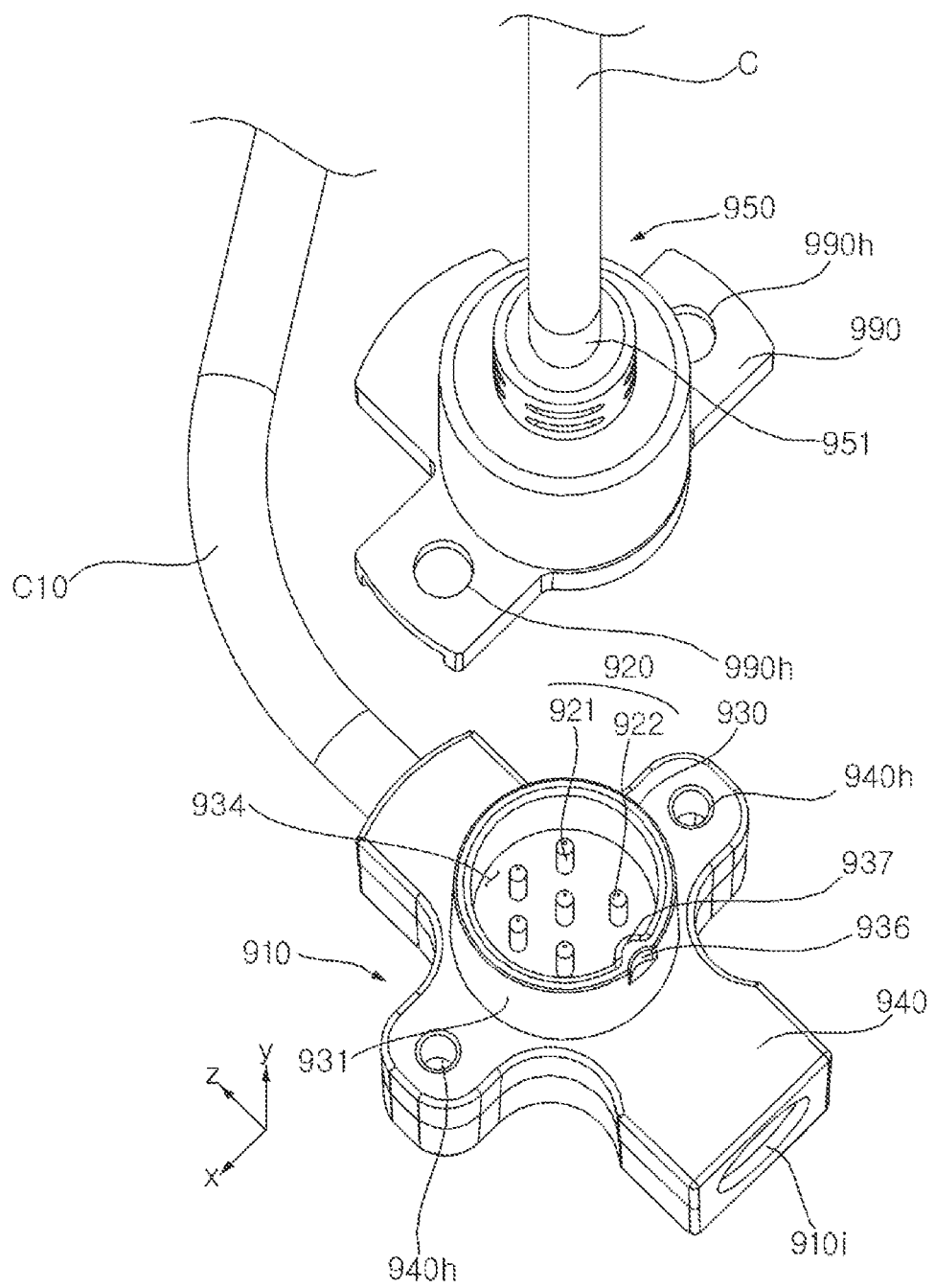
Figure 29:
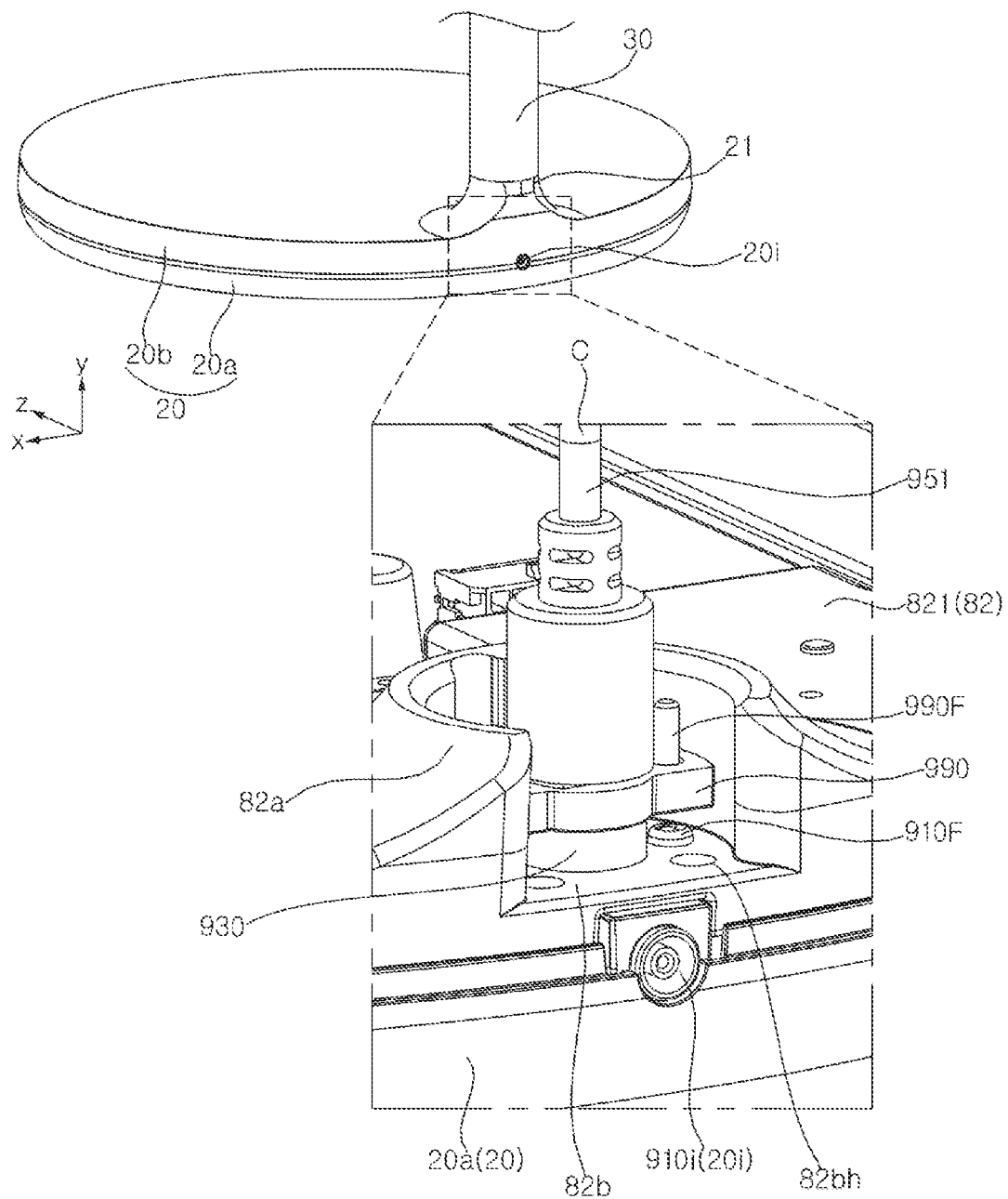

Referring to FIGS. 27 to 29, the second connector 950 may include at least one second pin 960, the second pin housing 970, the third pin housing 980, etc., as described with reference to FIG. 10 and the like.

The second pin housing 970 may accommodate at least one second pin 960. The first space 964 and the insertion hole 974 may correspond to the second pin 960. The first space 964 may be referred to as an insertion space, and the first space 964 and the insertion hole 974 may be collectively referred to as a pin hole. For example, the number of second pins 960 may be 5 or any number. The second recessed portion 977 may be formed on the outer circumferential surface of the second pin housing 970, and may extend in a lengthwise direction of the second pin 960 (i.e., the vertical direction). The second pin 960 may have a hollow cylinder shape. The second pin 960 may be referred to as a female pin, a female terminal, or a female connector.

The third pin housing 980 may surround an upper portion of the second pin housing 970. The third space 984 may be formed between the second pin housing 970 and the third pin housing 980. The second protruding portion 986 may protrude from an inside of the third pin housing 980 toward the third space 984, and may face the second recessed portion 977.

The second bracket 990 may extend from an outside of the third pin housing 980 in a horizontal direction. The second bracket 990 may have a hole 990h through which the fastening member 990F (see FIG. 26) passes.

A cable connector 951 may be disposed opposite the second pin housing 970 with respect to the second bracket 990, and may be connected to a cable C. The cable C may be electrically connected to the second pin 960.

As described above with reference to FIG. 11, the first connector 910 may include at least one first pin 920, the first pin housing 930, etc.

The at least one first pin 920 may extend in the lengthwise direction of the second pin 960 (i.e., the vertical direction). The first pin 920 may include the pin body 921 and the pin tip 922. For example, the number of the first pins 920 may be five or any number. The first pin 920 may be referred to as a male pin, a male terminal, or a male connector.

The first pin housing 930 may accommodate at least one first pin 920 (refer to the second space 934). An inner diameter of the first pin housing 930 may be equal to or greater than an outer diameter of the second pin housing 970. The first protruding portion 937 may convexly protrude from the inner circumferential surface of the first pin housing 930 toward the second space 934, and may extend in a lengthwise direction of the first pin 920. The first recessed portion 936 may be concavely recessed from the outer circumferential surface of the first pin housing 930 toward an inside of the first pin housing 930, and may be disposed opposite the first protruding portion 937.

The first bracket 940 may extend from a lower surface of the first pin housing 930 in the horizontal direction, and may be disposed below a portion defining the seating surface 82b of the first weight 821. The first bracket 940 may include the hole 940h through which the fastening member 910F passes. The first cable C10 may be connected to one side of the first bracket 940, and the jack 910i may be provided at another side of the first bracket 940.

When the insertion portion 31 of the pole 30 is inserted into the port 21, the first pin 920 may be inserted into the first space 964 to be in contact with the second pin 920, the first protruding portion 937 may be inserted into the second recessed portion 977, and the second protruding portion 986 may be inserted into the first recessed portion 936. Accordingly, the second connector 950 may be coupled to the first connector 910, and the cable C and the first cable C10 may be electrically connected to each other through the second pin 960 and the first pin 920.

Figure 30:
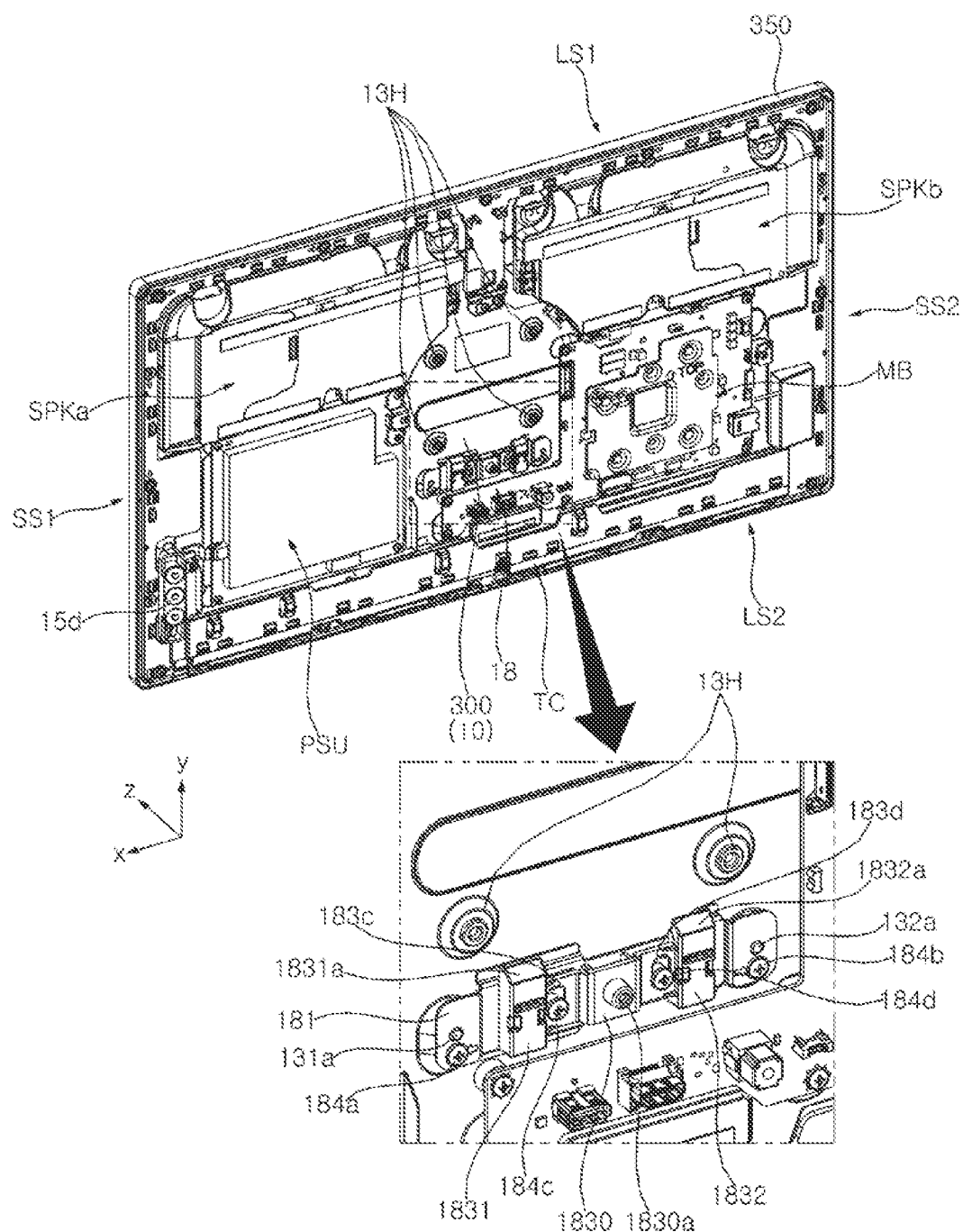

Referring to FIG. 30, an electronic component may be mounted on the rear surface of the frame 300, and may include a plurality of boards PSU, MB, and TC, and a speaker SPKa and a speaker SPKb.

The power supply board PSU may be located closer to the first short side SS1 than the second short side SS2, and may be coupled to the rear surface of the frame 300. The power supply board PSU may provide power to each component of the display device.

The main board MB may be located closer to the second short side SS2 than the first short side SS1, and may be coupled to the rear surface of the frame 300. The main board MB may control the display device.

The timing controller board TC may be located below the power supply board PSU and the main board MB, and may be coupled to the rear surface of the frame 300. The timing controller board TC may be electrically connected to the display panel 100 (see FIG. 20) through a cable (not shown), and may provide an image signal to the display panel 100.

The speakers SPKa and SPKb may be disposed above the plurality of boards PSU, MB, and TC, and may be coupled to the rear surface of the frame 300. For example, the left speaker SPKa may be located closer to the first short side SS1 than the second short side SS2, and may provide sound laterally. For example, the right speaker SPKb may be located closer to the second short side SS2 than the first short side SS1, and may provide sound laterally.

A locking unit 18 may be coupled to the rear surface of the frame 300. The locking unit 18 may be located below a central portion of the frame 300.

Figure 31:
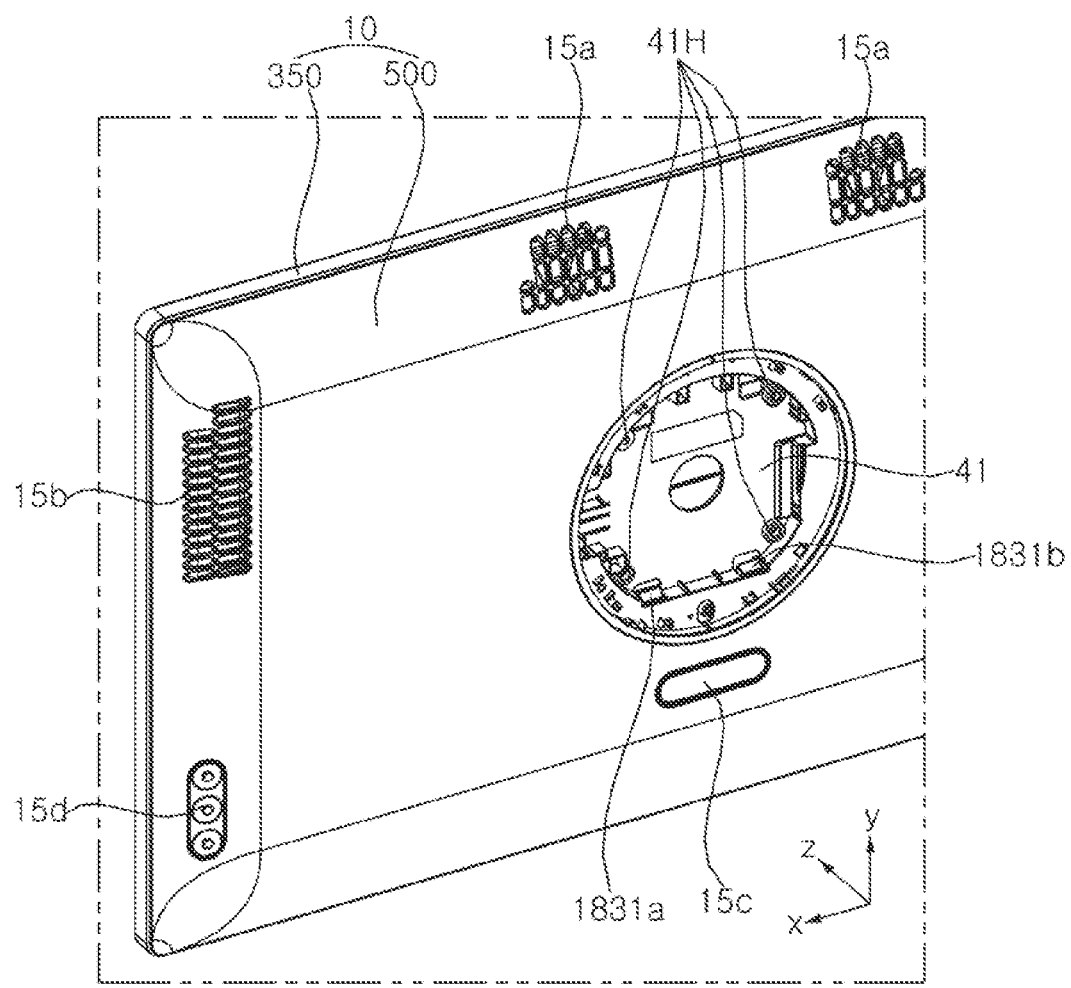

Referring to FIGS. 30 and 31, the back cover 500 may cover the rear of the frame 300, and may be coupled to the frame 300. Positions of speaker holes 15a and 15b formed at the back cover 500 may correspond to positions of the speakers SPKa and SPKb mounted on the frame 300.

A fixing portion 13H may protrude rearward from the rear surface of the frame 300. The fixing portion 13H may be a palm nut.

A fixing plate 41 may have a circular plate shape inserted into a hole of the back cover 500. A fixing hole 41H may be formed in the fixing plate 41, and may be aligned with the fixing portion 13H. A fastening member (not shown) such as a screw may be fastened to the fixing portion 13H through the fixing hole 41H. Accordingly, the fixing plate 41 may be coupled to the frame 300.

Figure 32:
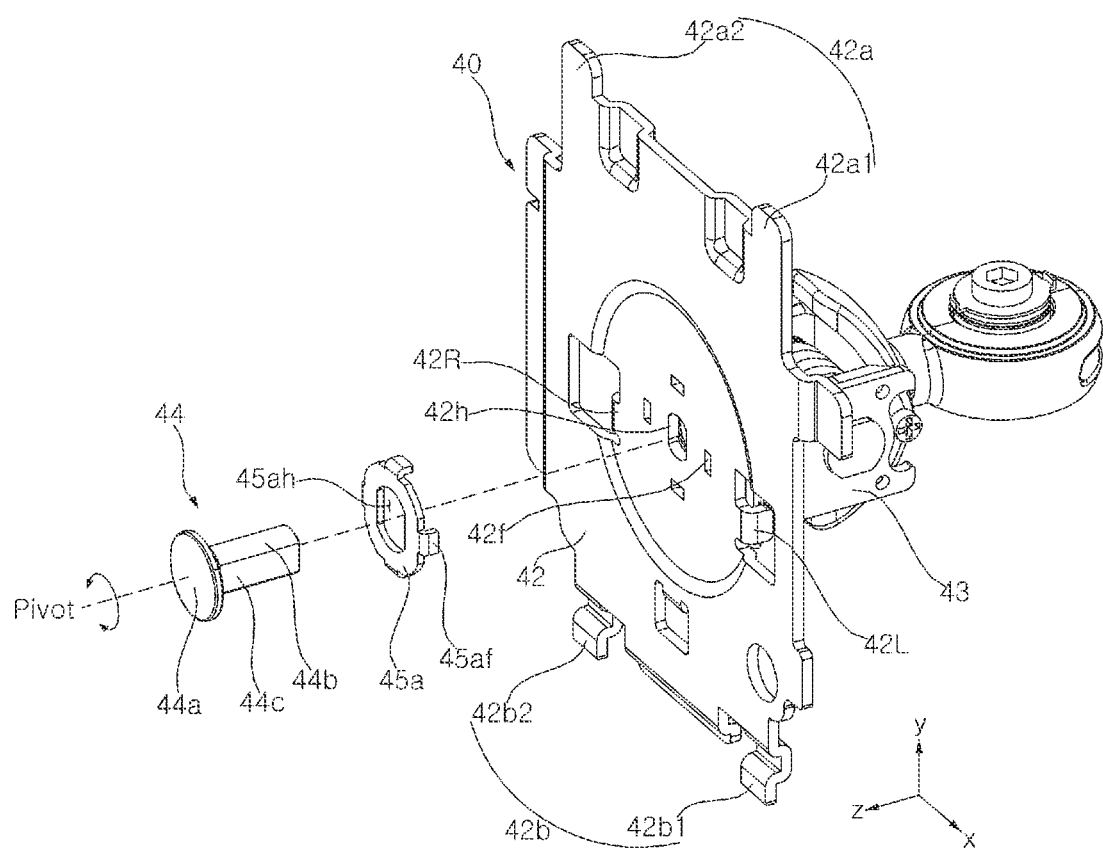

Referring to FIGS. 31 and 32, a front bracket 42 of the articulated connector 40 may be disposed at the rear of the fixing plate 41, and may have a plate shape. A pair of top protrusions 42a1 and 42a2 may protrude upward from the upper side of the front bracket 42, and may be spaced apart from each other in the left-and-right direction. A pair of bottom protrusions 42b1 and 42b2 may protrude downward from a lower side of the front bracket 42, and may be spaced apart from each other in the left-and-right direction. The pair of bottom protrusions 42b1 and 42b2 may be respectively locked or engaged to a pair of locking portions 1831a and 1831b of the locking unit 18 that penetrates through the fixing plate 41, and the pair of top protrusions 42a1 and 42a2 may be respectively inserted into and coupled to a pair of holes formed at an upper portion of the fixing plate 41. Accordingly, the front bracket 42 may be detachably coupled to the fixing plate 41.

A pivot shaft 44 may extend in the back-and-forth direction. A diameter of a head 44a of the pivot shaft 44 may be greater than a diameter of a body 44b of the pivot shaft 44. A pair of cut-outs 44c may be formed in a side surface of the body 44b, and may be disposed opposite each other. A hole 42h of the front bracket 42 may be formed at a central portion of the front bracket 42, and may be penetrated by the body 44b. A shape of the hole 42h of the front bracket 42 may be the same as a shape of a longitudinal cross-section of the body 44b. Accordingly, the pivot shaft 44 and the front bracket 42 may rotate together with respect to an axial direction of the pivot shaft 44. In other words, the pivot shaft 44 may provide a pivot axis.

A front grab 45a may be disposed between the head 44a and a front surface of the front bracket 42. A hole 45ah of the front grab 45a may be aligned with the hole 42h of the front bracket 42, and may have the same shape as the hole 42h. The body 44b may penetrate through the holes 45ah and 42h. The front grab 45a may be fixed to the front bracket 42. In other words, the front grab 45a may rotate together with the pivot shaft 44 and the front bracket 42.

Figure 33:
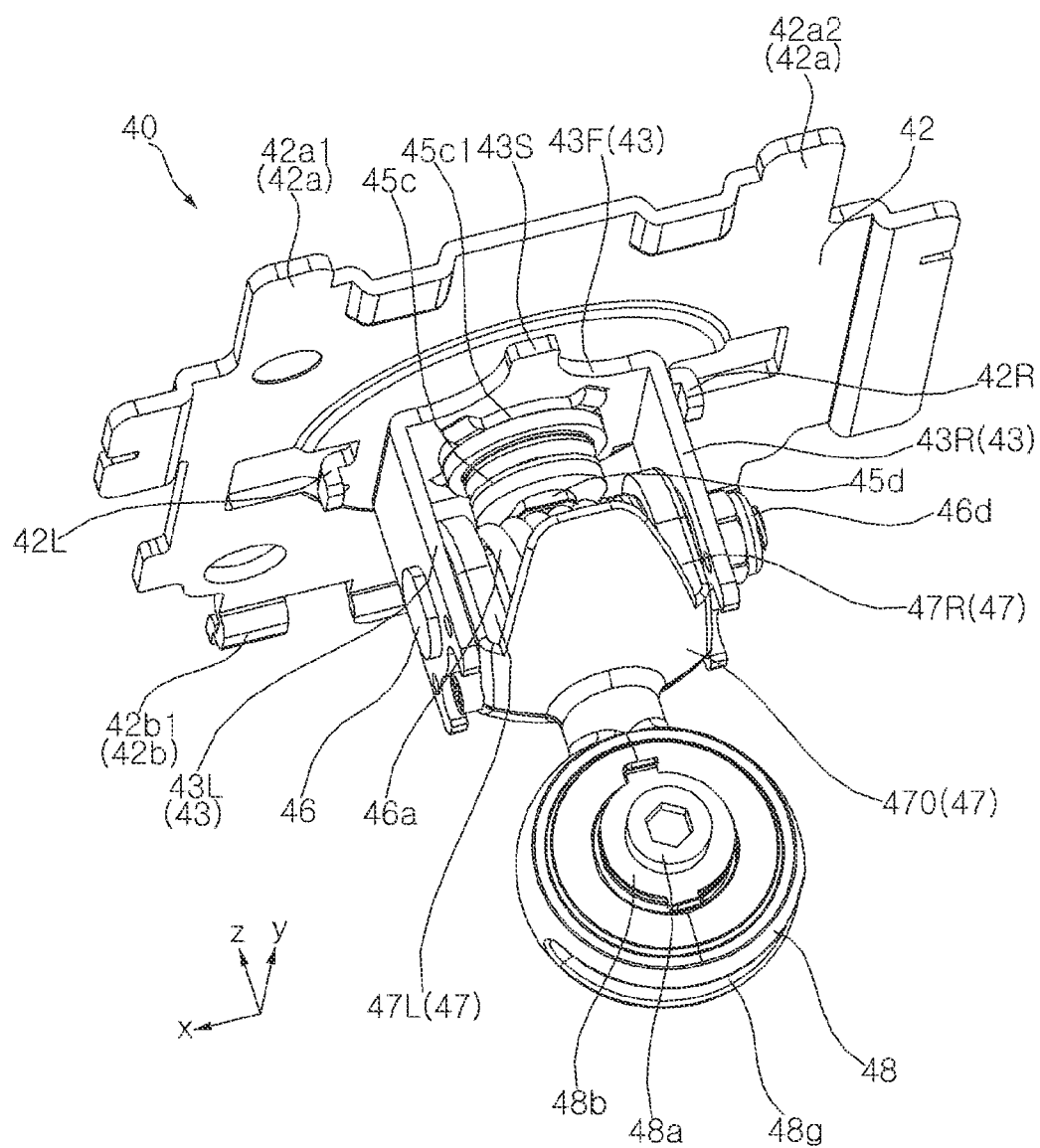
Figure 34:
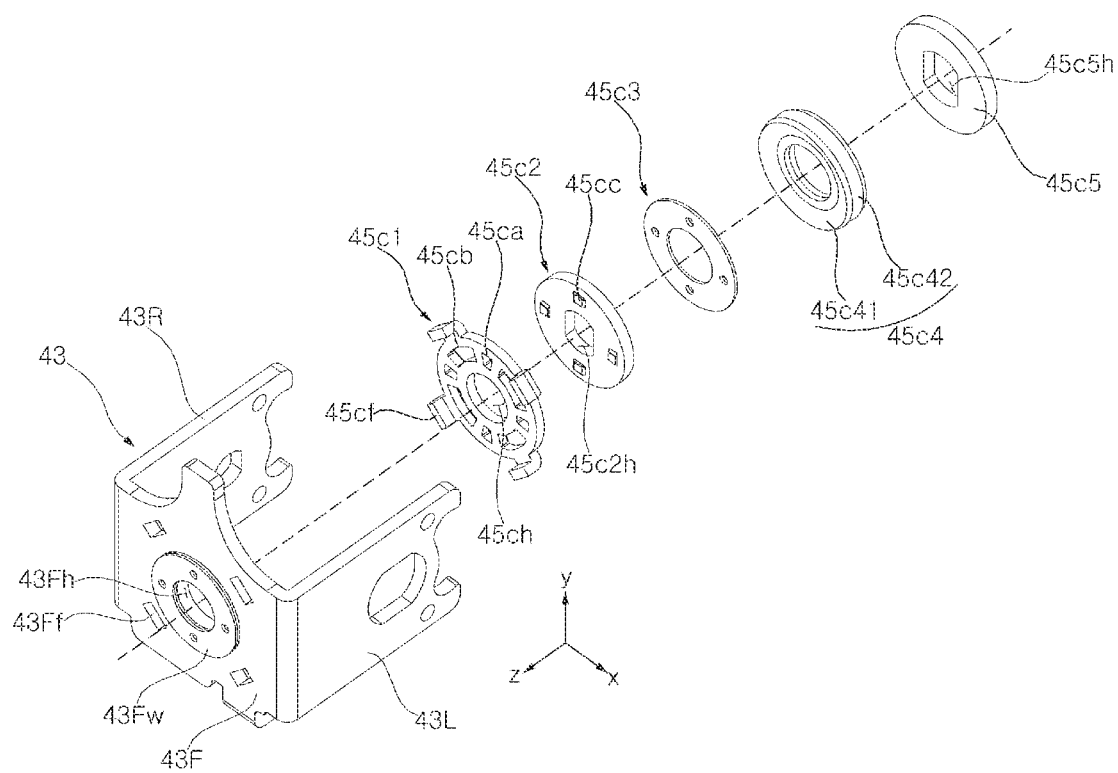

Referring to FIGS. 33 and 34, a rear bracket 43 may be disposed at the rear of the front bracket 42. The rear bracket 43 may include a mount 43F, a left wing 43L, and a right wing 43R.

The mount 43F may face the front bracket 42, and may include a mount hole 43Fh with a circular shape. At least one washer 43Fw may be disposed between the front bracket 42 and the mount 43F, and may have a circular hole. The body 44b of the pivot shaft 44 may penetrate through a hole of the washer 43Fw and the mount hole 43Fh, and may rotate independently of the washer 43Fw and the mount 43F.

The left wing 43L may extend rearward from the left side of the mount 43F. The right wing 43R may extend rearward from the right side of the mount 43F. A plurality of members (45c: 45c1, 45c2, 45c3, 45c4, and 45c5) described hereinafter may be coupled to the mount 43F at between the left wing 43L and the right wing 43R.

A rear grab 45c1 may be disposed opposite the washer 43Fw with respect to the mount 43F, and may have a circular hole 45*ch* through which the body 44*b* of the pivot shaft 44 passes. The rear grab 45*c*1 may be fixed to a rear surface of the mount 43F.

In addition, a plurality of fixing holes 45*ca* and a plurality of slots 45*cb* may be formed in the rear grab 45*c*1 to be spaced apart from each other in a circumferential direction of the rear grab 45*c*1. The plurality of fixing holes 45*ca* and the plurality of slots 45*cb* may be alternately disposed in the circumferential direction of the rear grab 45*c*1. For example, the fixing holes 45*ca* or the slots 45*cb* may be spaced apart from one another at intervals of 90 degrees. In the circumferential direction of the rear grab 45*c*1, a length of the slot 45*cb* may be greater than a length of the fixing hole 45*ca*.

A disc 45*c*2 may be disposed at the rear of the rear grab 45*c*1, and may have a hole 45*c*2*h* through which the body 44*b* passes and having a shape the same as a shape of the longitudinal cross-section of the body 44*b*. A plurality of bosses 45*cc* may protrude from a front surface of the disc 45*c*2 toward the rear grab 45*c*1, and may be spaced apart from each other in a circumferential direction of the disc 45*c*2. For example, the bosses 45*cc* may be spaced apart from one another at intervals of 90 degrees. A size of the boss 45*cc* may be the same as or correspond to a size of the fixing hole 45*ca*. That is, when the boss 45*cc* is inserted into the fixing hole 45*ca*, rotation of the disc 45*c*2 and the pivot shaft 44 may be limited to a specific level by the rear grab 45*c*1. Further, when the boss 45*cc* is inserted into the slot 45*cb*, the disc 45*c*2 and the pivot shaft 44 may rotate within the trajectory of the slot 45*cb*.

A washer 45*c*3 may be disposed at the rear of the disc 45*c*2, and may have a circular hole (no reference numeral) through which the body 44*b* of the pivot shaft 44 passes.

A disc spring 45*c*4 may be disposed opposite the disc 45*c*2 with respect to the washer 45*c*3, and may have a circular hole (no reference numeral) through which the body 44*b* of the pivot shaft 44 passes. The disc spring 45*c*4 may have elasticity and be convex forward or rearward. The disc spring 45*c*4 may generate an elastic force in the axial direction of the pivot shaft 44.

A cap 45*c*5 may be disposed at the rear of the disc spring 45*c*4, and may have a hole 45*c*5*h* through which the body 44*b* of the pivot shaft 44 passes. A shape of the hole 45*c*5*h* may be the same as the shape of the longitudinal cross-section of the body 44*b*. The cap 45*c*5 may be fixed to a distal end of the body 44*b*.

Accordingly, the pivot shaft 44 may rotate together with the front bracket 42, the front grab 45*a*, the disc 45*c*2, and the cap 45*c*5. In addition, the pivot shaft may rotate independently of the washer 43Fw, the rear bracket 43, the rear grab 45*c*1, the washer 45*c*3, and the disc spring 45*c*4. In other words, even when the pivot shaft 45 rotates, the washer 43Fw, the rear bracket 43, the rear grab 45*c*1, the washer 45*c*3, and the disc spring 45*c*4 may not rotate.

Figure 35:
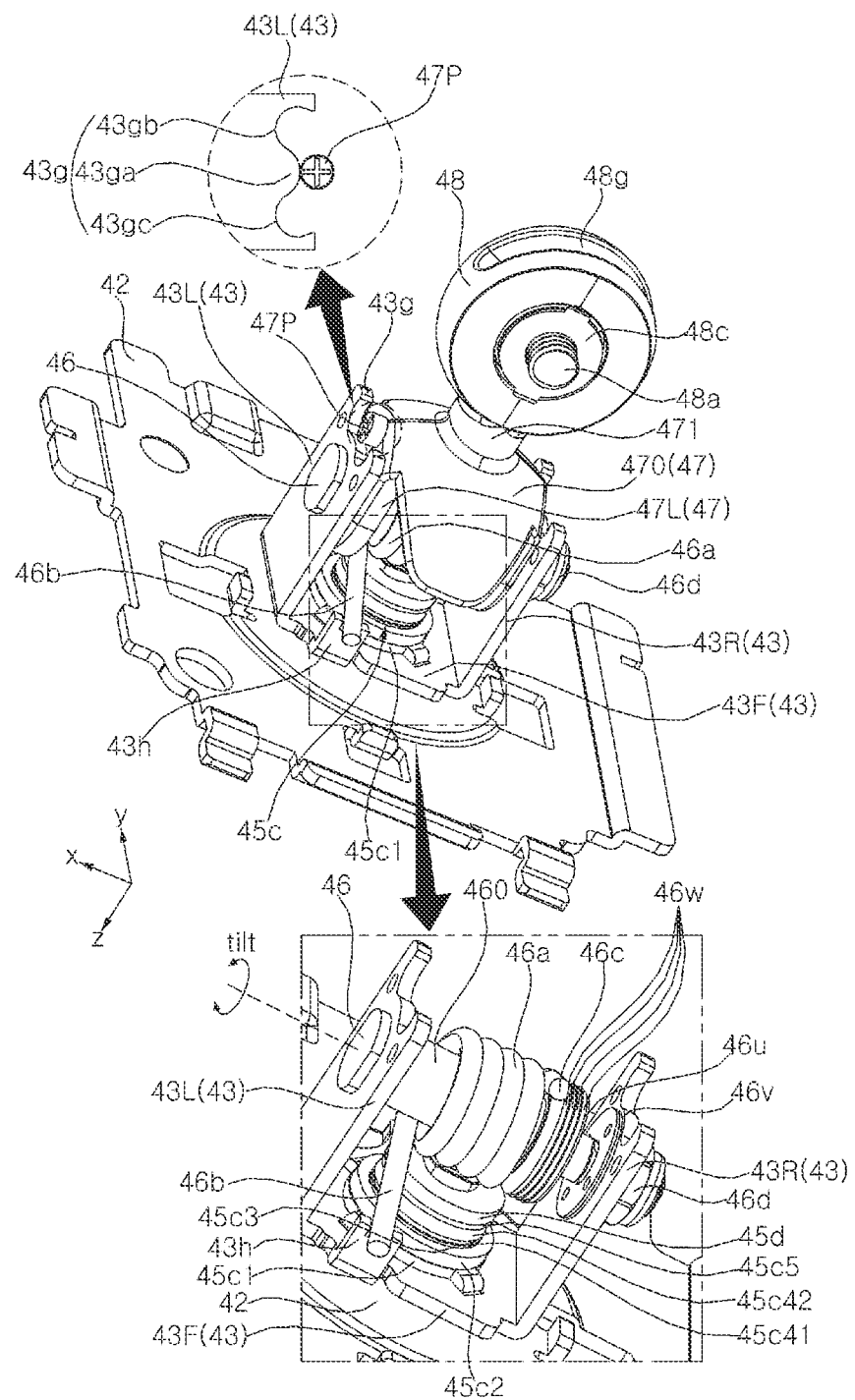

Further, a user can pivot the head 10 (see FIG. 31) that is fixed to the front bracket 42 with respect to the pivot shaft 44. For example, the head 10 may be pivoted within a range of +90 degrees to −90 degrees. In addition, due to the elastic force of the disc springs 45*c*41 and 45*c*2 described above, the head 10 may maintain a specific pivot angle if an external force equal to or greater than a specific level is not applied. During the pivoting movement of the head 10, the user may feel a sense of fastening due to fastening of the boss 45*cc* and the fixing hole 45*ca* or the slot 45*cb*. In other words, when the boss 45*cc* comes out of the slot 45*cb* and is inserted into the fixing hole 45*ca*, the user can feel that the head 10 is located at a pivot angle of 0 degree, +90 degrees, or −90 degrees. Referring to FIG. 35, a holder 47 may be disposed between the left wing 43L and the right wing 43R. A holder body 470 may cover the rear of the mount 43F of the rear bracket 43. A first part 47L may protrude toward the mount 43F from a left side portion of the holder body 470, and may be adjacent to the left wing 43L. A second part 47R (see FIG. 33) may protrude from a right side portion of the holder 47 toward the mount 43F, and may be adjacent to the right wing 43R.

A tilt shaft 46 may extend in the left-and-right direction. The tilt shaft 46 may be formed through the left wing 43L, the first part 47L, the second part 47R, and the right wing 43R. A head (no reference numeral), which is one end of the tilt shaft 46, may be seated on a side surface of the left wing 43L. Another end of the tilt shaft 46 may be threaded, and a fastening member 46*d* such as a nut may be fastened to the another end of the tilt shaft 46 on the right wing 43R.

In addition, the tilt shaft 46 may have a cylindrical shape, and may be fixed to the left wing 43L and the right wing 43R. The tilt shaft 46 may be rotatably coupled to the holder 47. That is, the tilt shaft 46 may provide a tilt axis. At least one washer 46*v* may be disposed between the second part 47R and the right wing 43R, and may have a circular hole through which the tilt shaft 46 passes.

An elastic member 46*a* may be disposed between the left wing 43L and the right wing 43R. The elastic member 46*a* may be wound around an outer circumference of the tilt shaft 46 a plurality of times, and may have elasticity. The elastic member 46*a* may be a coil-shaped spring.

In addition, a portion 46*b* of the elastic member 46*a* may extend in a direction intersecting the tilt shaft 46 without being wound around the tilt shaft 46. The portion 46*b* of the elastic member 46*a* may be caught by a seating portion 43*h* that protrudes rearward from the mount 43F.

Also, one end of the elastic member 46*a* may be provided at the portion 46*b*, and another end of the elastic member 46*a* may be fixed inside the holder 47. A disc spring 46*w* may be adjacent to another end 46*c* of the elastic member 46*a*, and may be disposed between the elastic member 46*a* and the second part 47R. The disc spring 46*w* may have a circular hole (no reference numeral) through which the tilt shaft 46 passes. The disc spring 46*w* may be convex in a direction toward the elastic member 46*a*, and may generate an elastic force in the axial direction of the tilt shaft 46.

Accordingly, the tilt shaft 46 may rotate together with the rear bracket 43, the front bracket 42, and the plurality of members 45*c*5, 45*c*4, 45*c*3, 45*c*2, 45*c*1, 43Fw, 45*a*, and 44. In response to the rotation of the tilt shaft 46, the head 10 (see FIG. 31) that is fixed to the front bracket 42 may be tilted up or down. For example, the head 10 may be tilted within a range of +25 degrees to −25 degrees. In addition, due to the elastic force of the elastic member 46*a* and the disc spring 46*w* described above, the head 10 may maintain a specific tilt angle if an external force equal to or greater than a specific level is not applied.

Figure 36:
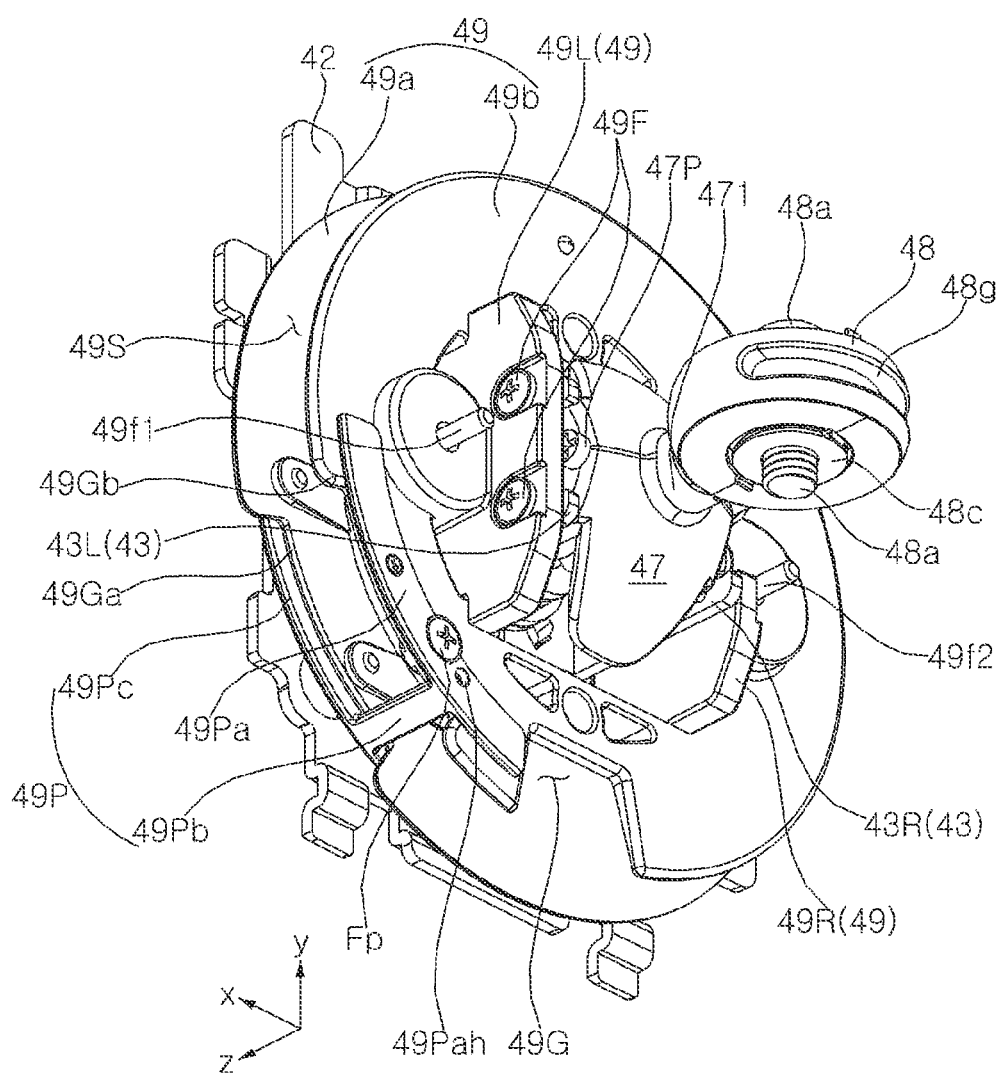
Figure 37:
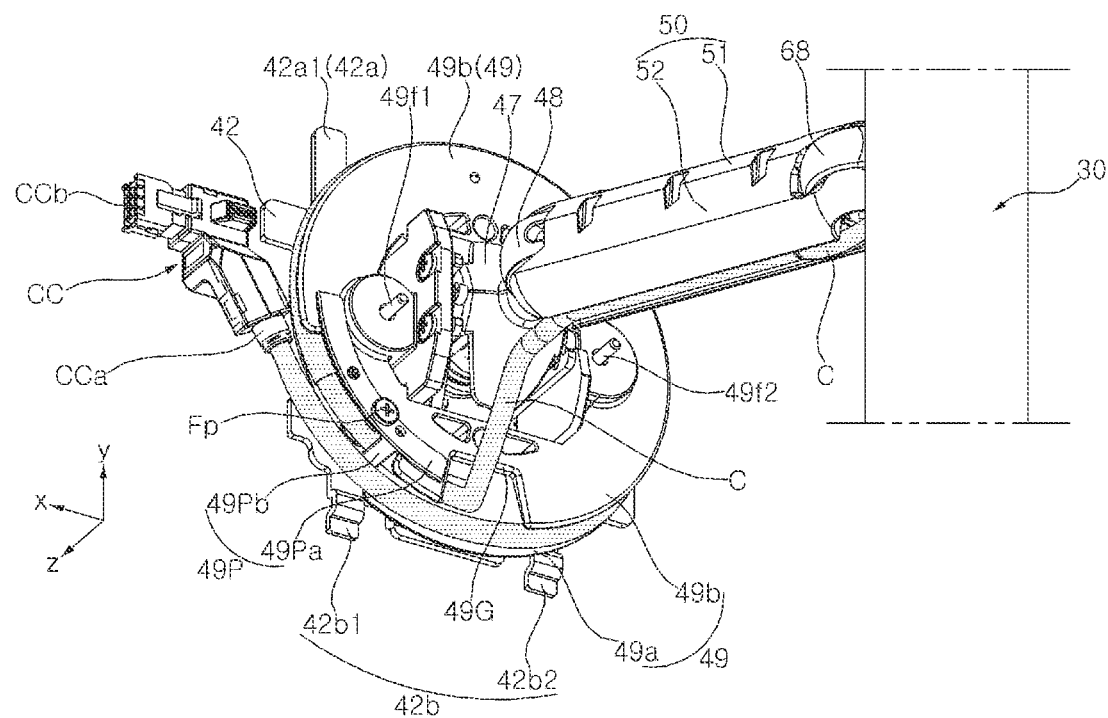

Referring to FIGS. 36 and 37, a first rotation unit 48 may be disposed at the rear of the holder 47. A first connection portion 471 may connect the holder 47 and the first rotation unit 48. For example, the holder 47, the first connection portion 471, and the first rotation unit 48 may be formed as one body.

A cable reel 49 may be disposed at the rear of the front bracket 42. The cable reel 49 may be coupled to the left wing 43L and the right wing 43R through a fastening member 49F such as a screw.

The rear bracket 43 and the holder 47 may be disposed in an inner space of a reel body (not shown), which has a hollow cylinder shape, of the cable reel 49. A first plate 49*a* and a second plate 49*b* of the cable reel 49 may respectively protrude from front and rear ends of the reel body in a radial direction of the reel body, and may extend along an outer circumference of the reel body. In other words, the first plate 49*a* and the second plate 49*b* may each have a ring shape. Accordingly, the cable C may be wound around the reel body of the cable reel 49 between the first plate 49*a* and the second plate 49*b*.

A distal end of the cable C wound around the reel body may be fixed to one end CCa of a cable head CC. The cable C may be a power cable and/or a signal cable. The cable C may consist of several strands.

Figure 38:
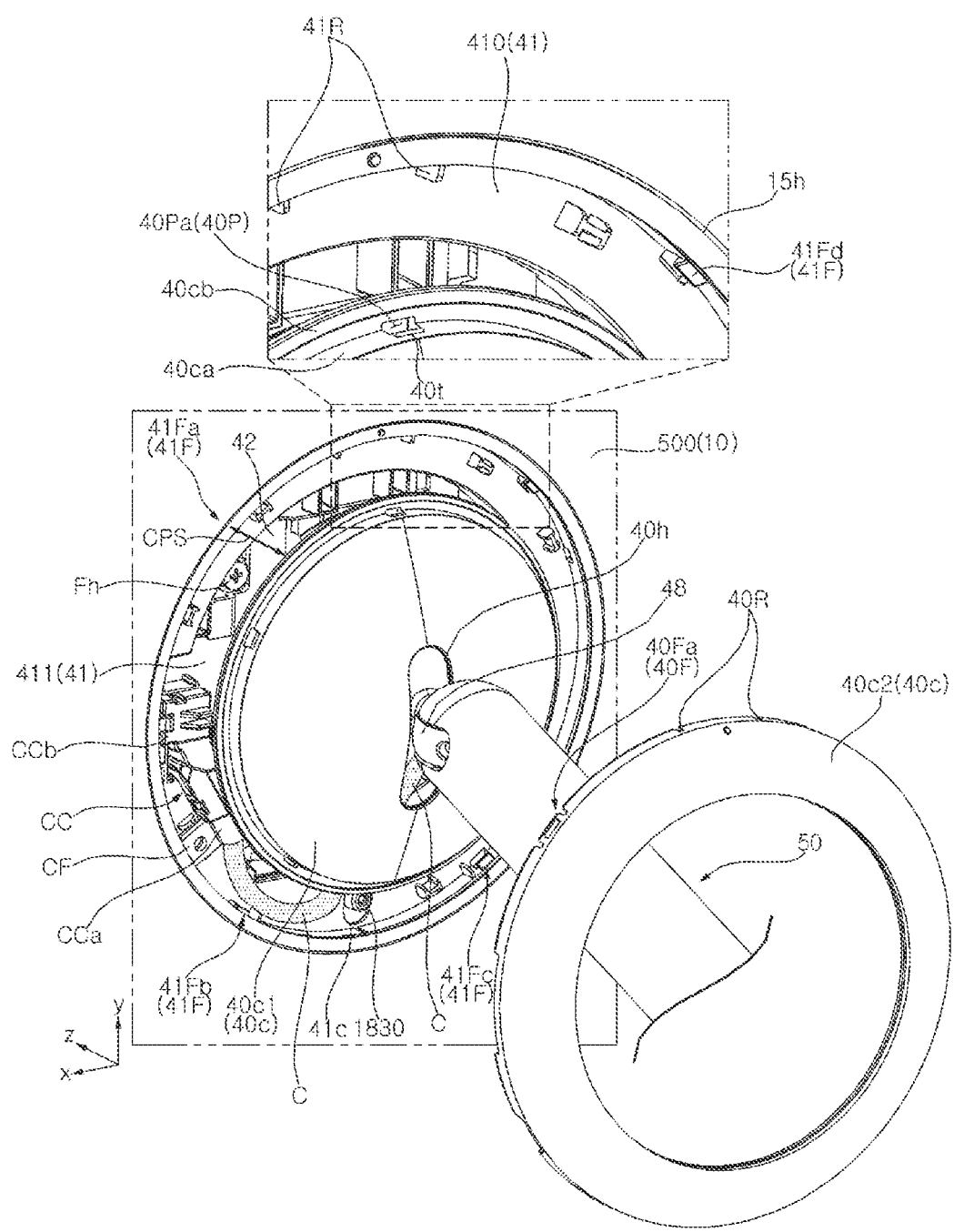

Referring to FIGS. 37 and 38, the front bracket 42 may be detachably coupled to the fixing plate 41 (see FIG. 31).

An inner cover 40*c*1 may cover the rear of the cable reel 49, and may include a cover hole 40*h* through which the first rotation unit 48 passes. Fastening members 49*f*1 and 49*f*2 may penetrate through the cable reel 49 to protrude rearward, and may be coupled to an inside of the inner cover 40*c*1. For example, the fastening members 49*f*1 and 49*f*2 may be screws or bolts.

An inner circumference of an outer cover 40*c*2 may be coupled to an outer circumference of the inner cover 40*c*1. The inner cover 40*c*1 and the outer cover 40*c*2 may cover the rear of a hole 15*h* of the back cover 500.

A cable fixing portion CF may cover the one end CCa of the cable head CC, and may be fixed to the fixing plate 41 through a fastening member such as a screw.

Another end CCb of the cable head CC may pass through a side wall of the fixing plate 41, and may be electrically connected to a terminal (not shown) that is provided at one side of the power supply board PSU (see FIG. 30). For example, the terminal may be mounted to the right side of the power supply board PSU. The terminal may be referred to as a socket.

Figure 39:
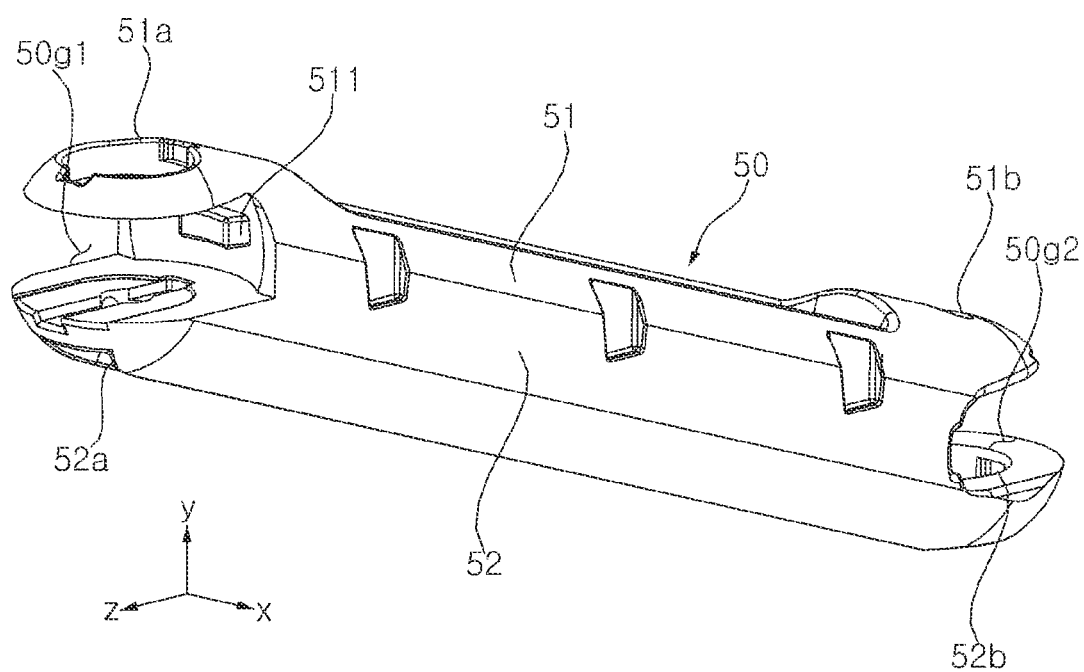
Figure 40:
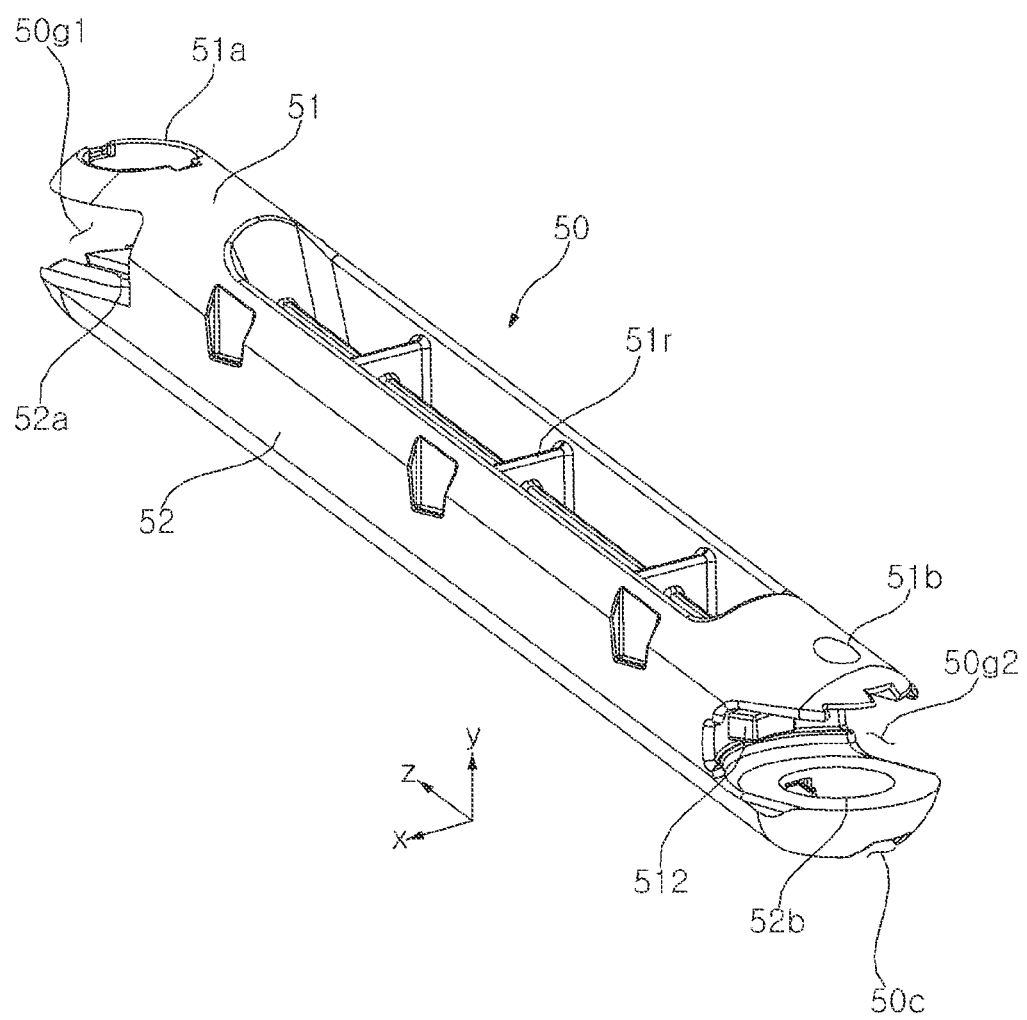

Referring to FIGS. 39 and 40, the arm 50 may include an arm body (51, 52). An upper arm body 51 and a lower arm body 52 may be coupled to each other. The arm 50 may be referred to as a rod 50 or a link 50.

A front portion of the upper arm body 51 may be spaced upward from a front portion of the lower arm body 52. A front groove 50*g*1 may be formed in a front portion of the arm body (51, 52), and may have a "U" shape that is open forward. A rear portion of the upper arm body 51 may be spaced upward from a rear portion of the lower arm body 52. A rear groove 50*g*2 may be formed in a rear portion of the arm body (51, 52), and may have a "U" shape that is open rearward.

An upper insertion hole 51*a* may be formed through the front portion of the upper arm body 51 in the vertical direction, and may face the front groove 50*g*1. An upper fastening hole 51*b* may be formed through the rear portion of the upper arm body 51 in the vertical direction, and may face the rear groove 50*g*2.

A lower fastening hole 52*a* may be formed through the front portion of the lower arm body 52 in the vertical direction, and may be aligned with the upper insertion hole 51*a*. A lower insertion hole 52*b* may be formed through the rear portion of the lower arm body 52, and may be aligned with the upper fastening hole 51*b*.

A cable groove 50*c* may be formed on a lower surface of the lower arm body 52, and may extend along a lengthwise direction of the lower arm body 52. The cable C (see FIG. 37) may be disposed at the cable groove 50*c*.

Figure 41:
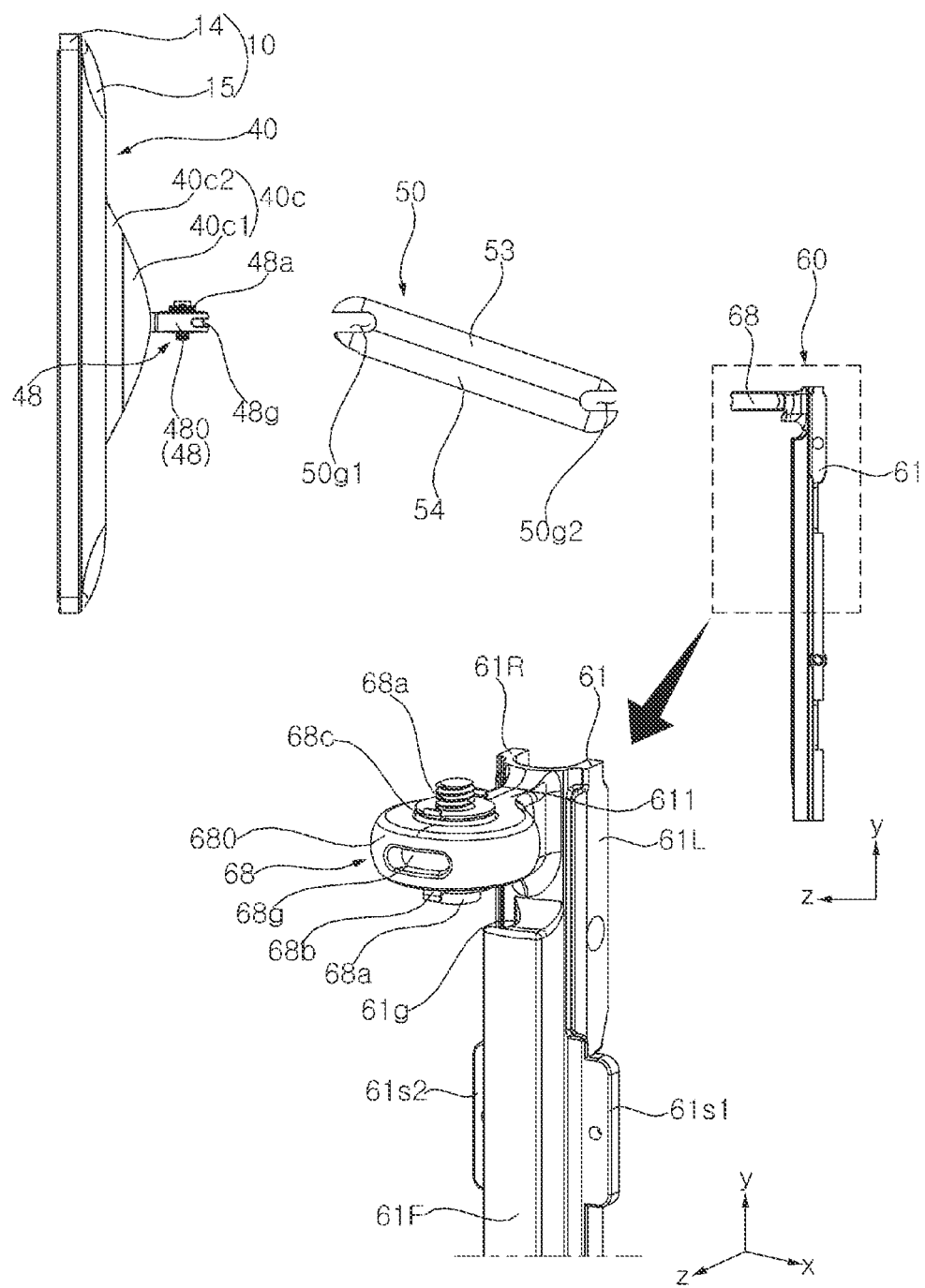

Referring to FIGS. 40 and 41, an upper cover 53 may cover the surface of the upper arm body 51. A lower cover 54 may cover the surface of the lower arm body 52. The upper cover 53 and the lower cover 54 may be formed separately or formed as one body.

The first rotation unit 48 may be inserted into the front groove 50*g*1, and may be rotatably coupled to the arm 50. A second rotation unit 68 may be inserted into the rear groove 50*g*2, and may be rotatably coupled to the arm 50. The second rotation unit 68 may protrude from a vertical member 61 described hereinafter toward the rear groove 50*g*2.

Figure 42:
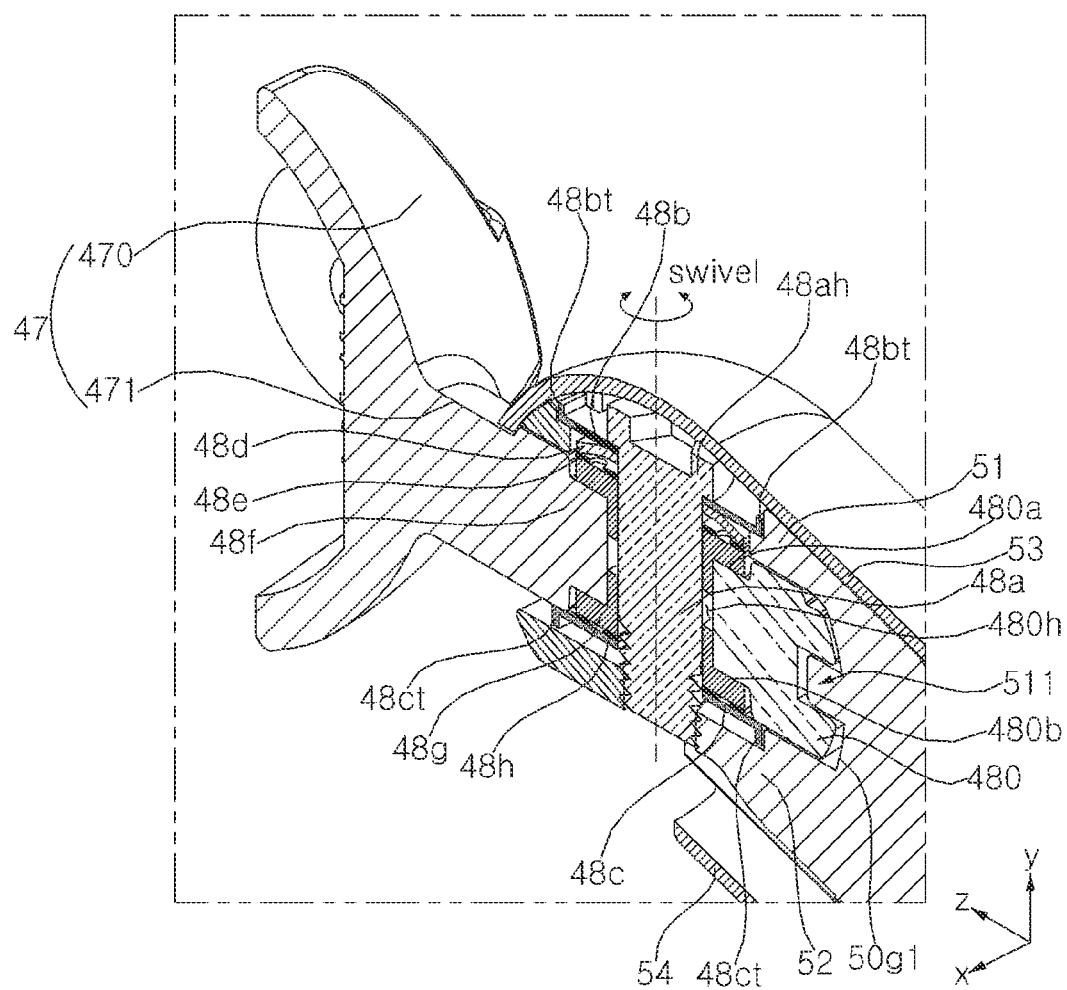

Referring to FIGS. 41 and 42, the first rotation unit 48 may include a first body 480, a first fastening member 48*a*, a first upper fixing washer 48*b*, a first disc spring 48*d*, a first upper washer 48*e*, a first upper bushing 48*f*, a first lower bushing 48*g*, a first lower washer 48*h*, and a first lower fixing washer 48*c*. The first rotation unit 48 may be referred to as a first swivel unit 48 or a first swivel module 48.

The first body 480 may be open vertically. The first body 480 may have a donut shape. For example, the first body 480 may be formed as one body with the first connection portion 471. The first body 480 may be inserted into the front groove 50*g*1.

The first fastening member 48*a* may extend in the vertical direction. The first fastening member 48*a* may be inserted into the arm 50 through the upper insertion hole 51*a* (see FIG. 40), and may penetrate through a hole 480*h* formed at a central portion of the first body 480. A head 48*ah* of the first fastening member 48*a* may be disposed inside the upper arm body 51. The first fastening member 48*a* may be screwed into the lower fastening hole 52*a* (see FIG. 40).

The first upper fixing washer 48*b* may be disposed below the head 48*ah* of the first fastening member 48*a*, and may be penetrated by the first fastening member 48*a*. The first upper fixing washer 48*b* may be a toothed lock washer, and a tooth 48*bt* of the first upper fixing washer 48*b* may be inserted into and fixed to a groove (no reference numeral) formed in the upper arm body 51.

The first disc spring 48*d* may be disposed below the first upper fixing washer 48*b*. The first disc spring 48*d* may be convex toward the first upper fixing washer 48*b*, and may generate an elastic force in an axial direction of the first fastening member 48*a*.

The first upper washer 48*e* may be disposed below the first disc spring 48*d*, and may be penetrated by the first fastening member 48*a*.

The first upper bushing 48*f* may be disposed opposite the first disc spring 48*d* with respect to the first upper washer 48*e*. The first fastening member 48*a* may penetrate through the first upper bushing 48*f*. The first upper bushing 48*f* may have a cylindrical shape in which a flange (no reference numeral) is formed on an upper end thereof. The flange of the first upper bushing 48*f* may be in contact on a first upper groove 480*a* formed along the circumference of the hole 480*h* at an upper surface of the first body 480. A portion (no reference numeral) of the first upper bushing 48*f* may be inserted into the hole 480*h* of the first body 480, and may be disposed between an inner circumferential surface of the first body 480 and an outer circumferential surface of the first fastening member 48*a*.

The first lower bushing 48*g* may be disposed opposite the first upper bushing 48*f*, and may be spaced downwardly from the first upper bushing 48*f*. The first fastening member 48*a* may penetrate through the first lower bushing 48*g*. The first lower bushing 48*g* may have a cylindrical shape in which a flange (no reference numeral) is formed on a lower end thereof. The flange of the first lower bushing 48*g* may be in contact on a first lower groove 480*b* formed along the circumference of the hole 480*h* at a lower surface of the first body 480. A portion (no reference numeral) of the first lower bushing 48*g* may be inserted into the hole 480*h* of the first body 480, and may be disposed between the inner circumferential surface of the first body 480 and the outer circumferential surface of the first fastening member 48*a*.

The first lower washer 48*h* may be disposed below the first lower bushing 48*g*, and may be penetrated by the first fastening member 48*a*.

The first lower fixing washer 48*c* may be disposed opposite the first lower bushing 48*g* with respect to the first lower washer 48*h*, and may be penetrated by the first fastening member 48*a*. The first lower fixing washer 48*c* may be a toothed lock washer, and a tooth 48*ct* of the first lower fixing washer 48*c* may be inserted into and fixed to a groove (no reference numeral) formed in the lower arm body 52.

Accordingly, the first body 480 may rotate with respect to the first fastening member 48*a*. In other words, the first fastening member 48*a* may provide a first swivel axis. In addition, due to the elastic force of the first disc spring 48*d* described above, the head 10 may maintain a specific swivel angle if an external force equal to or greater than a specific level is not applied.

Figure 43:
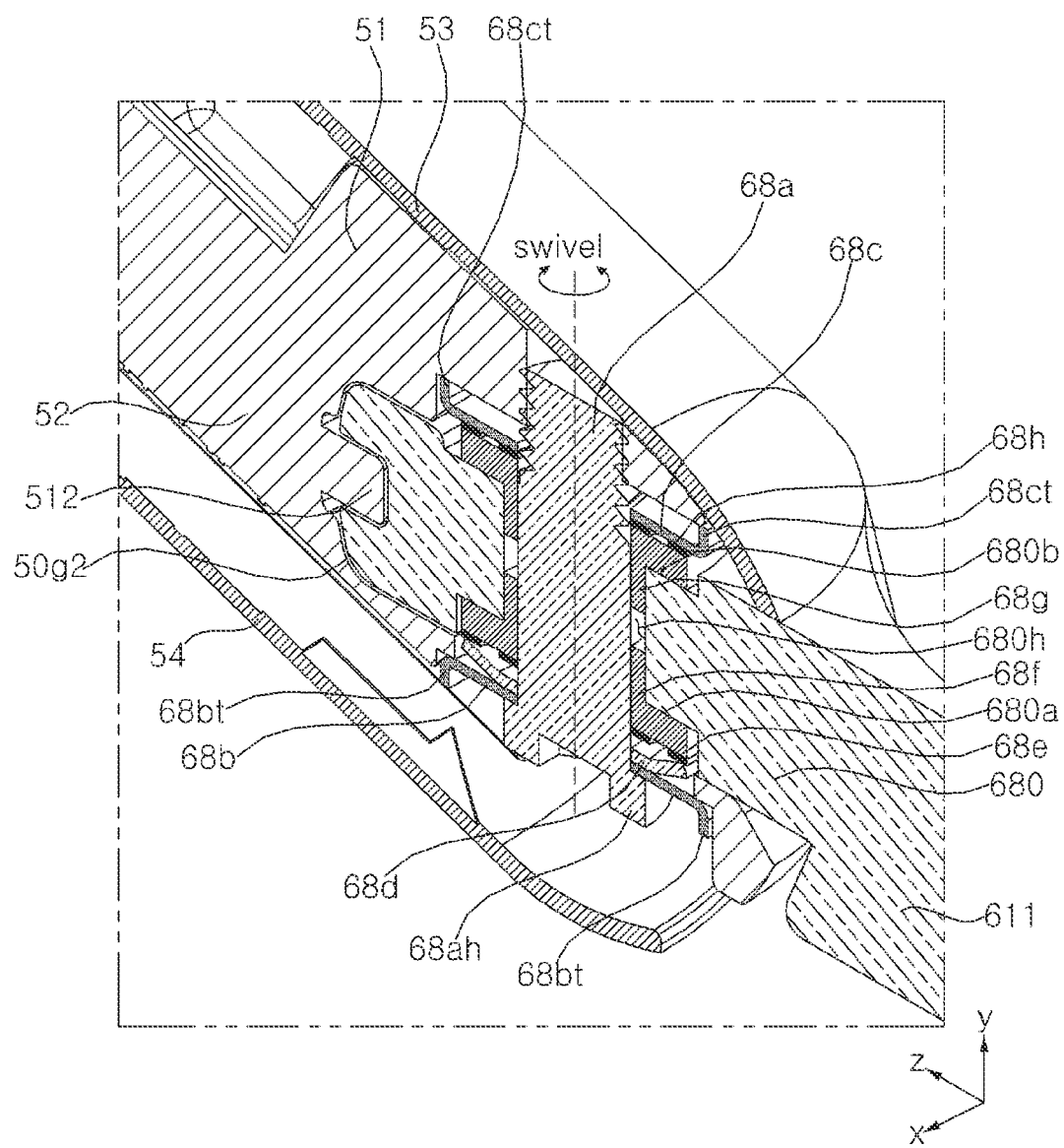

Referring to FIGS. 41 and 43, the second rotation unit 68 may include a second body 680, a second fastening member 68*a*, a second lower fixing washer 68*b*, a second disc spring 68*d*, a second lower washer 68*e*, a second lower bushing 68*f*, a second upper bushing 68*g*, a second upper washer 68*h*, and a second upper fixing washer 68*c*. The second rotation unit 68 may be referred to as a second swivel unit 68 or a second swivel module 68.

The second body 680 may be open vertically. The second body 680 may have a donut shape. The second body 680 may be connected to the vertical member 61 through a second connection portion 611. For example, the second body 680, the second connection portion 611, and the vertical member 61 may be formed as one body. The second body 680 may be inserted into the rear groove 50*g*2.

The second fastening member 68*a* may extend in the vertical direction. The second fastening member 68*a* may be inserted into the arm 50 through the lower insertion hole 52*b* (see FIG. 40), and may penetrate through a hole 680*h* formed at a central portion of the second body 680. A head 68*ah* of the second fastening member 68*a* may be disposed inside the lower arm body 52. The second fastening member 68*a* may be screwed into the upper fastening hole 51*b* (see FIG. 40).

The second lower fixing washer 68*b* may be disposed above the head 68*ah* of the second fastening member 68*a*, and may be penetrated by the second fastening member 68*a*. The second lower fixing washer 68*b* may be a toothed lock washer, and a tooth 68*bt* of the second lower fixing washer 68*b* may be inserted into and fixed to a groove (no reference numeral) formed in the lower arm body 52.

The second disc spring 68*d* may be disposed above the second lower fixing washer 68*b*. The second disc spring 68*d* may be convex toward the second lower fixing washer 68*b*, and may generate an elastic force in an axial direction of the second fastening member 68*a*.

The second lower washer 68*e* may be disposed above the second disc spring 68*d*, and may be penetrated by the second fastening member 68*a*.

The second lower bushing 68*f* may be disposed opposite the second disc spring 68*d* with respect to the second lower washer 68*e*. The second fastening member 68*a* may penetrate through the second lower bushing 68*f*. The second lower bushing 68*f* may have a cylindrical shape in which a flange (no reference numeral) is formed on a lower end thereof. The flange of the second lower bushing 68*f* may be in contact on a second lower groove 680*a* formed along the circumference of the hole 680*h* at a lower surface of the second body 680. A portion (no reference numeral) of the second lower bushing 68*f* may be inserted into the hole 680*h* of the second body 680, and may be disposed between an inner circumferential surface of the second body 680 and an outer circumferential surface of the second fastening member 68*a*.

The second upper bushing 68*g* may be disposed opposite the second lower bushing 68*f*, and may be spaced upward from the second lower bushing 68*f*. The second fastening member 68*a* may penetrate through the second upper bushing 68*g*. The second upper bushing 68*g* may have a cylindrical shape in which a flange (no reference numeral) is formed on an upper end thereof. The flange of the second upper bushing 68*g* may be in contact on a second upper groove 680*b* formed along the circumference of the hole 680*h* at an upper surface of the second body 680. A portion (no reference numeral) of the second upper bushing 68*g* may be inserted into the hole 680*h* of the second body 680, and may be disposed between the inner circumferential surface of the second body 680 and the outer circumferential surface of the second fastening member 68*a*.

The second upper washer 68*h* may be disposed above the second upper bushing 68*g*, and may be penetrated by the second fastening member 68*a*.

The second upper fixing washer 68*c* may be disposed opposite the second upper bushing 68*g* with respect to the second upper washer 68*h*, and may be penetrated by the second fastening member 68*a*. The second upper fixing washer 68*c* may be a toothed lock washer, and a tooth 68*ct* of the second upper fixing washer 68*c* may be inserted into and fixed to a groove (no reference numeral) formed in the upper arm body 51.

Accordingly, the second body 680 may rotate with respect to the second fastening member 68*a*. In other words, the second fastening member 68*a* may provide a second swivel axis. In addition, due to the elastic force of the second disc spring 68*d* described above, the head 10 may maintain a specific swivel angle if an external force equal to or greater than a specific level is not applied.

Figure 44:
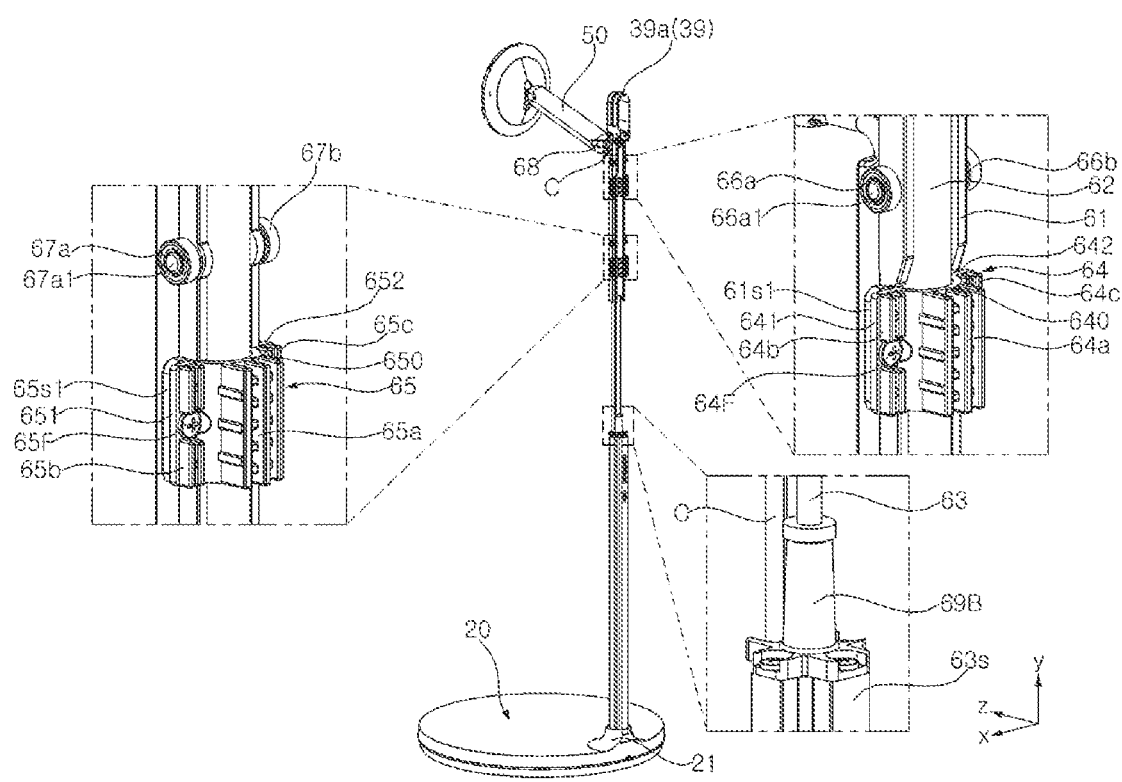

Referring to FIG. 44, the stem 63*s* may extend in the vertical direction, and may be aligned with the vertical member 61. A lower end of the stem 63*s* may be inserted into the port 21 of the base 20.

A gas spring (62, 63) may include an upper shaft 62 and a lower shaft 63 that is connected to the upper shaft 62. The upper shaft 62 may extend in a lengthwise direction of the vertical member 61. The upper shaft 62 may have a cylindrical shape in which upper and lower sides thereof are closed. At least a portion of the upper shaft 62 may be accommodated in the vertical member 61. The lower shaft 63 may extend in a lengthwise direction of the upper shaft 62, and may have a smaller diameter than the upper shaft 62. The lower shaft 63 may be inserted into the upper shaft 62. A lower end of the lower shaft 63 may be fixed onto the fixing member 69B that is fixed on the stem 63*s*.

The gas spring (62, 63) may have a conventional gas spring structure in which compressed gas (e.g., compressed nitrogen) is filled. The upper shaft 62 may be a cylinder in which compressed gas is filled. The lower shaft 63 may penetrate through a lower surface of the upper shaft 62, and may be a piston rod having a piston fixed at a distal end thereof. The piston may be disposed in the upper shaft 62, and may divide an inner space of the upper shaft 62 into two spaces. The two spaces may communicate with each other through an orifice formed at the piston. An area of one surface of the piston that is connected to the lower shaft 63 may be smaller than an area of another surface of the piston that is opposite the one surface. Accordingly, the overall length of the gas spring (62, 63) may be adjusted by controlling the flow of gas passing through the orifice. The gas spring (62, 63) may be referred to as a gas cylinder.

A clamp 64, 65 may be disposed opposite the vertical member 61 with respect to the upper shaft 62. In other words, the upper shaft 62 may be disposed between the vertical member 61 and the clamp 64, 65. For example, the clamp 64, 65 may be provided in plurality spaced apart from each other in the vertical direction.

The clamp 64 may include a semi-cylinder 640, a left flange 641, and a right flange 642; and the clamp 65 may include a semi-cylinder 650, a left flange 651, and a right flange 652. The semi-cylinder 640 and the semi-cylinder 650 may be in contact with an outer circumference of the upper shaft 62. The left flange 641 may extend from one side of the semi-cylinder 640 to the left and be coupled to a first portion 61s1 of the vertical member 61 through a fastening member 64F; the left flange 651 may extend from one side of the semi-cylinder 650 to the left and be coupled to a first portion 65s1 of the vertical member 61 through a fastening member 65F. The right flange 642 may extend from another side of the semi-cylinder 640 to the right and be coupled to a second portion (not shown) of the vertical member 61 through a fastening member (not shown); the right flange 652 may extend from another side of the semi-cylinder 650 to the right and be coupled to a second portion (not shown) of the vertical member 61 through a fastening member (not shown).

Accordingly, the upper shaft 62 can be detachably coupled to the vertical member 61, and can move down or up along the lower shaft 63.

Figure 45:
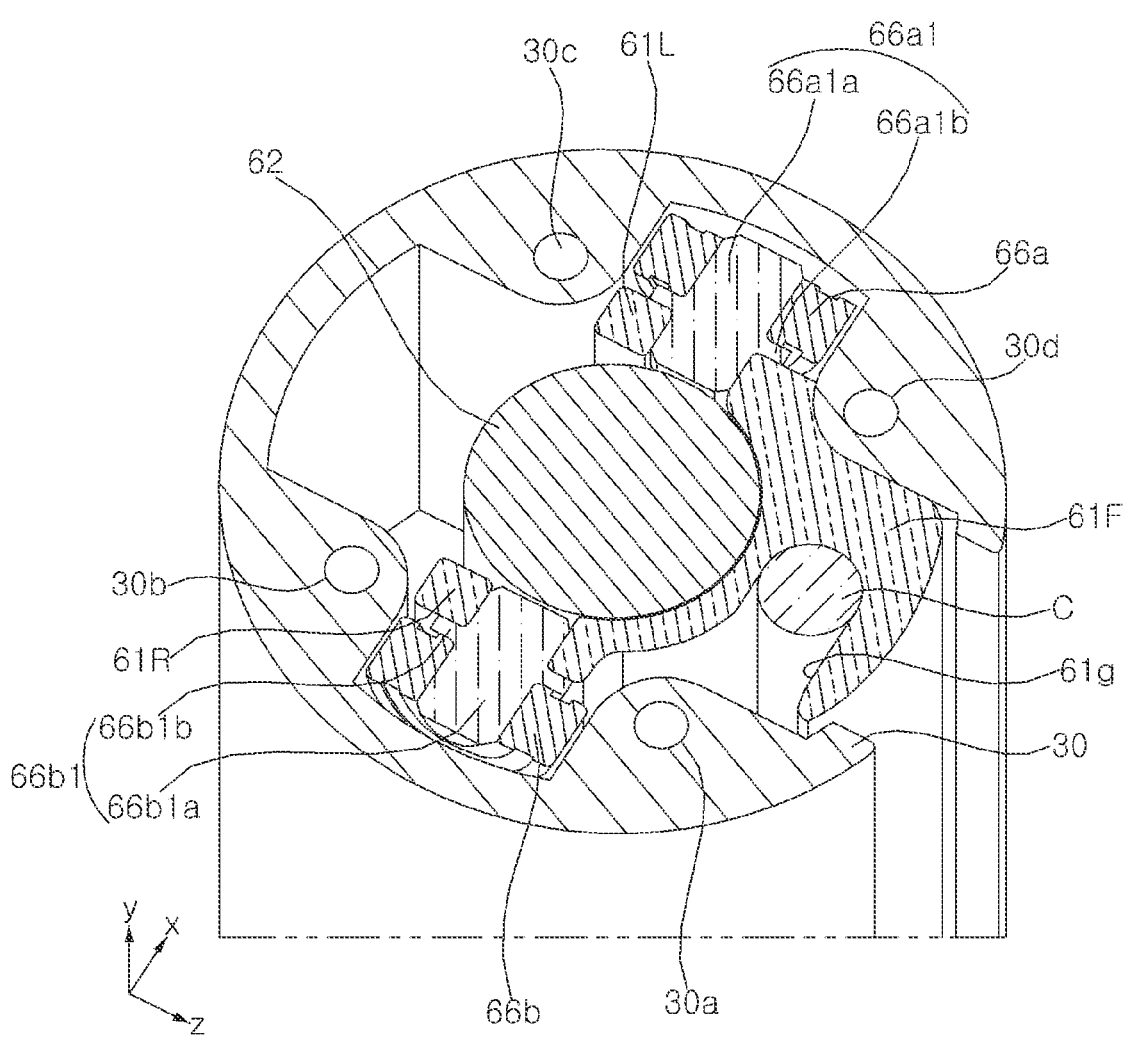

Referring to FIGS. 44 and 45, a roller 66a, a roller 66b, a roller 67a, and a roller 67b may be adjacent to the clamp 64 (first clamp) and the clamp 65 (second clamp). For example, first rollers 66a and 66b may be adjacent to the first clamp 64, and second rollers 67a and 67b may be adjacent to the second clamp 65.

The first rollers 66a and 66b may include a first left roller 66a and a first right roller 66b. A body 66a1a of a first left pin 66a1 may be formed through the first left roller 66a and a left side portion 61L of the vertical member 61. A flange 66a1b of the first left pin 66a1 may be disposed between the first left roller 66a and the left side portion 61L. The first left roller 66a may be coupled to the left side portion 61L through the first left pin 66a1. A body 66b1a of a first right pin 66b1 may be formed through the first right roller 66b and a right side portion 61R of the vertical member 61. A flange 66b1b of the first right pin 66b1 may be disposed between the first right roller 66b and the right side portion 61R. The first right roller 66b may be coupled to the right side portion 61R through the first right pin 66b1.

For example, the second rollers 67a and 67b may have the same shape as the first rollers 66a and 66b. That is, the description described above with respect to the first rollers 66a and 66b may be equally applied to the second rollers 67a and 67b. Accordingly, the second left roller 67a may be coupled to the left side portion 61L, and the second right roller 67b may be coupled to the right side portion 61R.

In addition, the left rollers 66a and 67a may be disposed between a third rib 30c and a fourth rib 30d, and may be in contact with the third rib 30c and the fourth rib 30d. The right rollers 66b and 67b may be disposed between a first rib 30a and a second rib 30b, and may be in contact with the first rib 30a and the second rib 30b.

Accordingly, the vertical member 61 can smoothly move up and down in the pole 30 by the rollers 66a, 66b, 67a, and 67b.

Figure 46:
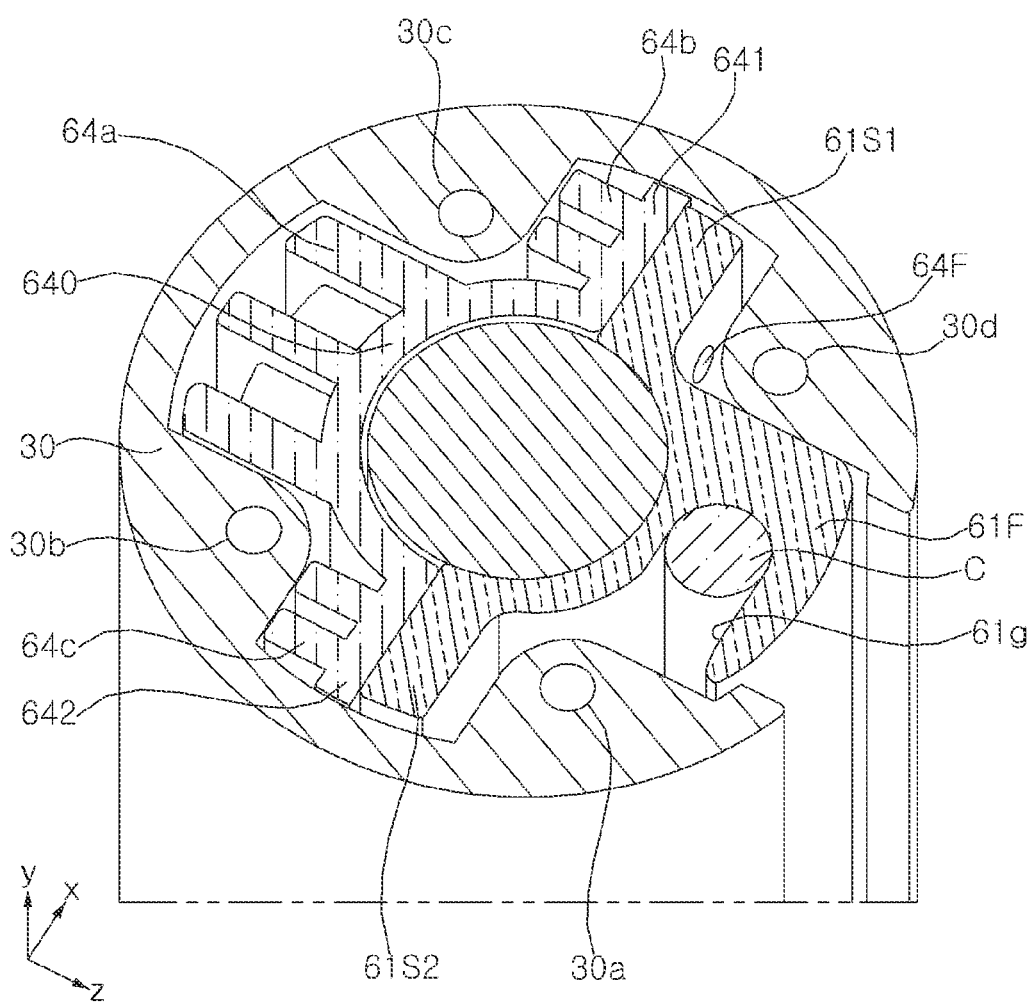

Referring to FIGS. 44 and 46, a first left flange 641 of the first clamp 64 may be disposed between the third rib 30c and the fourth rib 30d. The first right flange 642 of the first clamp 64 may be disposed between the first rib 30a and the second rib 30b. The first clamp 64 may include a first central protrusion 64a, a first left protrusion 64b, and a first right protrusion 64c.

The first central protrusion 64a may protrude from a first semi-cylinder 640 toward an inside of the pole 30, and may be in contact with the inside of the pole 30. The first left protrusion 64b may protrude from the first left flange 641 toward the third rib 30c, and may be in contact with the third rib 30c. The first right protrusion 64c may protrude from the first right flange 642 toward the second rib 30b, and may be in contact with the second rib 30b. Accordingly, the first central protrusion 64a, the first left protrusion 64b, and the first right protrusion 64c may cause friction between the vertical member 61 and the pole 30.

For example, the second clamp 65 may be spaced downward from the first clamp 64, and may have the same shape as the first clamp 64. That is, the description of the first clamp 64 may be equally applied to the second clamp 65. Accordingly, a second central protrusion 65a, a second left protrusion 65b, and a second right protrusion 65c of the second clamp 65 may cause friction between the vertical member 61 and the pole 30.

Thus, a position (height) of the vertical member 61 with respect to the base 20 can be kept constant by a friction force between the protrusion (64a, 64b, 64c, 65a, 65b, 65c) and the pole 30 if an external force equal to or greater than a specific level is not applied.

Figure 47:
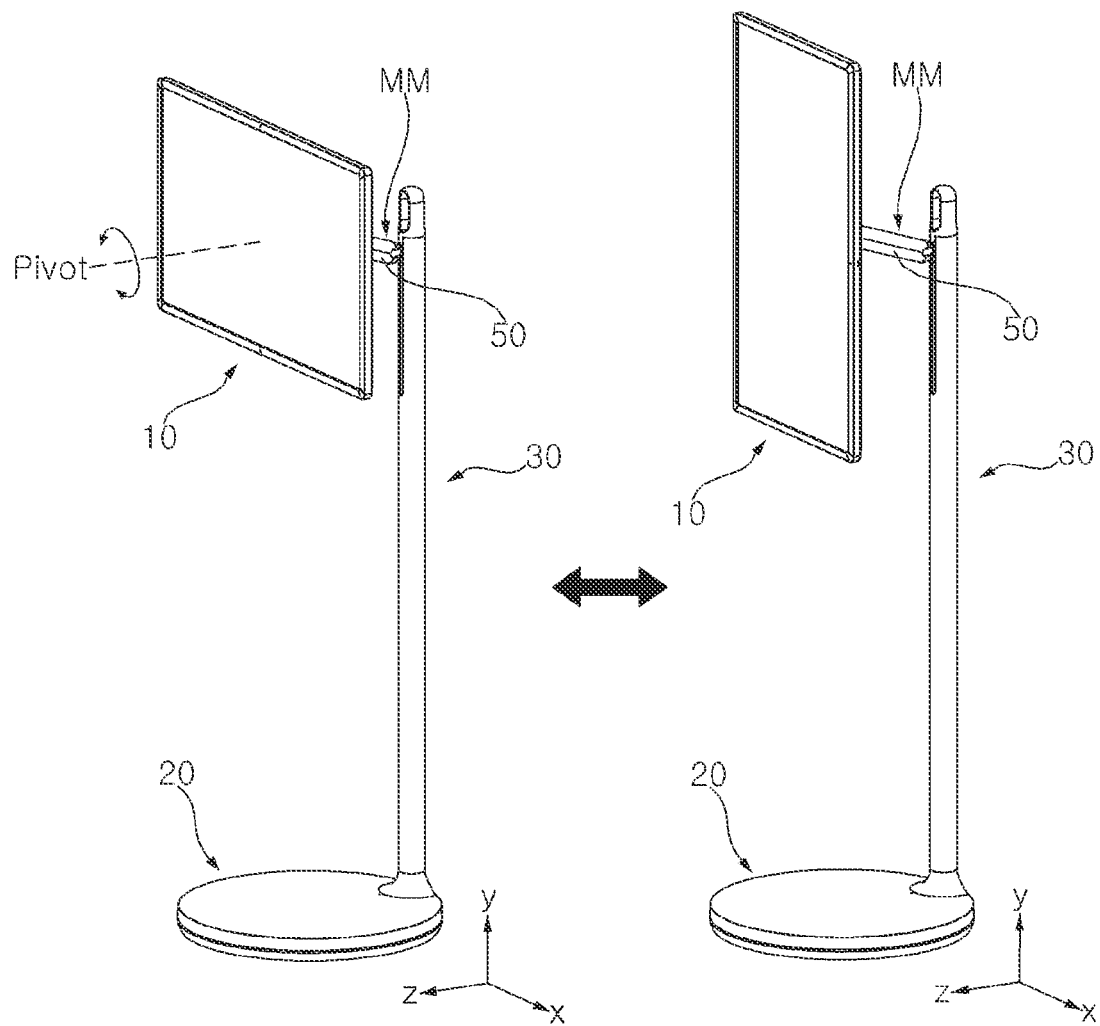

Referring to FIG. 47, the head 10 may be spaced upward from the base 20. A user can pivot the head 10. A pivot axis may pass through the center of the head 10 and be orthogonal to the head 10. Referring to the left drawing of FIG. 47, the head 10 may be placed in landscape mode. Referring to the right drawing of FIG. 47, the head 10 may be placed in portrait mode.

Figure 48:
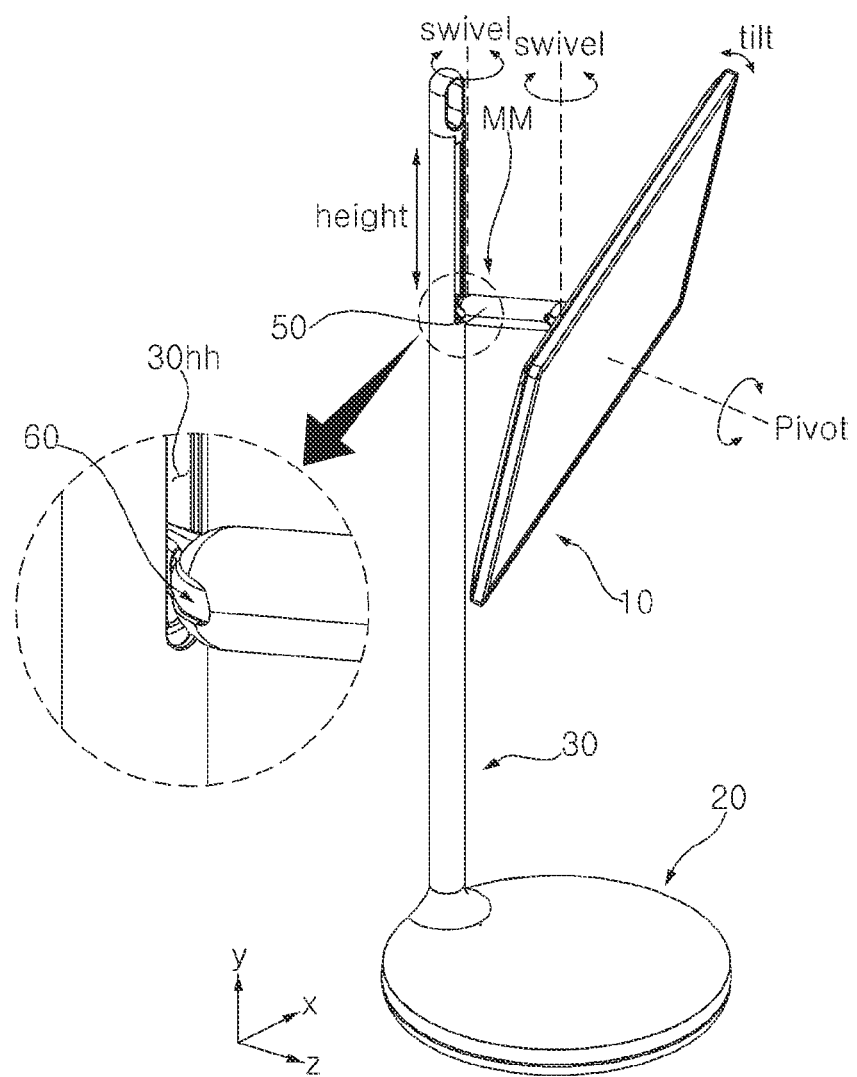

Referring to FIG. 48, a user can tilt the head 10. A tilt axis, which is located behind the center of the head 10, may be a horizontal axis parallel to the head 10. The user can swivel the head 10. A first swivel axis may be a vertical axis adjacent to one end of the arm 50. A second swivel axis may be a vertical axis adjacent to another end of the arm 50. The user can raise or lower the head 10 from the pole 30.

The above-described pivoting, tilting, swiveling, and elevating operations of the head 10 may be implemented independently of each other. For example, the head 10 may be pivoted within a range of +90 degrees to −90 degrees. For example, the head 10 may be tilted within a range of +25 degrees to −25 degrees. For example, the head 10, based on landscape mode, may be swiveled within a range of +65 to −65 degrees. For example, the head 10 may be located at 1,065 to 1,265 mm from the base 20 or the ground.

Referring back to FIG. 25, a wheel 29 may be mounted on the lower surface of the base 20. For example, a plurality of wheels 29 may be disposed along the circumference of the base 20. Accordingly, a user can freely move the display device on the ground using the wheel 29. The base 20 may be referred to as a moving base.

Referring to FIGS. 1 to 48, according to an aspect of the preset disclosure, a display device may include: a head including a display panel; a stand that supports the head; a first connector fixed to any one of the head and the stand; and a second connector fixed to the other one of the head and the stand, and is aligned with the first connector in one direction, wherein the first connector may include a first pin extending in the one direction, and the second connector may include a second pin that defines a boundary of a pin hole into which the first pin is inserted and that surrounds and contacts a side surface of the first pin.

The stand may include an electronic component electrically connected to the head by coupling of the first pin and the second pin.

The head may include: a frame disposed at a rear of the display panel, to which the display panel is coupled, and supported by the stand; and an electronic component mounted on the frame and electrically connected to the first connector and the second connector. Any one of the first connector and the second connector may be fixed to the frame, and the other one of the first connector and the second connector may be fixed to the stand.

The stand may include a base; and a pole extending in the one direction, detachably coupled to the base, and to which the head is fixed. Any one of the first connector and the second connector may be fixed to the pole, and the other one of the first connector and the second connector may be fixed to the base.

The base may include a port formed at one surface of the base and into which an insertion portion of the pole is inserted. Any one of the first connector and the second connector may be disposed in the insertion portion, and the other one of the first connector and the second connector may be disposed in the port.

The pole may include a guide slit formed in a side surface of the insertion portion, and the base may further include a first guide rib formed at an inside of the port and inserted into the guide slit.

The base may further include a weight disposed in the base, to which the first connector or the second connector is fixed, and to which the pole is coupled. The weight may include a ridge surrounding the insertion portion that is inserted into the port. The ridge may include a second guide rib formed on a side wall thereof and inserted into the guide slit.

The second connector may further include a second pin housing in which the second pin is accommodated. The second pin housing may include a pin cover defining a boundary of an insertion hole, which is an inlet of the pin hole, and covering at least a portion of a distal end of the second pin.

The pin cover may include a pin guide surface defining a boundary of the insertion hole and formed such that a width of the insertion hole gradually decreases toward an insertion direction of the first pin.

The pin guide surface may be convex toward the insertion hole.

The second pin may include a pin side portion extending along a circumference of the first pin. The pin cover may extend along a circumference of the pin side portion and cover a distal end of the pin side portion.

A width of an inner circumferential surface of the pin side portion may be equal to or less than a width of an inner circumferential surface of the pin cover.

The pin side portion may include an inclined surface defining the distal end of the pin side portion and formed such that a width of an inner circumferential surface of the pin side portion gradually decreases toward an insertion direction of the first pin.

The first connector may include a first pin housing in which the first pin is accommodated. The second connector may include: a second pin housing in which the second pin is accommodated and inserted into an inner space of the first pin housing; and a third pin housing extending along a circumference of the second housing and spaced apart from a side surface of the second pin housing. A portion of the first pin housing may be inserted into a space between the second pin housing and the third pin housing.

The first pin housing may include: a first protruding portion formed on an inner circumferential surface of the first pin housing; and a first recessed portion formed on an outer circumferential surface of the first pin housing and opposite the first protruding portion. The second pin housing may include a second recessed portion formed on an outer circumferential surface of the second pin housing and into which the first protruding portion is inserted. The third pin housing may include a second protruding portion formed on an inner circumferential surface of the third pin housing and inserted into the first recessed portion.

The effect of the display device according to the present disclosure will be described as follows.

According to at least one of the embodiments of the present disclosure, it is possible to provide a docking mechanism of connectors.

According to at least one of the embodiments of the present disclosure, it is possible to provide a structure that can minimize damage of pins (terminals) during coupling of connectors.

According to at least one of the embodiments of the present disclosure, it is possible to provide a structure that can achieve connectors to be coupled to each other in an easier and secure manner.

According to at least one of the embodiments of the present disclosure, it is possible to provide a structure that can achieve secure electrical connection (e.g., stable power supply) using a relatively small number of pins (terminals).

According to at least one of the embodiments of the present disclosure, it is possible to provide a display device including a head to which a first connector or a second connector is fixed and a stand to which the second connector or the first connector is fixed.

According to at least one of the embodiments of the present disclosure, it is possible to provide a display device that can freely adjust an angle, height, or position of a head using a stand that supports the head.

The additional scope of applicability of the present disclosure will be apparent from the above detailed description. However, those skilled in the art will appreciate that various modifications and alterations are possible, without departing from the idea and scope of the present disclosure, and therefore it should be understood that the detailed description and specific embodiments, such as the preferred embodiments of the present disclosure, are provided only for illustration.

Certain embodiments or other embodiments of the present disclosure described above are not mutually exclusive or distinct from each other. Any or all elements of the embodiments of the present disclosure described above may be combined or combined with each other in configuration or function.

For example, a configuration "A" described in one embodiment and/or drawings may be combined with a configuration "B" described in another embodiment and/or drawings. Namely, although the combination between the configurations is not directly described, the combination is possible except in the case where it is described that the combination is impossible.

The above detailed description should not be construed as restrictive in all respects and should be considered as illustrative. The scope of the present disclosure should be determined by a reasonable interpretation of the appended claims, and all modifications within the equivalent scope of the present disclosure are included in the scope of the present disclosure.

What is claimed is:

1. A display device comprising:
a head including a display panel;
a base being apart from the head;
a pole extended from the base toward the head and connected with the head and the base;
a first connector fixed to any one of the pole and the base; and
a second connector fixed to the other one of the pole and the base, the second connector aligned with the first connector in one direction,
wherein the first connector comprises a first pin extending in the one direction,
wherein the second connector comprises a second pin providing a boundary of a pin hole into which the first pin is inserted, the second pin surrounding and contacting a side surface of the first pin,
wherein the base comprises a port formed at one surface of the base such that an insertion portion of the pole is inserted into the port,
wherein any one of the first connector and the second connector is disposed in the insertion portion, and the other one of the first connector and the second connector is disposed at the port,
wherein the pole comprises a guide slit formed at a side surface of the insertion portion,
wherein the base further comprises:
a first guide rib formed at an inside of the port and inserted into the guide slit; and
a weight disposed in the base, the first connector or the second connector is fixed to the weight,
wherein the weight comprises a ridge surrounding the insertion portion that is inserted into the port, and
wherein the ridge comprises a second guide rib formed at a side wall and inserted into the guide slit.

2. The display device of claim 1, wherein the base comprises an electronic component electrically connected to the head by coupling of the first pin and the second pin.

3. The display device of claim 1, wherein the head comprises:
a frame disposed at a rear of the display panel, to which the display panel is coupled; and
an electronic component mounted on the frame and electrically connected to the first connector and the second connector.

4. The display device of claim 1, wherein the second connector further comprises a second pin housing in which the second pin is accommodated, and
wherein the second pin housing comprises a pin cover providing a boundary of an insertion hole, which is an inlet of the pin hole, and covering at least a portion of a distal end of the second pin.

5. The display device of claim 4, wherein the pin cover comprises a pin guide surface providing a boundary of the insertion hole and formed such that a width of the insertion hole gradually decreases toward an insertion direction of the first pin.

6. The display device of claim 5, wherein the pin guide surface is convex toward the insertion hole.

7. The display device of claim 4, wherein the second pin comprises a pin side portion extending along a circumference of the first pin, and
wherein the pin cover extends along a circumference of the pin side portion and covers a distal end of the pin side portion.

8. The display device of claim 7, wherein a width of an inner circumferential surface of the pin side portion is equal to or less than a width of an inner circumferential surface of the pin cover.

9. The display device of claim 7, wherein the pin side portion comprises an inclined surface providing the distal end of the pin side portion such that a width of an inner circumferential surface of the pin side portion gradually decreases toward an insertion direction of the first pin.

10. The display device of claim 1, wherein the first connector comprises a first pin housing in which the first pin is accommodated,
wherein the second connector comprises:
a second pin housing in which the second pin is accommodated and inserted into an inner space of the first pin housing; and
a third pin housing extending along a circumference of the second housing and spaced apart from a side surface of the second pin housing, and
wherein a portion of the first pin housing is inserted into a space between the second pin housing and the third pin housing.

11. The display device of claim 10, wherein the first pin housing comprises:
a first protruding portion formed on an inner circumferential surface of the first pin housing; and
a first recessed portion formed on an outer circumferential surface of the first pin housing and opposite the first protruding portion,
wherein the second pin housing comprises a second recessed portion formed on an outer circumferential surface of the second pin housing and into which the first protruding portion is inserted, and
wherein the third pin housing comprises a second protruding portion formed on an inner circumferential surface of the third pin housing and inserted into the first recessed portion.

* * * * *

UNITED STATES PATENT AND TRADEMARK OFFICE
CERTIFICATE OF CORRECTION

PATENT NO. : 12,204,368 B2
APPLICATION NO. : 17/864792
DATED : January 21, 2025
INVENTOR(S) : Seongwook Choi Page 1 of 1

It is certified that error appears in the above-identified patent and that said Letters Patent is hereby corrected as shown below:

On the Title Page

Item (30)
Please add: --Jul. 20, 2021 (KR) ...................... PCT/KR2021/009299--.

Signed and Sealed this
First Day of April, 2025

Coke Morgan Stewart
*Acting Director of the United States Patent and Trademark Office*